US012141732B1

(12) United States Patent
Solmer et al.

(10) Patent No.: US 12,141,732 B1
(45) Date of Patent: Nov. 12, 2024

(54) SYSTEM AND METHOD FOR AGGREGATED MODELING, SEARCH, VISUALIZATION, AND SUMMARIZATION AND APPLICATIONS THEREOF

(71) Applicant: IP.com I, LLC, Fairport, NY (US)

(72) Inventors: Robert Solmer, Portland, OR (US); Wen Ruan, Manlius, NY (US); James Thomas Durkin, Pittsford, NY (US); Ju Suk Lee, Palo Alto, CA (US); Natalia Victorovna Britvikhina, West Henrietta, NY (US); Samuel C. Baxter, Brewster, MA (US)

(73) Assignee: IP.com I, LLC, Fairport, NY (US)

( * ) Notice: Subject to any disclaimer, the term of this patent is extended or adjusted under 35 U.S.C. 154(b) by 215 days.

(21) Appl. No.: 17/188,990

(22) Filed: Mar. 1, 2021

Related U.S. Application Data

(60) Provisional application No. 62/983,167, filed on Feb. 28, 2020.

(51) Int. Cl.
*G06Q 10/067* (2023.01)
*G06F 16/35* (2019.01)
*G06F 40/30* (2020.01)

(52) U.S. Cl.
CPC .......... *G06Q 10/067* (2013.01); *G06F 16/35* (2019.01); *G06F 40/30* (2020.01)

(58) Field of Classification Search
None
See application file for complete search history.

(56) References Cited

U.S. PATENT DOCUMENTS

| | | | | |
|---|---|---|---|---|
| 9,535,902 | B1* | 1/2017 | Michalak | G06F 16/3331 |
| 2011/0213742 | A1* | 9/2011 | Lemmond | G06F 16/3344 |
| | | | | 706/13 |

(Continued)

OTHER PUBLICATIONS

Meng, Qinxue et al. "Relational autoencoder for feature extraction." 2017 International Joint Conference on Neural Networks (IJCNN) (2017): 364-371. (Year: 2017).*

*Primary Examiner* — Andrew B Whitaker
(74) *Attorney, Agent, or Firm* — Venable LLP

(57) ABSTRACT

The present teaching relates to method, system, medium, and implementations for modeling an entity based on textual information. When information about an entity to be modeled is received, textual information related to the entity is searched, including a plurality of documents related to at least one aspect of the entity. First aggregated semantic models are obtained for the plurality of documents. Each first aggregated semantic model represents one of the plurality of documents and includes a semantic feature vector and a semantic signature. Such first aggregated semantic models are clustered into at least one group, each of which corresponds to one of the at least one aspect of the entity and includes a set of first aggregated semantic models representing semantics of documents related to the aspect of the entity. A second aggregated semantic model is then derived based on each group of first aggregated semantic models to characterize one aspect of the entity, yielding one or more second aggregated semantic models. A second aggregated semantic model for an aspect of the entity comprises an aggregated semantic feature vector and an aggregated semantic signature for characterizing the aspect of the entity and facilitating a search with respect to the aspect.

17 Claims, 50 Drawing Sheets
(19 of 50 Drawing Sheet(s) Filed in Color)

(56) References Cited

U.S. PATENT DOCUMENTS

| | | | | |
|---|---|---|---|---|
| 2015/0324454 A1* | 11/2015 | Roberts | ............ | G06F 16/24578 707/734 |
| 2021/0149980 A1* | 5/2021 | Pavlini | ................ | G06F 16/9538 |
| 2021/0406706 A1* | 12/2021 | Hasan | .................... | G06F 40/284 |
| 2022/0188520 A1* | 6/2022 | Iso-Sipila | ............. | G06F 40/295 |

* cited by examiner

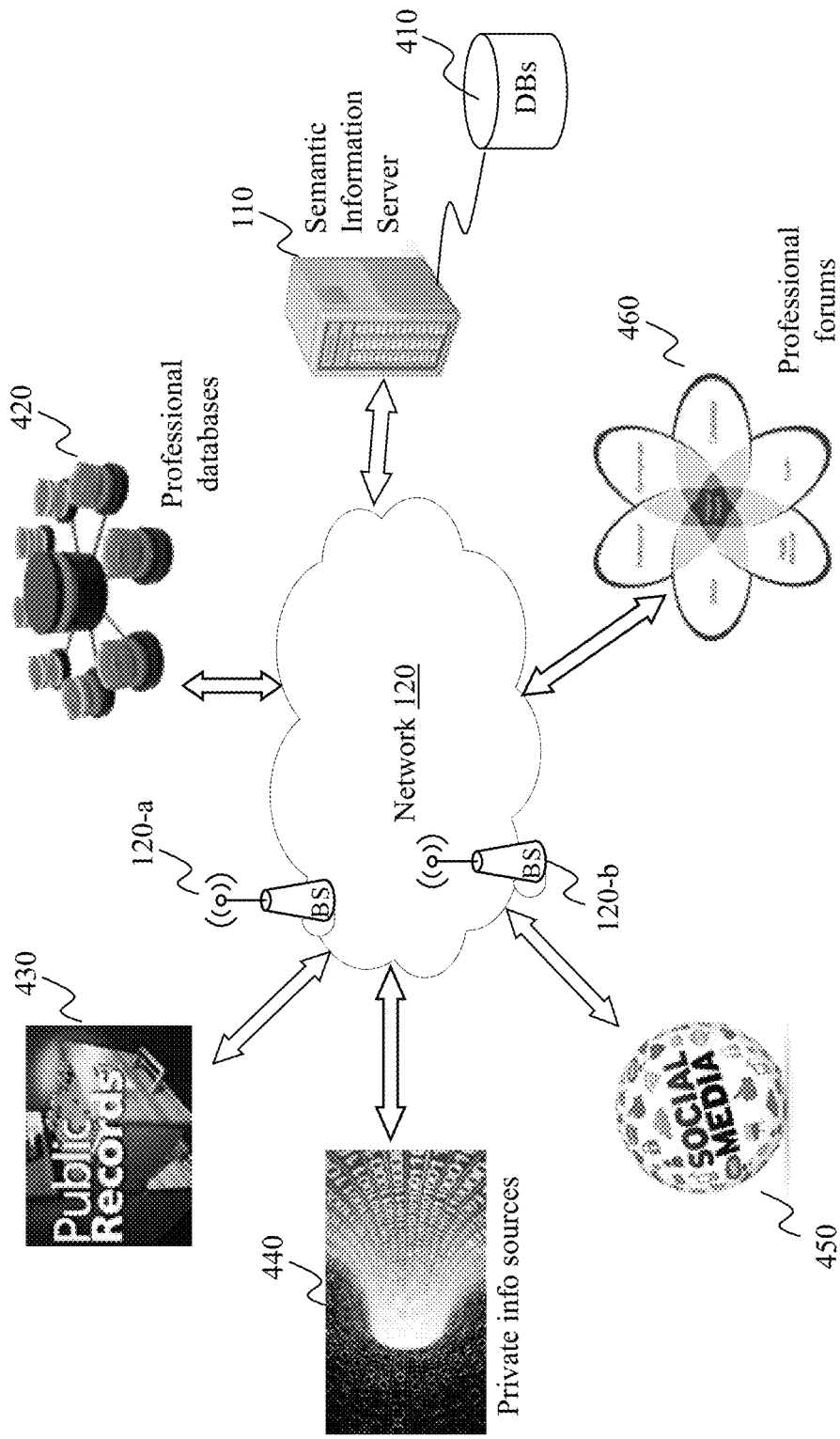

SYSTEM AND METHOD FOR AGGREGATED MODELING, SEARCH, VISUALIZATION, AND SUMMARIZATION AND APPLICATIONS THEREOF

CROSS REFERENCE TO RELATED APPLICATION

The present application claims priority to U.S. Provisional Application 62/983,167 filed Feb. 28, 2020, which is incorporated herein by reference in its entirety

BACKGROUND

1. Technical Field

The present teaching generally relates to data processing. More specifically, the present teaching relates to artificial intelligence (AI) based data processing and applications thereof.

2. Technical Background

With the advancement of technologies in online communications, the world shrinks significantly because of the ubiquitous connectivity. However, with the vast amount of information made available every day at the fingertips of the world, new significant challenges emerge. For example, how one can effectively identify only information relevant to each and every specific situation; how one may grasp the essence of such vast amount of information given each situation; how one may substantively obtain a characterization of such information with respect to different needs; and how such information may be presented in a semantically meaningful yet condensed manner in a limited space without losing the essence embedded in such information; and how different aspects of characteristics of information may be flexibly inquired and made aware to a user in a visual and understandable way. None of the existing technologies address such issues in an integrated, coherent, and streamlined manner.

Thus, there is a need for improved approaches to provide means to facilitate users to effectively focus on relevant information, make sense and characterize such relevant information with respect to defined goals, and understand the implications that such relevant information reveals.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 depicts an exemplary framework in which a semantic information server provides services based on information from different online/offline sources, in accordance with an embodiment of the present teaching;

FIG. 19C shows an exemplary visualization of a search result list, in accordance with an embodiment of the present teaching;

FIG. 19N depicts an exemplary semantic analyzer operating in a claim browser mode for providing analysis with respect to different legal requirements, in accordance with an embodiment of the present teaching;

FIG. 19O depicts an exemplary semantic analyzer operating in a review mode for relevant semantic related analysis, in accordance with an embodiment of the present teaching;

DETAILED DESCRIPTION

Figure 1:
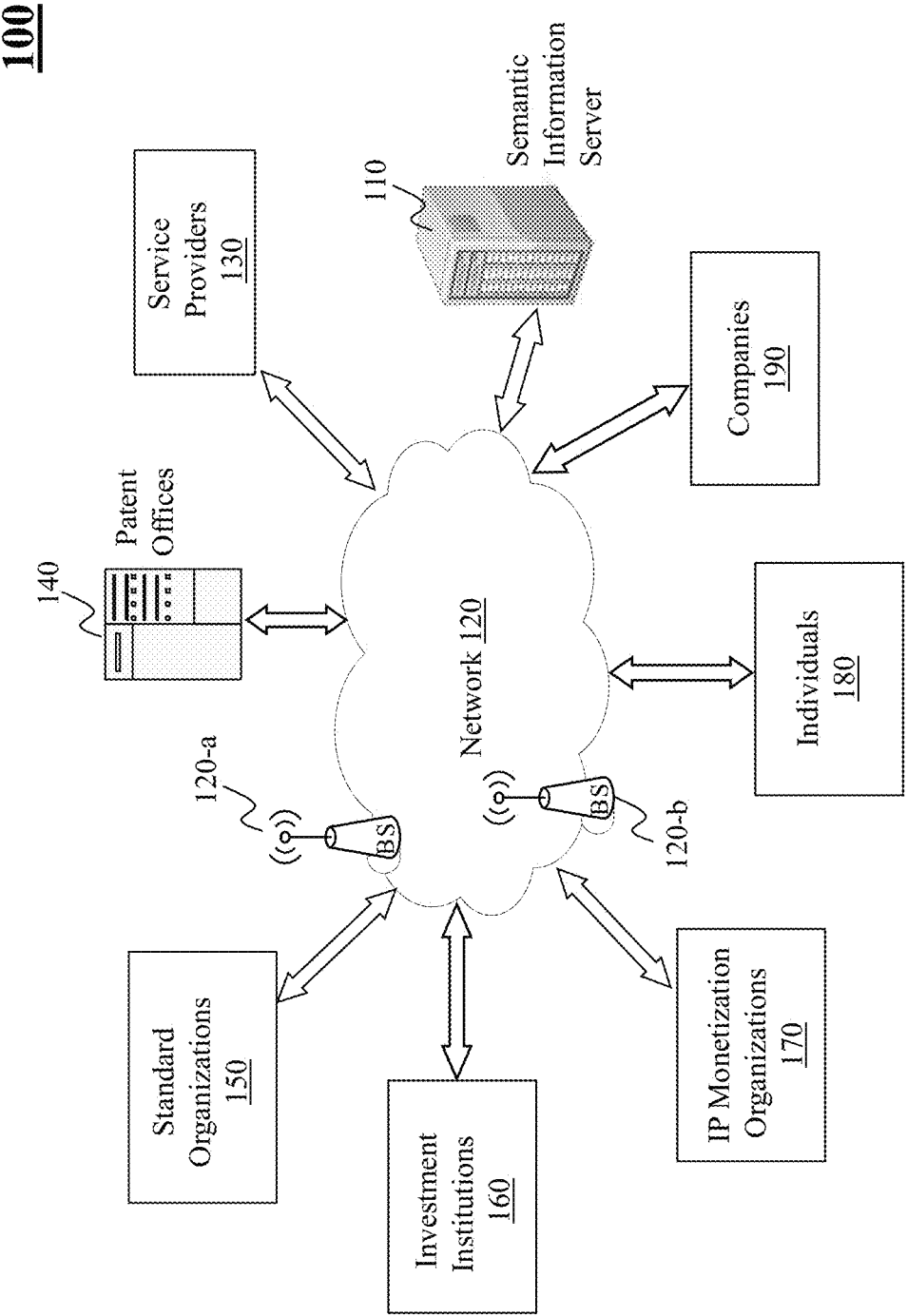
FIG. 1 illustrates a general framework for semantic information consumption, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Traditional AI based semantic systems generally focus on modeling and analysis of individual documents which may yield a unified representation comprising a semantic based representation such as a semantic signature and/or a feature-based representation such as a feature vector for each document. Such unified representations of individual documents can be indexed, searched, and compared that enable the document search, visualization, and other various applications.

The present teaching aims to address the deficiencies of the current state of the art and discloses an integrated AI based system and method for semantic based aggregated modeling, search, visualization, summarization, and various applications thereof. Via AI based technologies, textual content associated with an entity may be used to characterize or model the entity with respect to different aspects thereof based on semantics embedded in such textual content and captured via semantic analysis of the textual content. The semantic modeling may be applied based on any type of textual input, including one or more documents, a segment of a document, a written description of a product, an advertisement content, etc.

Semantics captured from textual content may be utilized for deriving additional types of information such as summarization, assessment, conclusions, or predictions directed to certain characteristics. For example, semantics captured from some technical papers may be used to assess whether the technical papers are novelty destroying with respect to a particular set of claims of a patent application. Semantics captured from a claim of a patent application may be used to identify support from the specification of the patent application to assess whether the legal requirements of written description and enablement are satisfied. Textual information associated with a corporation, such as publications, marketing materials, patents, patent applications, may be analyzed as to the semantics to determine whether the corporation is active in some particular technical fields. Standards may be analyzed as to their technical focuses and semantics captured from such standards may be used to automatically identify potential licensees in the marketplace. Textual information in a particular technical field may also be analyzed on semantics which may then be used to automatically generate a summary of the current state of the art or even predict the future trend of the field. Details of different aspects of the present teaching are provided below.

FIG. 1 illustrates a general framework 100 for semantic information services/consumption, in accordance with an embodiment of the present teaching. In this framework 100, a semantic information server 110 is deployed and connected to various types of service users via a network 120 to provide a variety types of services, as will be discussed below. In this illustrated framework, users of the semantic information server 110 may be in different industry sectors. For example, different service providers (130) may use services from the semantic information server 110. Such service providers may include services related to intellectual properties (IP) and non-IP. With respect to patenting activities, a patent office (140) may also receive services utilize services offered by the semantic information server 110 to facilitate more efficient and effective, e.g., patent application examinations.

Different types of companies (190) may also benefit from services enabled based on an understanding of different relevant situations associated with the companies. For example, to ensure freedom to operate, a company may desire to understand the IP landscape in the marketplace and such an assessment may be provided by the semantic information server 110 based on, e.g., semantic analysis of information associated with the IP associated with certain technologies and market. When a technology is developed by a company, the company may also interface with the semantic information server 110 to obtain an assessment of the patentability of the technology derived by the semantic information server 110 via analyzing the semantics of searchable prior art.

In some embodiments, a company may be modeled or characterized by the semantic information server 110 via semantic analysis of information associated with the company. For example, based on information associated with a given company such as patents/patent applications, online/offline materials in, e.g., marketing, news, product offerings, etc., the semantic information server 110 may perform aggregated modeling by analyzing such information and create an aggregated model characterizing different aspects of the company. For instance, a company may be characterized to be active in certain industry sectors, with certain technologies, features of its products, and market share in each of such industry sectors. Other types of characterization of a company by the semantic information server 110 may also be possible. For instance, a company may use the semantic information services offered by 110 to obtain an assessment or characterization of another company (e.g., a competitor, a potential licensor/licensee, a target for a transaction, etc.) via semantic based aggregated modeling in terms of different given criteria, e.g., the technology landscape, relevant products' market positions, etc.

In the illustrated framework 100, a user may also be an individual (180) which may be a special case of a company and can also utilize the services proffered by the semantic information server 110 for different purposes. For example, an individual inventor may seek the service from the semantic information server 110 to identify companies that are active in the marketplace and are potential licensees of the inventor's patents. In another example, an investor (individual) may utilize the services of the semantic information server 110 to identify potential investment opportunities based on assessment of different targets on, e.g., their market potential or technical strength, obtained based on semantics embedded in textual information associated with such targets.

Other types of business parties may also use the services from the semantic information server 110. Investment institutions (160) such as venture capital or private equity fund organizations are always looking for start-up companies to invest and have the needs to identify targets, understand the trend of the industry sector or certain technologies, and perform due diligence on other related aspects. Similarly, for each of such desired goals, certain assessment may be obtained by the semantic information server 110 based on textual information associated with the desired goals. Similarly, IP monetization organizations (17) is a special type of investment organization and the investments are through the enforcement of IP rights against infringers, which may be identified via the services from the semantic information server 110.

Another type of parties that may benefit from the semantic based services from 110 involves standard organizations. In the modern society, industry standards become more and more important in governing how products in a specific trade operate and/or inter-operate. Each standard may correspond to a long and complex document with different parts covering the standards to be applied to different aspects of the industry. For example, standard ITU-T H.265 is a standard governing how media data are organized during transmission and decoded and is a document of over 600 pages covering the technical requirements for syntax, bitstream, picture formats, partitioning, semantics, prediction, prediction mode/parameter decoding, residual decoding, scaling, multi-view decoding, parallel processing, etc. The semantics in each of such aspects may be recognized and accordingly governed with respect to different compliant companies differently. This may be achieved via semantic processing by the semantic information server 110.

Figure 2:
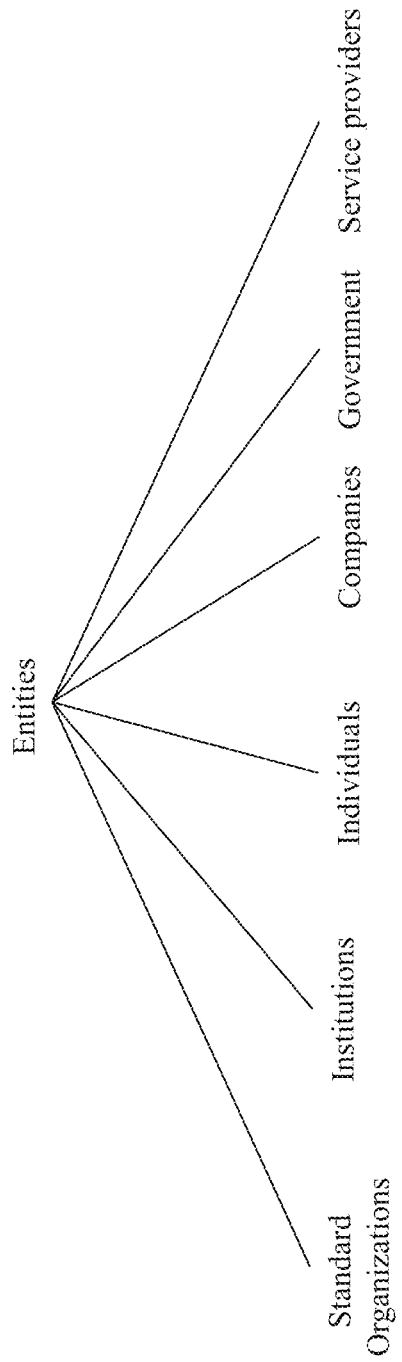
FIG. 2 illustrates exemplary types of entities.
Figure 3A:
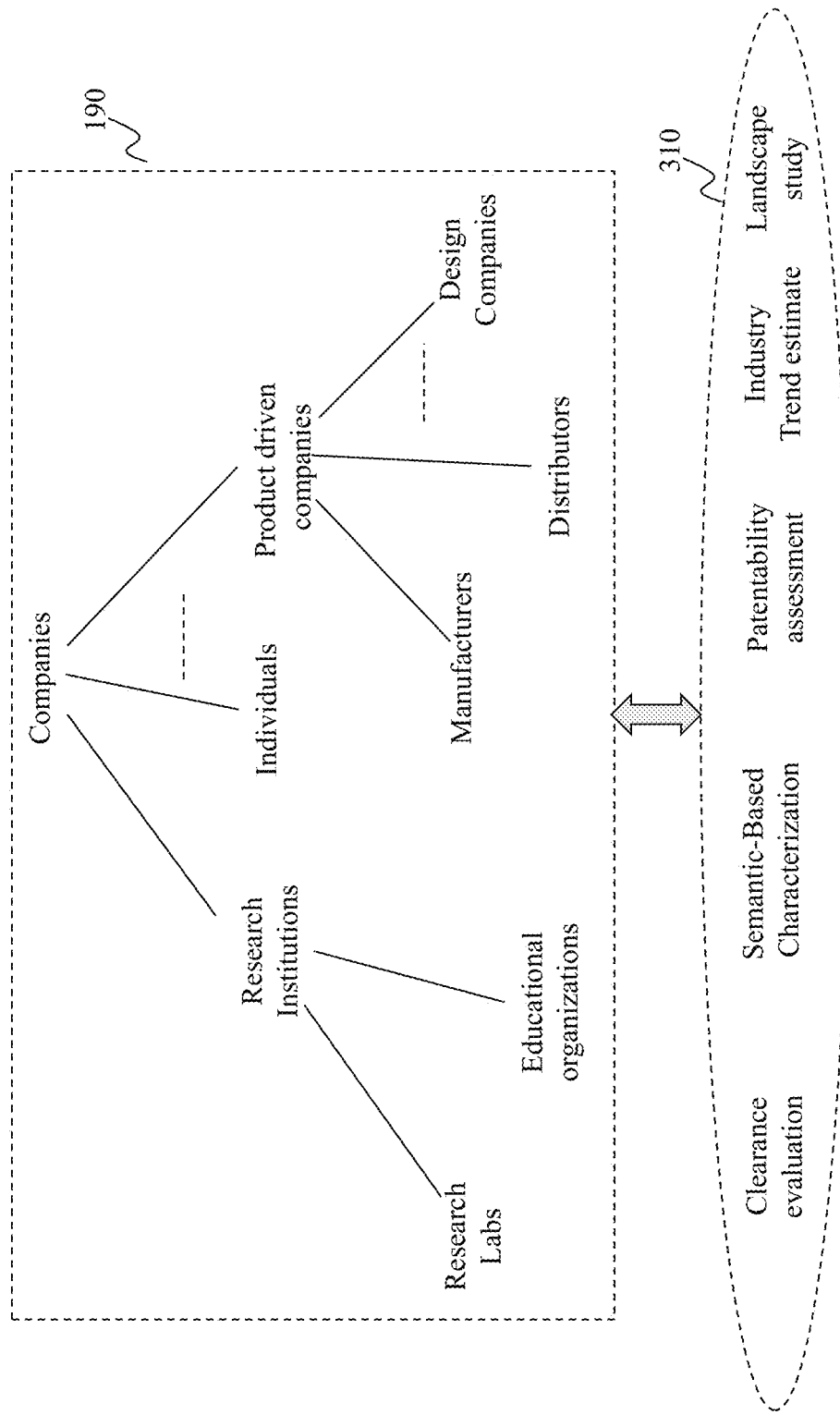
FIGS. 3A-3F show exemplary types of parties that may utilize exemplary types of services that offer semantically meaningful information derived via AI based data processing, in accordance with an embodiment of the present teaching.

As discussed above, the semantic information server 110 is deployed to provide services to a variety of exemplary entities based on semantics of textual information from different sources, as shown in FIG. 1. FIG. 2 summarizes those types of entities, including companies, individuals, service providers, institutions, standard organizations, and government agencies. FIGS. 3A-3F visually illustrate the relationship between different types of parties and exemplary types of services that the semantic information server 110 may offer via semantic analysis of a wide range of textual information, in accordance with an embodiment of the present teaching. FIG. 3A illustrates different types of companies 190 and exemplary types of semantic information services 310 that the semantic information server 110 may offer to them, in accordance with an embodiment of the present teaching. As can be seen, companies can be any individual or operational business entities, including product driven entities such as manufacturers, distributors, or design companies, research institutions such as research labs or educational organizations such as universities. For such companies, different types of services may be offered based on analyzing semantics of textual information associated therewith. For example, services 310 may include various tools related to IP asset management such as landscape study, estimating industry trend, assessment of patentability of an invention, clearance study, and semantic-based self-characterization or characterization of a specified target.

In this present teaching, a landscape study refers to intellectual property (IP) related landscape study, which may involve searching for documents (patents, patent applications, publications, products, etc.) related to some specified technology area(s) and characterizing the semantics of the documents with respect to some criteria, e.g., who is the players in the area, what product(s) on the market, the IP assets associated with each of the players, and optionally a summary of the IP asset of each of the players. A landscape study is based on analyzing documents related to the specified technology area(s) and processing such documents to understand the semantics of the documents and extracting/determining information based on such semantics. For example, if a company desires to obtain a landscape study related to, e.g., the area of autonomous driving, from the semantic information server 110, the semantic information server 110 may launch a search on all accessible documents related to different aspects of autonomous driving and then analyze such documents to identify different types of information. For instance, it may determine players in autonomous driving based on, e.g., affiliations of authors of published articles, assignees or inventors of patents and patent applications, seller of related products, etc. In addition, publications, patents, patent applications, marketing materials may be analyzed for semantics to determine which player has presence in which technological fields related to autonomous driving, etc. For example, by analyzing the semantics of documents related to autonomous driving, Tesla may be identified as a company that is engaged in different sub-fields of autonomous driving, e.g., automated obstacle avoidance, automatic lane change control, automatic parking, etc. Audi and/or other companies may also be identified as active players in this area but with different technical focuses. In this manner, the landscape of the technical area on autonomous driving can be summarized based on the semantics of the textual information associated with autonomous driving and provided to the company requesting the information.

Estimating trends may also be useful to many entities. There are different classes of trends that may be analyzed by examining publicly available information, and in certain embodiments coupling that information to technical data, such as a patents, or economic data, such as company performance e.g., EBITA. Publicly available information may include, without limitation, moderated or professionally produced material, socially produced information (e.g., Twitter), academically produced information (by, e.g., think tanks and universities), legislative information (such as regulations or statutes). Estimating an industry trend may involve two stages, with the first one focusing on understanding what (technology) is available at a present time, and the second one focusing on projecting what is going to happen (in technology) based on what is available today. For instance, life cycle and safety of an embedded battery may be a major concern in medical devices, automobiles, air travel and shipping, and personal computing devices. Publicly available information (explicitly textual and/or generated textual information) may include discussions on these topics in terms of safety, economic impact, or impact on an entity or market sectors performance. For example, IMO 2020, a recent shipping regulation for low-sulfur fuels can have wide ranging impacts. The semantics embedded in such textual information may be used to estimate that the next technological trend may be, e.g., scrubbers on ships rather than improved quality of fuel.

Clearance evaluation as discussed in the present teaching may refer to a freedom to operate study for the purpose of clearing the legal risk of a product by making sure that there are no enforceable IP rights that can cover the product. In this case, textual information related to the product may be analyzed to extract the semantics based on which documents (e.g., patents or copyrights) with similar semantics may be searched and analyzed to determine which of the documents may pose risks to the product. As can be seen, this service may be achieved by analyzing textual information for semantics and matching the semantics of a product description and that of the relevant documents for the basis of the service.

In a technology driven society, companies often seek patent protection on their innovations and some may desire to assess the patentability of each invention before committing to capital investment to seek patent protection. The semantic information server 110 may facilitate such service by analyzing the semantics of a description of the invention (textual information), searching for semantically relevant prior art, and determining whether any of the searched prior art, either alone or in combination, disclose the invention and to what extent. Traditionally, such patentability assessment is done by a search firm to identify relevant prior art and then by a law firm to assess legally whether the prior art discloses the invention. This can be both time consuming and costly. With the semantic information server 110, such work can be performed automatically via AI based semantic analysis of relevant documents.

Value of a technology company is often assessed based on its IP assets. Such an evaluation may be directed to the company itself or directed to another company such as a competitor. Such an evaluation may be characterized based on the IP assets and the landscape thereof. For example, to generate a profile of a company, relevant documents (patents, patent applications, product descriptions, statistics of the product markets, etc.) may be analyzed for semantics by the semantic information server 110. Such a company profile may characterize the company in terms of technology coverage in different market sectors, strength of the IP in each of such sectors, products in each sector, and market position thereof.

Figure 3B:
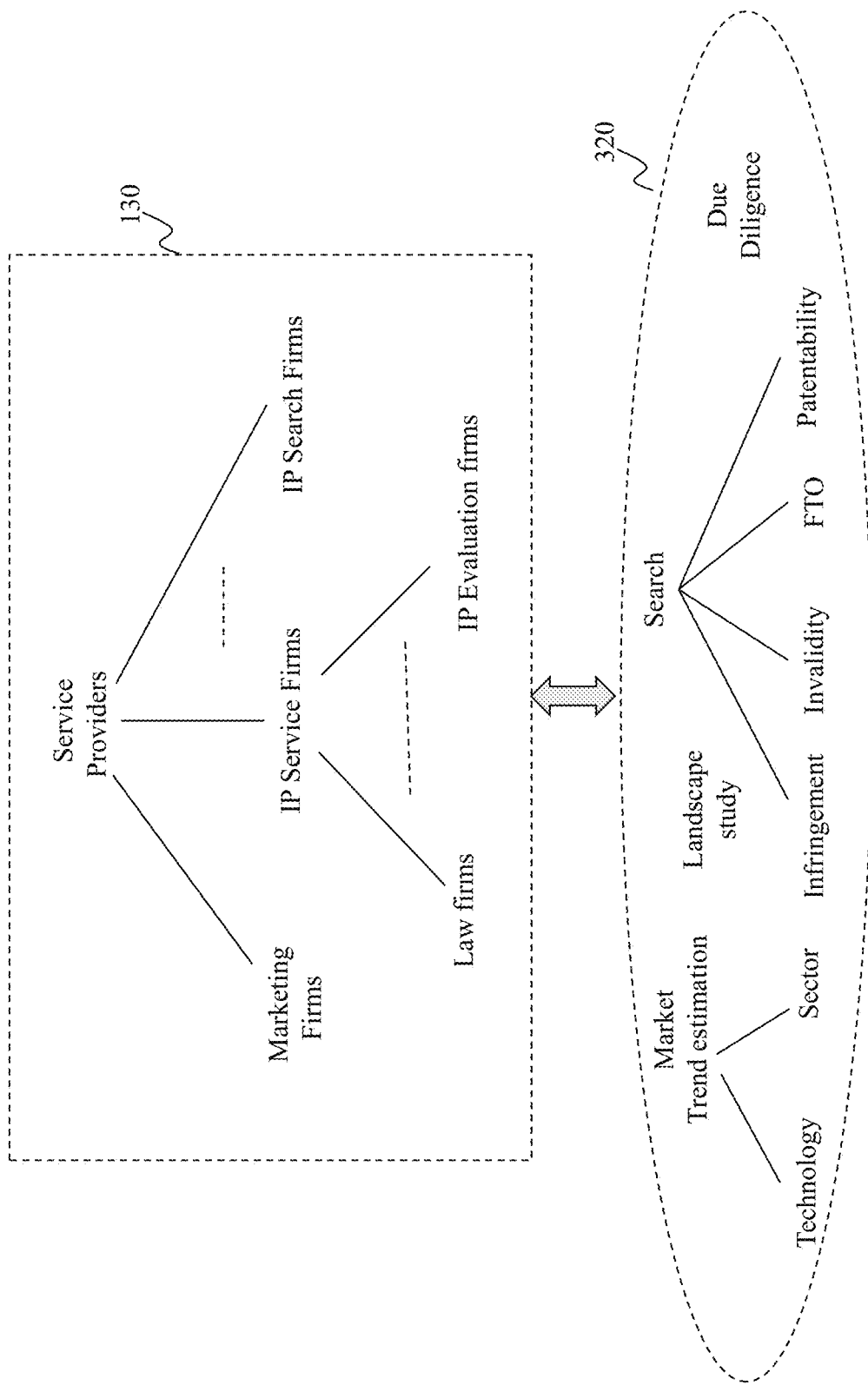

FIG. 3B illustrates different types of service providers 130 and exemplary types of semantic information services 320 that the semantic information server 110 may offer to them, in accordance with an embodiment of the present teaching. In some embodiments, service providers according to the present teaching may include marketing firms, IP service firms, and IP search firms. IP service firms may include law firms and IP evaluation firms. Such business entities may also be facilitated by the semantic information server 110 on various services that are traditionally manual oriented and labor intensive. With semantic information analysis, the semantic information server 110 may achieve the same via AI based technologies. As discussed herein, the semantic information server 110 may be configured to perform landscape study for an IP search firm. In addition to that, it may also perform automatically or semi-automatically different tasks that are traditionally performed manually by humans such as different types of searches, analysis of the search results, and assessment of search results in terms of different objectives such as infringement, invalidity, freedom to operate, and patentability.

In addition to services to search firms, the semantic information server 110 may also offer services that are traditionally performed by law firms, marketing firms, or IP evaluation firms; e.g., business transactions or damage estimation in IP enforcement activities. In business transactions such as merger & acquisition (M&A), conventionally lawyers perform due diligence of a target company based on a DD list (listing aspects of the business for which performance needs to be investigated and confirmed), which can be quite costly. With the capability of the semantic information server 110, such due diligence may also be conducted by machine (the semantic information server 110) by automatically analyzing documents related to different aspects of a target company, identifying the semantics relevant to the deal, and providing due diligence assessment with regard to each of the aspects related to the target. In some embodiments, some service providers may also need the services to obtain estimated market trend, in terms of, e.g., either technologies or industries.

Figure 3C:
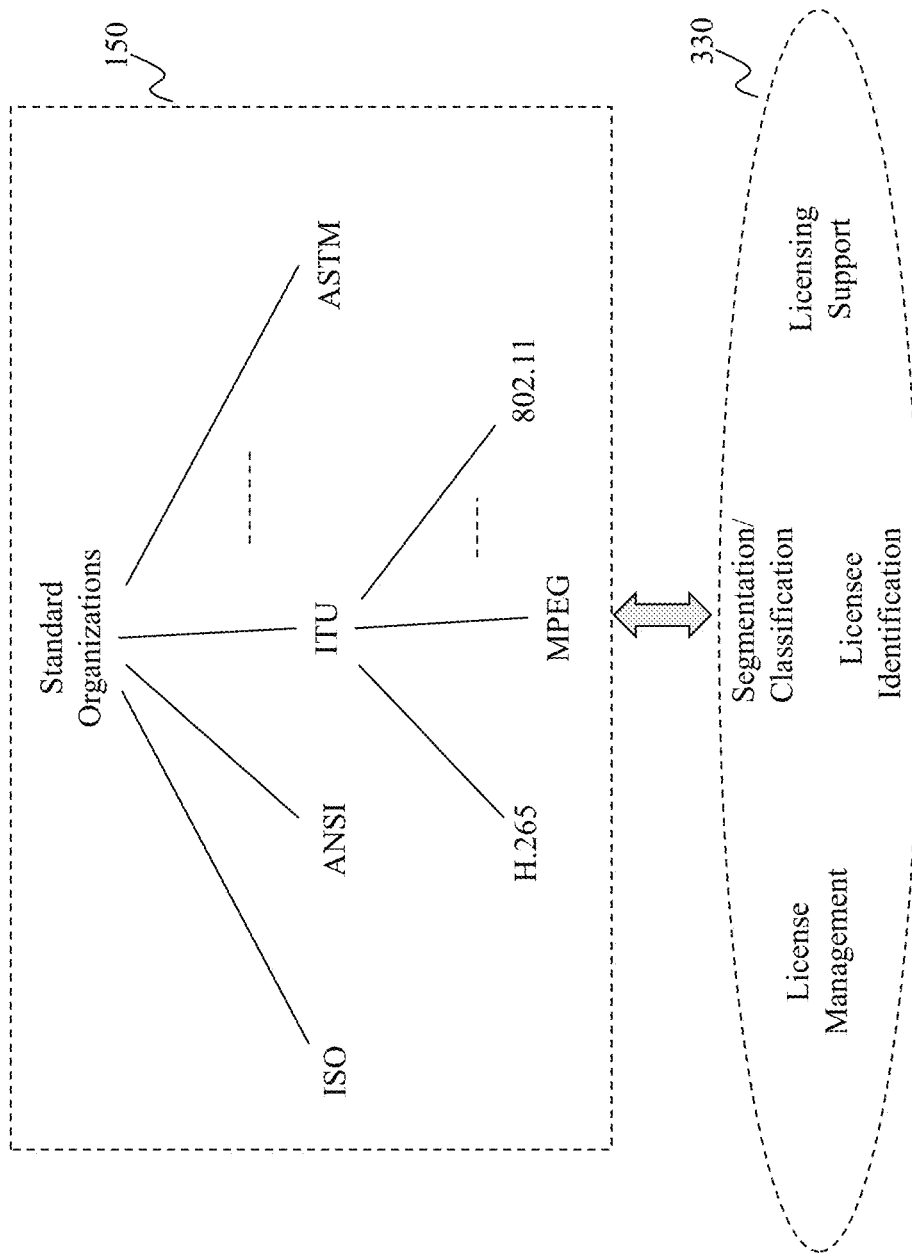

FIG. 3C illustrates that standard organizations 150 receive different types of semantic information services 330 offered by the semantic information server 110, in accordance with an embodiment of the present teaching. As known, there are different standard organizations in the world, such as ISO, ANSI, ITU, and ASTM, each of which may have multiple standard bodies, governing different standards. For example, ITU may include a standard body for H.265 standard, another for MPEG standard, and yet another for 802.11 standard. Each standard is usually related to a certain industry sector and the content of the standard dictates operational parameters associated with products in that industry sector. In most situations, an industry standard governs how an industry product is to be made, how it functions, how different products interface with each other, etc., in order to ensure operability and interoperability. Standard bodies are organized to issue standards, identify IP assets that support the standardized technologies, and manage such IP assets in licensing and optionally enforcement activities.

As a standard is generally a long document, usually involving descriptions of standard technologies to be complied with in different sub-areas, the semantic information server 110 may be used to provide various services based on semantic analysis of the long document. For example, a standard may be segmented based on semantics of the text and each of such segments (concerning semantically distinction technology description) may then be classified into a specific technical domain or a sub-area to form a profile of the standard. Such a profile may be used for, e.g., identifying potential licensees for licensing opportunities by matching the semantics of the standard with marketing materials, white papers, or other documents related to a product or a company that makes the product.

The semantic information server 110 may also offer other services to standard organizations. For example, it may offer services related to licensing support such as automatically generating cease & desist letters to potential licensees and the content of such a letter may be worded based on a degree of match between the standard and textual information about a product or company, determined based on semantic analysis of relevant text information. It may also provide additional services to standard organizations related to license management.

Figure 3D:
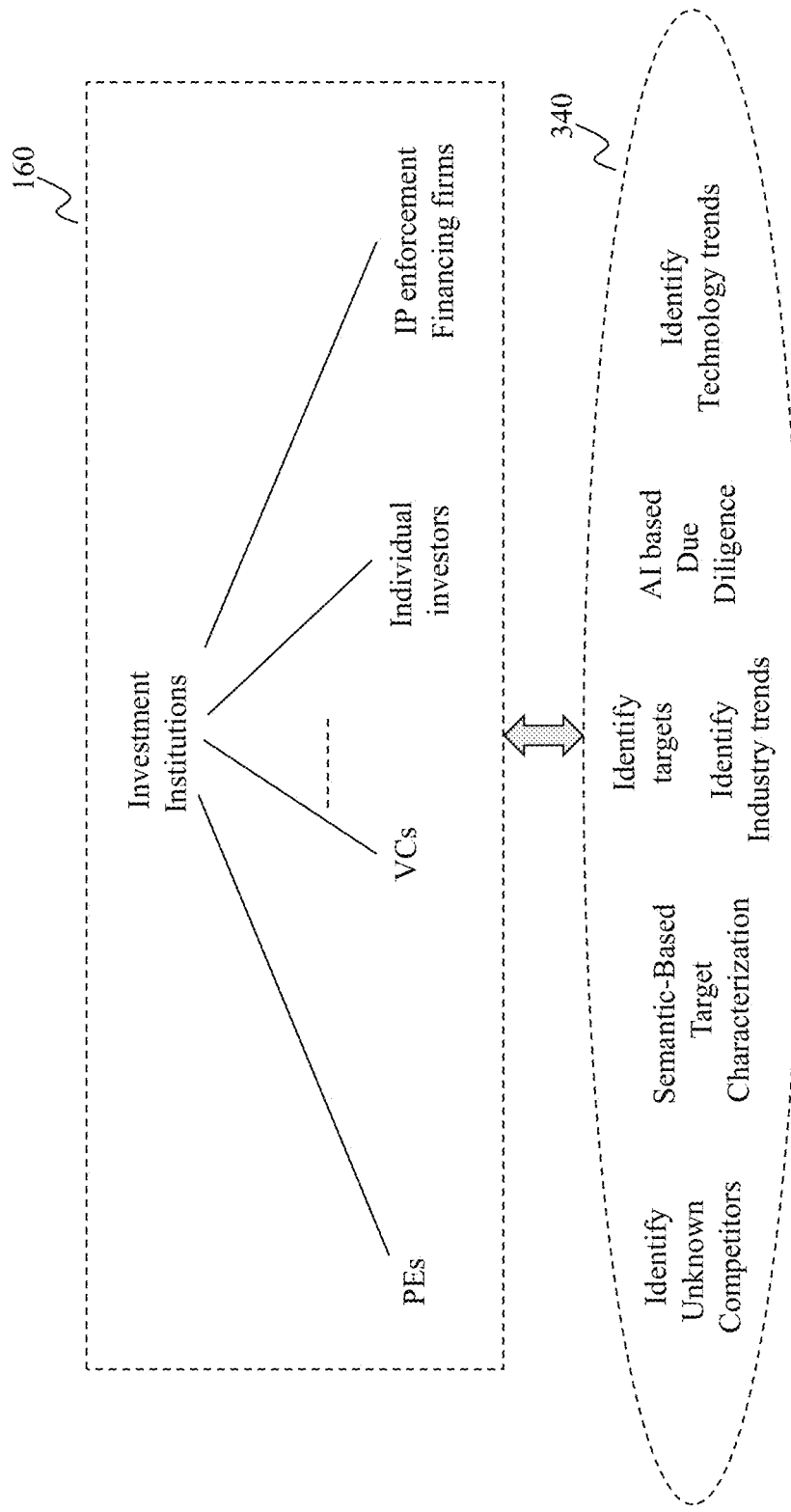

FIG. 3D illustrates that investment institutions 160 receive different types of semantic information services 340 that the semantic information server 110 may offer, in accordance with an embodiment of the present teaching. Investment institutions 160 may include different business entities whose main business goal is to invest money for a gain. This includes, e.g., private equity funds, venture capital firms, individual investors, and IP enforcement financing firms. To serve such users, the semantic information server 110 may offer services to identify companies which may be potential investment targets or competitors thereof, identify trends in technologies and/or industries, semantically model the certain targets, profile certain targets, and optionally perform due diligence, all based on semantics of textual information associated with certain opportunities.

Figure 3E:
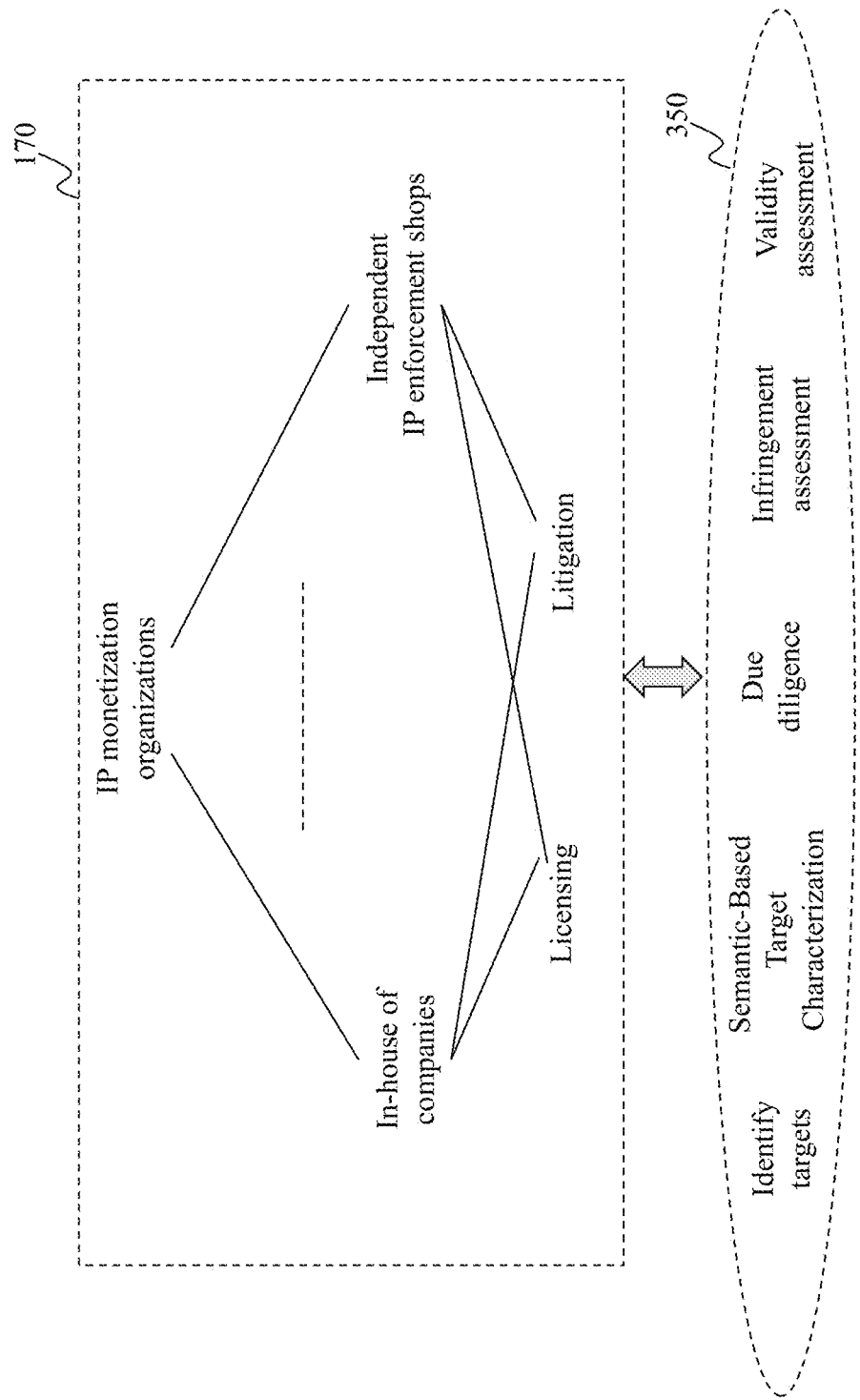

FIG. 3E illustrates that IP monetization organizations 170 receive different types of semantic information services 350 that the semantic information server 110 may offer, in accordance with an embodiment of the present teaching. There are different types of IP monetization organizations, mainly in two categories. One category is companies that own their IP and have an in-house team to monetize the IP assets. For example, Apple, Inc. has its own in-house IP department to enforce its patents. Another category is IP enforcement shops that are independent of companies that created the IP to be monetized. In either situation, enforcement is carried out either via licensing activities or via litigation.

To support such activities, the semantic information server 110 may also provide services via semantic processing of textual information associated with each monetization endeavor. For example, based on semantic analysis of documents related to different targets, the semantic information server 110 may enable IP monetization users to identify monetization targets, to identify infringing products, assessment validity of patents to be enforced, and assessment of other relevant issues as part of due diligence prior to enforcement. In some situations, the semantic information server 110 may also enable the functionality of characterization of a target company to evaluate, e.g., an estimated chance to be successful in monetizing a patent. For example, prior defense information associated with a target may be searched and used to perform semantic based analysis in order to characterize how a target may react to the enforcement and possible defense it may adopt.

Figure 3F:
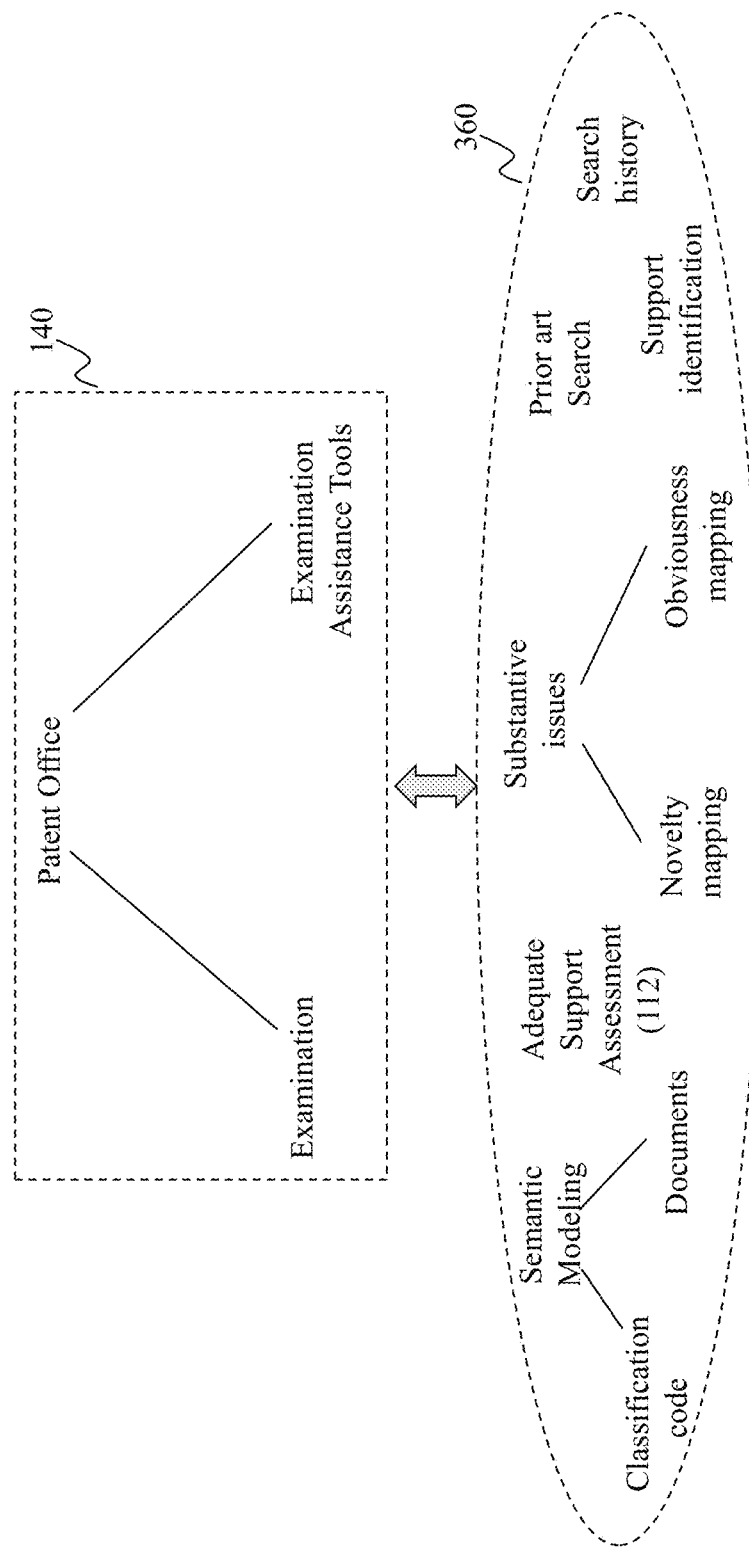

FIG. 3F illustrates that a patent office 140 receives different types of semantic information services 360 that the semantic information server 110 may offer, in accordance with an embodiment of the present teaching. This category of user (or patent offices) may be specially positioned to utilize services that the semantic information server 110 may offer based on semantic analysis of relevant documents. In general, a patent office operates in examinations of patent applications using different examination assistance tools. For example, to facilitate the examination, an examiner needs to conduct prior art search based on claims recited in the patent application being examined. Such prior art search may be performed by the semantic information server 110 based on an understanding of the invention as claimed and then search for documents that are semantically similar to what is recited in claims whose meaning may be understood in light of the specification.

Based on the prior art uncovered based on the semantic meaning of the claims, such prior art may be further analyzed by the semantic information server 110 against the claim elements/limitations. The level of similarity between references of the prior art and the claims may be analyzed and quantified in order to make certain estimation (e.g., novelty or obviousness) based on the legal requirement of the patent law on whether one or more prior art references cover the subject matter recited in the claims. Novelty and/or obviousness related mappings between the prior art and claim limitations may be obtained based on AI based semantic understanding of the prior art. As such mapping is based on semantic understanding of the subject matter claimed/disclosed in the specification of the application being examined and the content of the prior art, such services may be utilized by a patent office to assist examiners to do their job more efficiently.

The semantic information server 110 may also provide other tools to assist examiners. For example, under the patent laws (of different countries, especially of the United States), the subject matters recited in a claim being examined must satisfy certain legal requirements; e.g., the specification must adequately support the claims. That is, the specification must provide a written description sufficiently detailed that it enables a person skilled in the art to practice the invention without undue experimentation. The semantic information server 110 may leverage its semantic processing capabilities to assist identification of, for each claim element, textual support in the specification for the claimed subject matter. In addition, based on such identified support from the specification, it may also assess whether the support satisfies the legal requirement of written description and enablement. In some embodiments, the semantic information server 110 may also utilize its AI based text processing capabilities to identify equivalent disclosure directed to a claim element that is likely deemed as a means-plus-function claim element. Such identified equivalent disclosure may be relevant in both patent examination and in patent enforcement.

In some embodiments, the semantic information server 110 may also provide the means for examiners to perform semantic modeling on certain documents. For instance, a prior art reference (document) or a cluster of prior art references (documents) may be used for modeling semantically on what such documents disclose. In some embodiments, semantic modeling may optionally be applied to documents associated with a given classification code.

FIG. 4 depicts an exemplary network in which the semantic information server 110 is connected to different sources for obtaining relevant textual information in order to provide semantic analysis based services, in accordance with an embodiment of the present teaching. As illustrated, the semantic information server 110 may connect, via the network 120, with different information sources, including but not limited to, various professional databases 420, public information sources 430, private information sources 440, social media platforms 450, and different professional forums 460. The professional databases 420 may include ASME, American Institute of Physics at www.aip.org, American Institute of Chemical Engineers at http://www.a-iche/org, ProQuest at http://www.proquest.com, and Science Direct at http://www.sciencedirect.com.

Information searched from different sources may also be stored by the semantic information server 110 so that it may accumulate relevant information for future use.

Figure 5A:
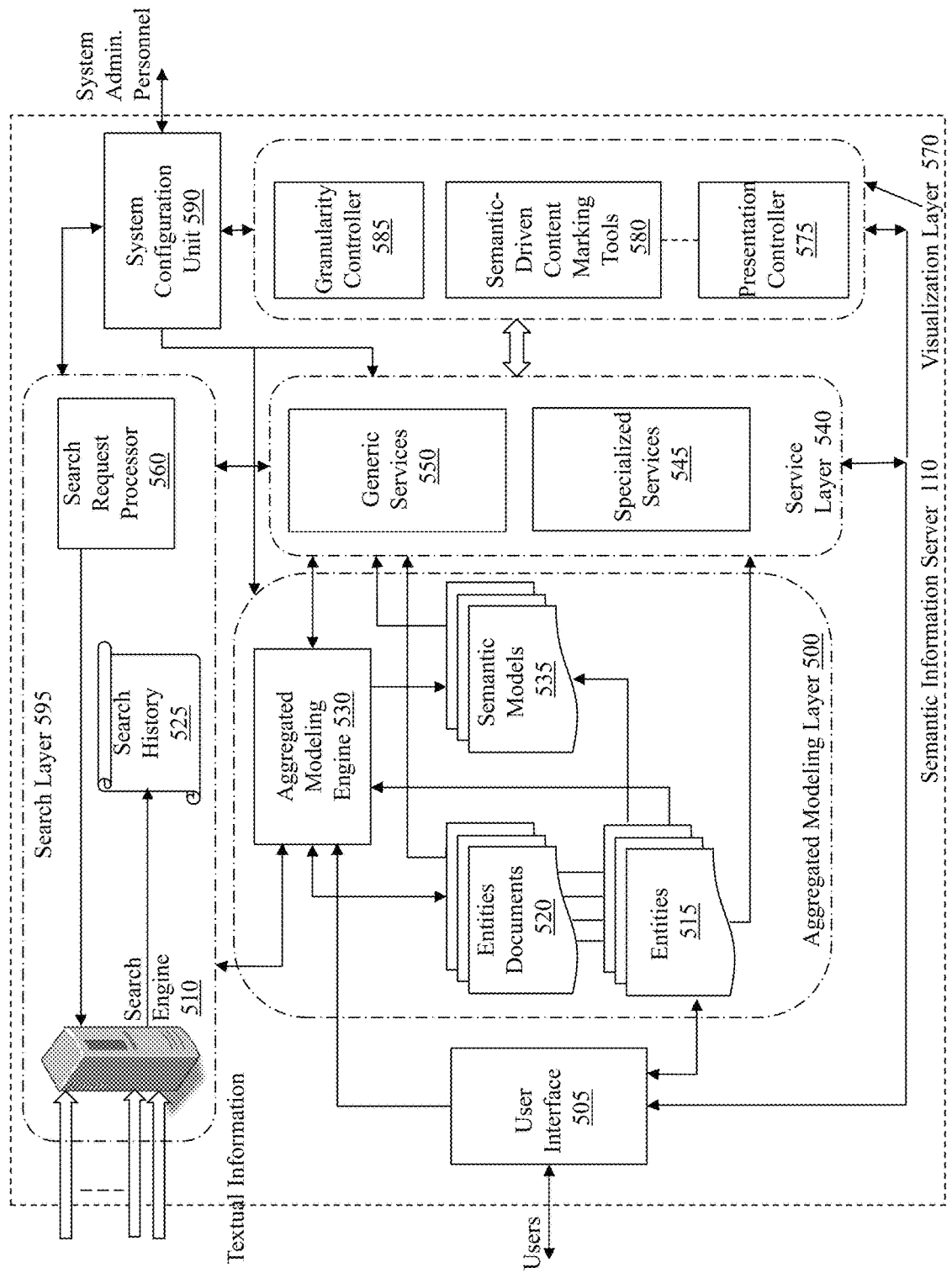
FIG. 5A depicts an exemplary high level system diagram of a semantic information server, in accordance with an embodiment of the present teaching.

FIG. 5A depicts an exemplary high level system diagram of the semantic information server 1100, in accordance with an embodiment of the present teaching. In this illustrated embodiment, the semantic information server 110 is structured to have multiple layers of operation, including an aggregated modeling layer 500, a search layer 595, a service layer 540, and a visualization layer 570. In addition to these layers, the semantic information server 110 may also include a user interface 505 and a system configuration unit 590. The former provides an interfacing channel for the semantic information server 110 to interact with users to receive instructions and parameters for the requested services and serve as a media on which service results from the semantic information server 110 may be presented. The latter is provided to interface between system administration personnel and any of the layers in order to flexibly configure the operations of these layers. In this exemplary architecture, the aggregated modeling layer 500 is provided for operations related to semantic-based modeling of different entities based on textual information associated thereto. In some embodiments, a user may invoke the aggregated modeling engine 530 in the aggregated modeling layer 500 to generate models for certain entities. In some embodiments, the aggregated modeling engine 530 may also be invoked by an application residing in the service layer 540 to generate semantic models for certain entities.

To model an entity, the aggregated modeling engine 530 may invoke the search engine 510 in the search layer to gather textual information from different sources relevant to one or more entities based on a search request formulated based on the entity (or entities) at issue. Such searched information is used to perform modeling of the entities based on semantics of the search result. Similarly, when an application in the service layer 540 needs to invoke the search engine 510 in the search layer to gather relevant textual information, the application sends a request formulated based on the needs relevant to the nature of the service so that the request may be analyzed by the search request processor 560 to generate specific instructions for the search engine 510 to carry out the required search.

In some embodiments, based on semantic models generated for different entities, various applications at the service layer 540 may be invoked in different situations to provide, for different users, respective semantic-based services. In presenting results associated with semantic-based services, information directed to users may be presented in appropriate forms determined based on, e.g., the nature of each application, user specified requirements and parameters, or knowledge learned from past experiences.

As shown in FIG. 5A, the aggregated modeling layer 500 comprises components that are deployed to facilitate aggregated modeling with respect to different designated entities based on textual information searched from different sources. In the illustrated embodiment, the aggregated modeling layer 500 comprises an aggregated modeling engine 530 and various storages for storing, e.g., entities for which semantic modeling is applied and semantic models are derived, entity documents that are related to the entities being semantically modeled, and semantic models derived by the aggregated modeling engine 530 based on textual information (documents) related to the underlying entities.

In this illustrated embodiment, the aggregated modeling layer 500 interfaces with the user interface 505 as well as the search layer 595 in order to carry out the modeling tasks. For instance, via the user interface, information about which entities to be modeled with what parameters (e.g., search scope specified by a range of dates) may be obtained from a user. Such obtained information may then be passed on to the aggregated layer so that the user's request can be carried out. The user interface 505 also serves to interface between a user and other layers. For instance, it may also interface with an application at the service layer 540 and the user to obtain specific requests of the user on, e.g., which application to invoke (e.g., an application to assess the validity of a patent), relevant instructions on the tasks (e.g., a specific patent and the validity with respect to printed documents and support), and/or particular parameters to be used (e.g., a range of dates so that a search for prior art may be restricted and the laws on support from that period to be used to make the assessment).

Figure 5B:
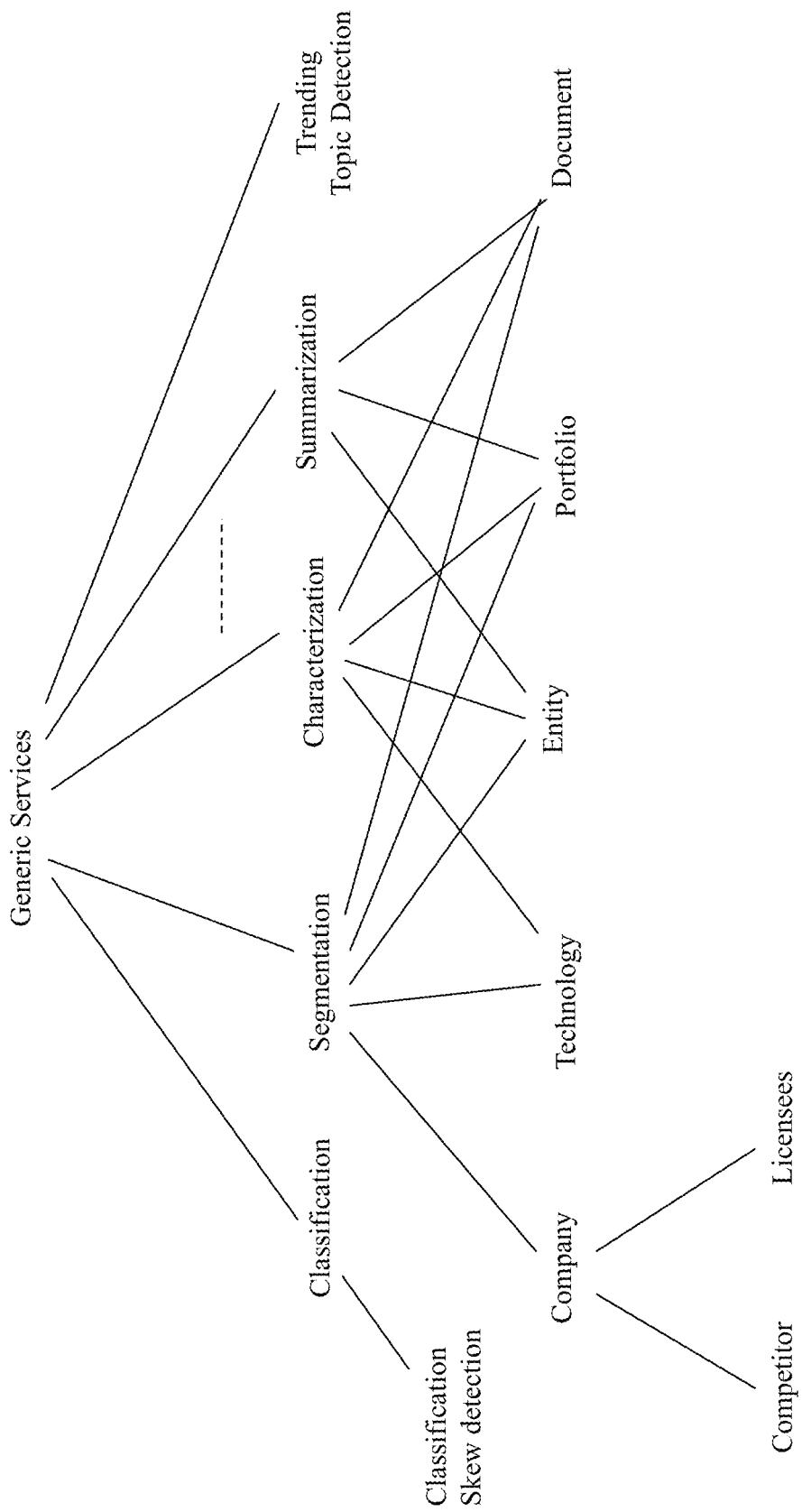
FIG. 5B illustrates exemplary types of generic services enabled based on semantic based information processing, in accordance with an embodiment of the present teaching.
Figure 5C:
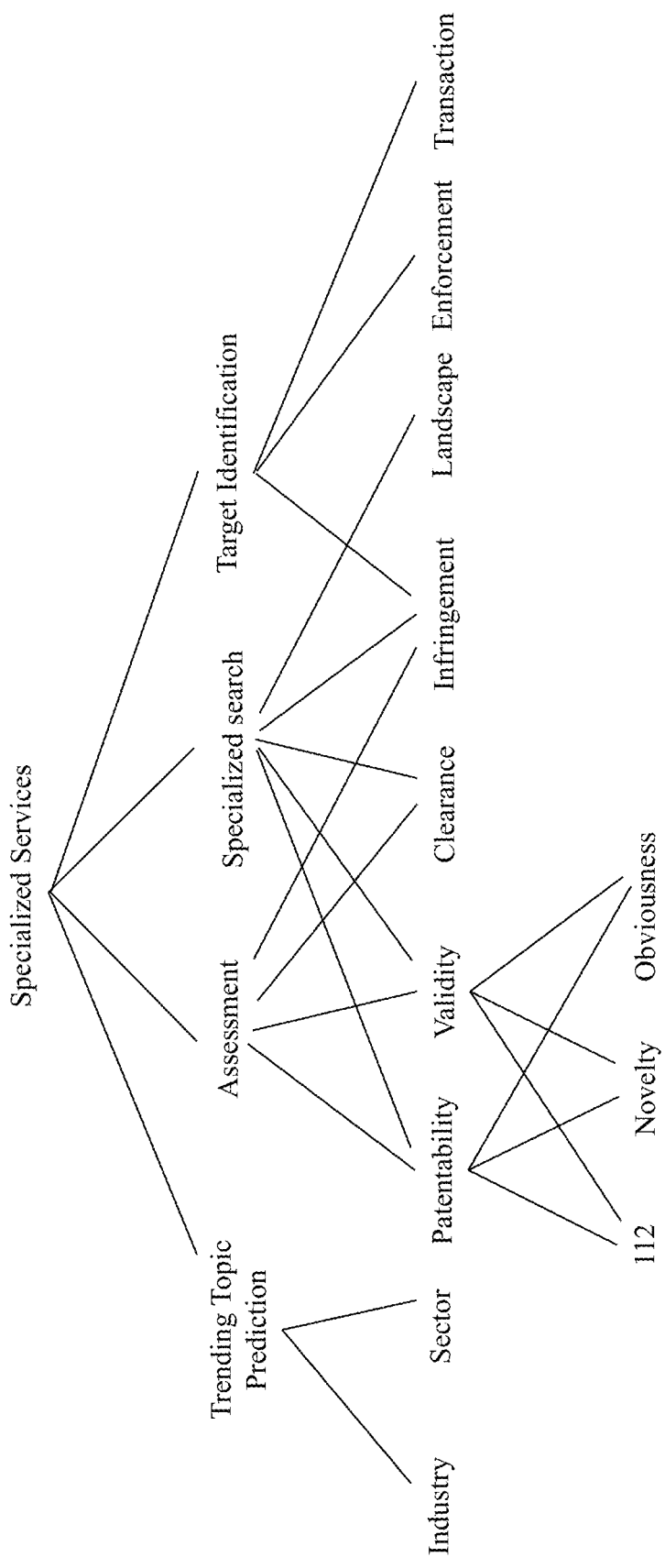
FIG. 5C illustrates exemplary types of special patent related services enabled based on semantic based information processing, in accordance with an embodiment of the present teaching.
Figure 5D:
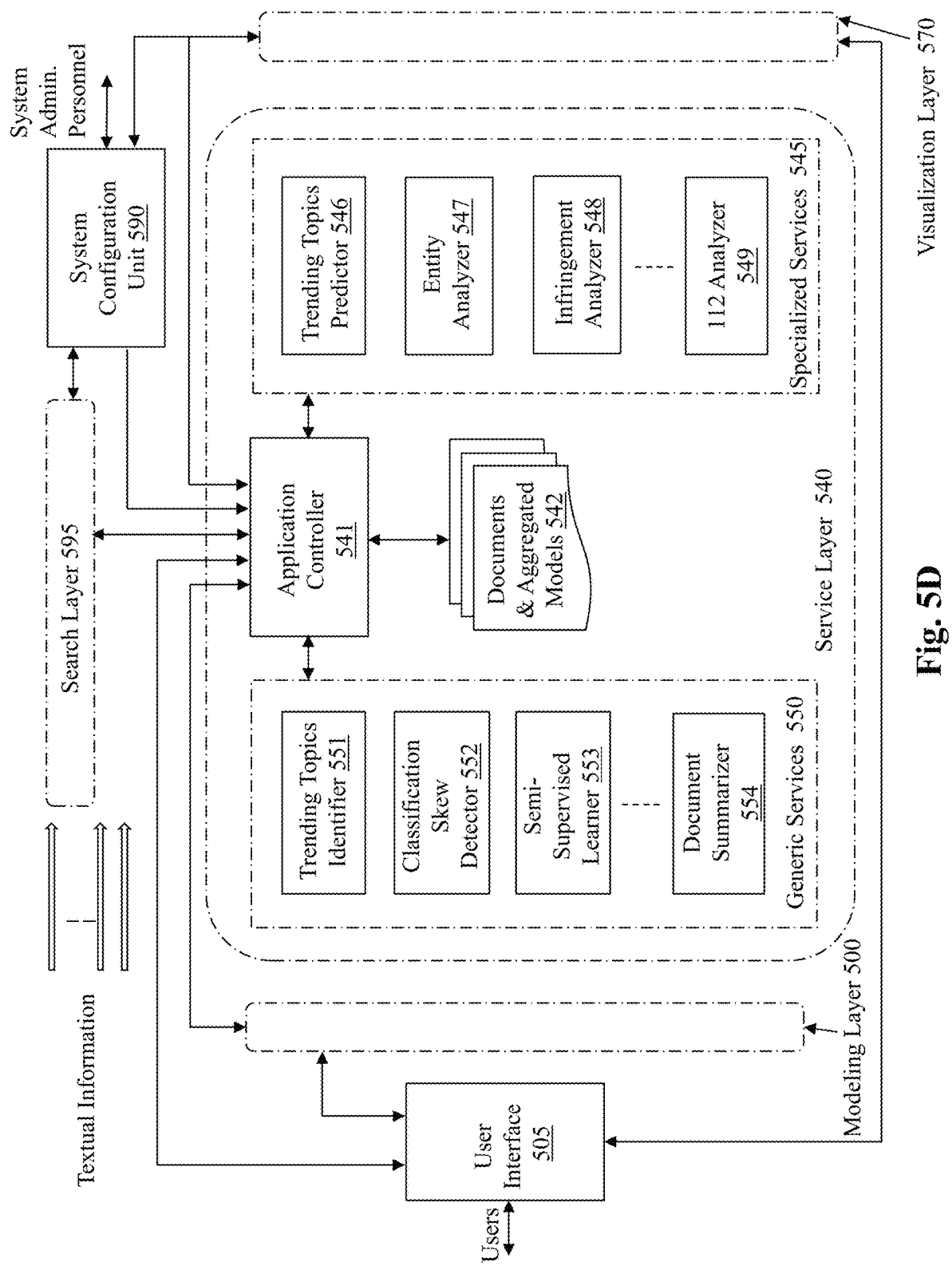
FIG. 5D depicts an exemplary high level system diagram of a service layer in a semantic information server, in accordance with an embodiment of the present teaching.

The interactions between an application in the service layer 540 and the user is depicted in more detail in FIG. 5D, in accordance with an exemplary embodiment of the present teaching. In this embodiment, the service layer 540 includes an application controller 541, that controls the operations of various generic and specialized service applications. In operation, the application controller 541 may receive a request from a user via the user interface 505 and analyze the user request to determine, e.g., which service is to be activated and what data are needed for the selected service. In some embodiments, there may be multiple services that need to be invoked and multiple analyses may be performed on data obtained from those services. In this case, the application controller 541 may invoke the search layer to gather needed documents/data. It may also retrieve certain aggregated semantic models from 535 and save in 542, so that they may be shared by different applications residing on the service layer 540. As shown in FIG. 5D, generic services 550 may include, e.g., a trending topics identifier 551, a classification skew detector 552, a semi-supervised learner 553, and a document summarizer 554. The illustrated embodiment also shows that the specialized services 545 may include, e.g., a trending topics predictor 546, an entity analyzer 547, an infringement analyzer 548, and a 112 analyzer 549.

As shown in FIG. 5A, when an application at the service layer 540, whether a generic or a specialized service, generates an analysis result, the result may be sent to the visualization layer 570 for generating an appropriate presentation in order to be displayed to the user via the user interface 505. Thus, in some embodiments, the user interface 505 may also interface with the visualization layer 570 in a similar way to pass through information in both directions to a user and to a module in the visualization layer 570.

In general, the user interface 505 communicates with a user to receive and present information related to the services that the user subscribes to. Such information includes, e.g., the services the user desires to receive (e.g., semantic-based modeling), one or more targets involved in the services (e.g., either the user company for self-modeling, or other target companies to be modeled), and parameters that should be used to qualify the services (e.g., the cut off year/date used to limit a search, a description of a product for which infringement search is to be carried out, a patent for which an invalidity search is to be done, a description of a product for which a freedom to operate study is to be performed, etc.). Some of the inputs from the user may be stored for different layers to operate. Examples of input to be saved include entities specified to be modeled in the service, which may be the user company/organization or a third party company/organization. For instance, if a user is an investor who desires to invest in a target high tech company, the user may request the semantic information server 110 to characterize the target company via aggregated modeling which may provide useful information on the target relevant to the desired investment.

According to some embodiments, a single unified search box may be presented (alone or in combination with other user elements, e.g., traditional filter lists) in which certain potential strict filters and/or retrieval rank influences may be merged into an unstructured text along with the typical textual query, document and/or company names. Whether to potentially treat company and/or document names semantically or certain potential Boolean syntax operations as filters for reranking or ordering of documents returned from a search may be defined on a per filter basis. Potential Boolean syntax operations may include but are not limited to, e.g., near or adjacency operators (terms occur within certain distances), wildcard operators (leading, trailing, embedded, with or without range limiting), classification filters, etc. Portions of the textual query may be interpreted as indicating the user's intent to restrict the scope of returned documents, e.g., descriptions of dates or literal dates (e.g., "before July 2019", "Jul. 1, 2019", or "on or after Jul. 1, 2019"), may also be treated as filters. Multiple company names may be included in the search for the purpose of comparing and contrasting them, and competitive intelligence analysis can be performed on the result set of the search, i.e., the set of documents returned from a search.

A query parser may be designed to treat certain occurrences, e.g., a wildcard, as a likely implicit selection of a filter, rank influence, or both. Users may be prompted for confirmation via a list of selectable options, or equivalent means, when potential options may be ambiguous (e.g., a discussion of a date as part of an unstructured text description which is not meant to operate as a filter, or if multiple potential filter candidate are identified). This avoids the need to select separate filtering operations through the use of, e.g., a classic syntax button. Although parsing of a search requires additional effort, an advanced user search experience may be sped up by a significant factor, typically with clicks reduced by 2×-4× (depending on how many classes of distinct filters are desired). In an additional embodiment, a Boolean filter search may have synonyms or related concept-cluster terms automatically suggested based on a semantic query, whether via a unified or separate filtering or ranking interface. Suggested alternative Boolean filters may be automatically suggested and pre-populated with number of strictly matching hits, and/or relevancy curves, prior to review of a result set. Such an interface may be combined with options for a semantic or rank-based override of Boolean filters.

In one embodiment, to avoid false detections, and conversely, to ensure inclusion, inclusive and/or exclusive escape characters may be defined and incorporated into the unified search box search (e.g., !{ }! to escape all text within parenthesis from syntax parsing, \s for treat as syntax filter, \sw for treat as syntax and weight more; \\s for no syntax; \\sw for treat as not syntax and no weighting influence; \swl for treat as syntax and weight less [i.e. effectively a semantic weighting "less like" plus an "include" or requirement for this particular text filter]; \swnl for treat as exclude syntax and weight less; Id for treat as date filter; \\d for don't treat as date filter; \c for treat as classification code filter; \cw for treat as classification code weighting; \dw for treat as date weighting; \\dw for don't treat as date weighting; \if for treat as forward citation weighting, \iw for treat as backward citation weighting, \dfw for treat as forward date filter and also influence weighting, \dbw for treat as backwards date filter and also influence weighting, etc., and all variations, and combinations thereof). Escape characters may be, in certain embodiments, defaulted to unconventional or uncommon characters as all or a portion of their string, or even be specified in a different alphabet than the native search, e.g., Unicode Cyrillic instead of English, to prevent any false detection of escape characters. Such atypical to a user characters may be of particular benefit when used on a keyboard with customizable hotkey rows for ease of input, or with a multi-button mouse, touch gesture device, or other customizable input means. Support for escape characters is also togglable to prevent all false detections. Fully automated detection may be optionally combined with use of escape characters.

After the execution, a unified search may have any applied filters or reranking element separately parsed into a secondary interface (e.g., editable or togglable traditional filters or "more/less" like weighting elements). An option may be presented as to whether any such applied filter or ranking element influences either the original search criteria and/or the ranking of retrieval. In the situation where such filters are operating as strict filters, it is not implicit that they should have any retrieval ranking influence. Date filters on a search may optionally, in certain embodiments, influence the degree to which word sense induction (WSI) and/or word sense disambiguation (WSD) (particularly when time-influenced, as in a preferred embodiment) influences retrieval of a document set, by, for example, using identified word senses in the documents included by the date filter compared to senses identified in documents excluded by the date filter, to disambiguate the polysemous words used in the search text. Such a simplified searching user interface (UI) and advanced automated probabilistic parsing methodology is more efficient as compared to expert searchers and makes advanced search filtering more assessable to novice searchers via the automated suggestions.

Referring back to FIG. 5A, a user interacts with the user interface 505 to invoke, manipulate, and control the semantic information service to deliver various semantics based services, including performing semantic modeling on different entities, receiving services related to semantic based analysis and estimates via different applications at the service layer, and even specify different customized visualization schemes desired by each user. We disclose such different aspects of the semantic information server 110 below in detail.

To perform aggregated modeling, based on a specified desired service and parameters provided therefor, the aggregated modeling engine 530 may communicate with the search layer 595 to instruct the search engine 510 to gather textual information related to an entity to be modeled. The aggregated modeling engine 530 may send an instruction or a request to the search layer 595, where the request is analyzed to extract relevant information to be used by the search engine 510 to search for the textual information needed. As discussed herein, example information includes, e.g., parameters to be used to limit the search for textual information relevant to the desired service with respect to the user/specified target(s). The search engine 510 may then search for textual information relevant to the requested service and specified entity from different sources. Such obtained textual information may be provided to the aggregated modeling layer 500 and stored as entity documents in a storage 520 in a manner having, e.g., cross references with the entities stored in storage 515. Textual information may correspond to documents, e.g., patents, patent applications, publications, product descriptions, media articles. When such collected documents are indexed to correspond to one or more entities recorded in 515, such information may be utilized in the future and may be continuously updated with time with less effort. The searches performed by the search engine 510 may be stored in a search history storage 525.

Based on the textual information searched or obtained for a service associated with a user, the aggregated modeling engine 530 accesses the related documents, performs semantic analysis on the documents, and applies aggregated modeling to generate a model for each specified target. The generated aggregated models may then be saved in a storage 535 as semantic models for underlying entities, wherein each of such generated semantic models may be indexed with respect to a corresponding entity recorded in 515 for, e.g., speedy retrieval. As discussed herein, targets that can be modeled via aggregated modeling may include companies, institutions, standards organizations, or associated standards, etc. so that their corresponding semantic models may then be used by different applications at the service layer for further analysis in order to deliver other semantic based service(s) requested.

The search history stored in storage 525 may be used later as well. Recording a user search history may pose some challenges. For example, when conducting an AI-enabled semantic search or a hybrid of semantic, classification, chemical structure, gene sequence, and/or Boolean searches, certain issues are raised in accurately recording the full scope of the search to ascertain completeness. Conventional search related parameters may include search parameters, reference reviewed, count of documents, either absolute or accounting for relevancy ranking and/or actual viewing, etc. According to the present teaching, in addition to using conventional search related parameters, a reversed semantic vector for input text query, including entities, may also be included in the search history. Such a reversed semantic vector may contain a collection of "concepts" searched (e.g., words, word proximities, n-grams, phrases, hyphenated expressions, document signatures) for directly or automatically determined to supplement a search based on some criteria or knowledge. Such knowledge may include a representation learned from, e.g., a neural network, so that the supplement concepts to be used in a search may be generated. This is accomplished by reversing the process of dimensionality reduction of the auto-encoder and then recording the resultant information in a search history file, whether locally stored or cloud-based.

As discussed herein, different applications may provide semantic-based services to users based on results from semantic analysis, modeling, summarization, and characterization. As discussed herein and illustrated in FIG. 5A, applications at the service layer 540 may comprise generic services 550 and specialized services 545. Generic services may refer to those capabilities that may provide common functionalities that serve as the basis of or provide results to facilitate the processing of other applications. FIG. 5B illustrates some exemplary types of generic services, in accordance with an embodiment of the present teaching. Generic services may include segmentation of textual information, classification of textual information, characterization of textual information, summarization of textual information, and detection of trending topics. Different generic functionalities may be applied to different aspects. For example, in the category of classification, a generic service may be provided to detect classification skew. In some embodiments, segmentation may be applied to semantically segment textual information with respect to companies/entities, technologies, semantic search history, portfolios, or documents. For instance, documents (e.g., patents and patent applications) searched in connection with a specific emerging technology field, e.g., autonomous driving, may be segmented into different groups based on, e.g., companies first to generate clusters of documents with each of the clusters being associated with a company active in the field. Each of such cluster may also be further segmented according to sub-technologies to refine the information on what specific technological advancement the associated company is engaged in.

As another example, the generic functionality of characterization may be applied to search results associated with entities (broadly defined as shown in FIG. 2), technology, a specific portfolio, or a document. Characterization of textual information may be generated in different forms, such as semantic feature vectors, a template, or matrices. Such characterization may be performed based on criteria provided by, e.g., a user. For instance, IP information searched in the field of autonomous driving may be characterized based on distribution of patents/patent applications among their owners in different countries to reveal geographical coverage of different companies. Patent portfolios associated with a target company may be characterized based on technical fields that patent assets in such portfolios fall into to see the footprint of the company. One specific form of characterization may be summarization, which may correspond to automatically generated summary of certain textual information. A summarization may be applied to a specific technology (summarize the current state of the art in a specific technological field), a portfolio (technologies patented), or a document (the main content of the document).

Specialized services at the service layer 540 may refer to those that can provide specific estimations or conclusions with respect to different types of entities as shown in FIG.

1 and as detailed in FIGS. 3A-3F. Such specialized services may determine the requested estimations and conclusions based on the processing results from, e.g., the generic services. FIG. 5C illustrates some exemplary categories of specialized services, in accordance with an embodiment of the present teaching. As seen, specialized services may be in the category of trending topic prediction, assessment, specialized search, and target identification. Trending topic prediction differs from trending topic detection. The former is to predict what will be trending in the future given what is known today, while the latter is to detect from existing information what is currently in trend. In the illustrated embodiments, trending topic prediction may be performed with respect to industry or sector. In each service, whether trending topic prediction is to be carried out with respect to an industry or a sector may be specifically defined or specified by a user requesting for the service.

For the specialized search, each user invoking the application may need to specify whether it is a patentability search, a validity search, a freedom to operate search (clearance search), an infringement search, or a landscape search. For each type of specialized search, additional information may need to be obtained from a user requesting the search via, e.g., the user interface 505. For example, for a patentability search, a description of an invention needs to be provided. For a validity search, specific claims to be validated or invalidated may need to be provided. For a clearance search, a product description is required. For an infringement search, a patent and claims need to be specified. For a landscape search, some description of a field of technology is required. Based on user provided information, the application for the specialized search may formulate a search request to be directed to the search layer 595 so that different search parameters in the search request may then be analyzed (by the search request processor 560 and frame a search query using such parameters for the search engine 510 to carry out the needed search.

For the category of assessment service via one of the specialized services, an assessment related semantic based service may be directed to patentability assessment, validity assessment, clearance assessment (FTO), or infringement assessment. Some of such assessment may be performed based on special search result (e.g., patentability, validity, clearance, or infringement search result). Some of the assessment may need to be further directed to sub-directions. For instance, to evaluate the patentability of an invention or claims in a patent application, the assessment may be with respect to some specific legal requirements such as patentability with respect to novelty, obviousness, or support (or 112 issues). Similarly, to evaluate the validity of a claim, the assessment may also be directed to such sub-directions.

Another category is related to target identification, including identifying a target of infringement or enforcement and a target for a business transaction (e.g., merger acquisition). As can be seen, for such specialized services to function, a user may need to specifically define what is to be done, the data required for the applications, and parameters such applications need in order to carry out the tasks within the scope suitable for each request.

Referring back to FIG. 5A, various modules at the visualization layer 570 are provided to allow users to control different aspects related to visualization of information resulted from the services. In this illustrated embodiment, the visualization layer comprises a presentation controller 575 (or control module), semantic driven content marking tools 580, . . . , and a granularity controller 585. Each of these modules provides a means to users to manipulate or control different characteristics associated with visualization of semantics associated with an underlying service. For example, via presentation controller/control module 575, a user may select a specific presentation forum from a plurality of supported schemes for visualizing different aspects of semantics associated with data. For example, the semantics of documents and clusters of documents and the semantic relationships thereof may be visualized as a semantic map in ways that may be controlled or dynamically manipulated by a user or based on the specific semantics detected. Different types of information derived from a set of documents associated with an entity may be presented in certain, e.g., layout or organization, etc. based on user preferences, etc. Documents related to different entities may also be visualized as a tree map which may have nodes of the tree visualized in an arrangement in a manner controlled or manipulatable by a user via the user interface 505.

Via the semantic driven content marking tools 580, a user may also control to selectively mark content that have some designated semantic meaning to the user. For example, certain part of a visualized presentation may be marked in a certain way so that it is visually clear which content portions in the presentation satisfy some given conditions. For instance, a user may specify to highlight portions of a specification of a patent or patent application that support a given claim. In this case, an application that assesses the patentability of a claim of the patent or patent application may identify one or more portions in the specification as the supporting disclosure of the claim. When this result is sent to the visualization layer, such identified portions in the specification that support the claim may be highlighted in a visually meaningful way to assist the user to easily locate the support to the claim. In some embodiments, such marking tools may also be applied to weights computed and visualize such weights in appropriate manner so that the visual effect of the weights may be delivered to the users.

In some embodiments, a user may also manipulate or control the granularity of different visualization schemes. By interfacing the user interface 505, a user may specify the granularity desired in visualization so that such specification may be used by the granularity controller 585 to control how to control the presentation of desired visualization to the user. In this way, a user may dictate the level of granularity by which the visualization is done.

Figure 6:
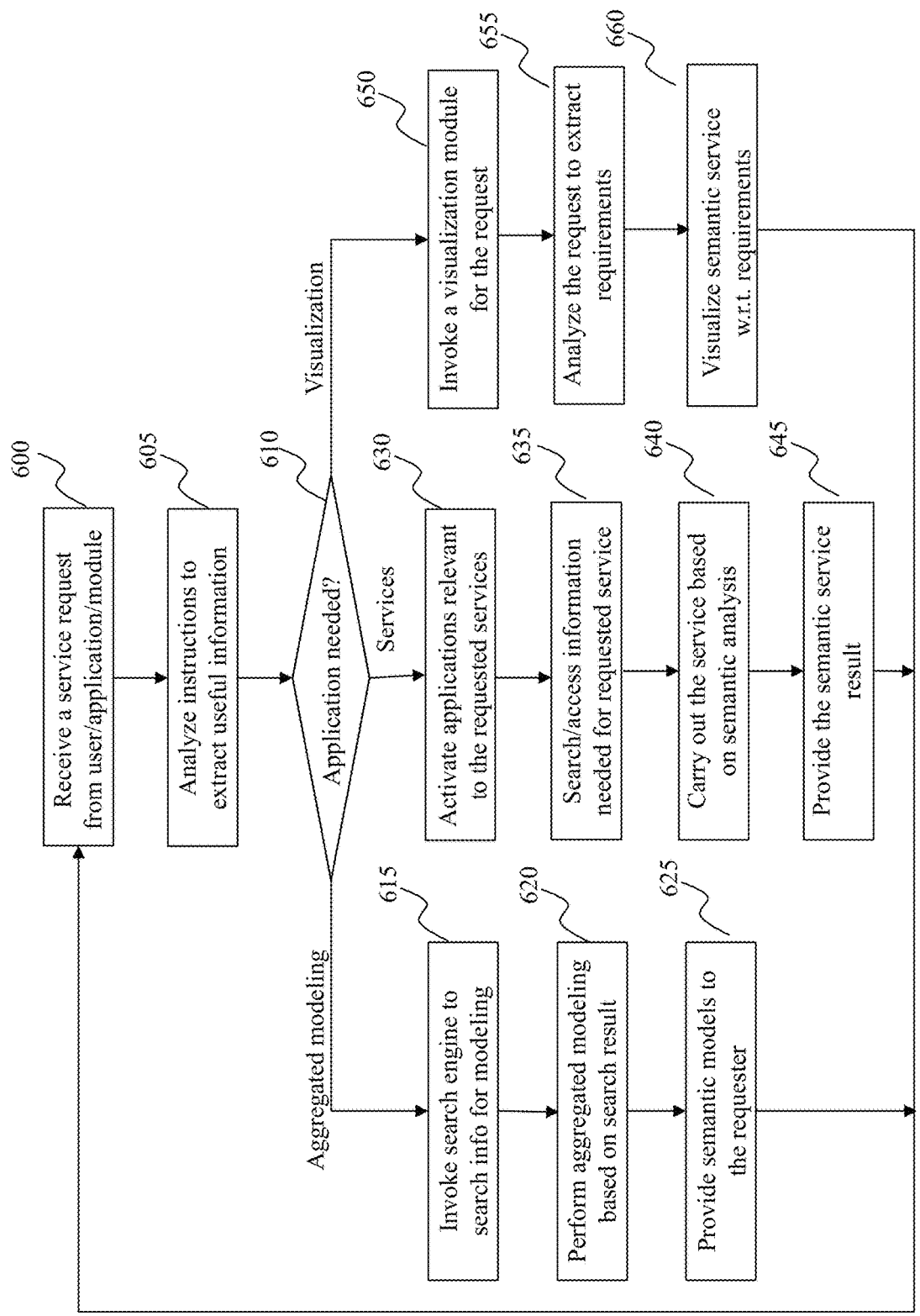
FIG. 6 is a flowchart of an exemplary process of a semantic information server, in accordance with an embodiment of the present teaching.

FIG. 6 is a flowchart of an exemplary high level process of the semantic information server 110, in accordance with an embodiment of the present teaching. A request for a semantic based service is received first at 600. Such a request may be from a user (via the user interface 505), from an application at the service layer 540, or from a module at the visualization layer 570. For instance, a user may request, via user interface 505, to semantically model a target entity via aggregated modeling. A user may also request, via the same interface, a semantic service to, e.g., assess the validity of claims of a patent. Such an application in operation to assess the validity of given claims may also issue a request to, e.g., perform a specialized search on validity and invokes, e.g., the search engine 510 at the search layer 595 to carry out the search based on a formulated search request based on the needs for the requested validity assessment. That is, in this case, the request received at 600 is a request from an application. In some embodiments, the request received at 600 may also be received from a module at the visualization layer 570 (not shown in FIG. 5A). For instance, in order to implement a visualization scheme requested by a user, e.g., presenting the semantic analysis result at a coarser granularity, the module responsible for performing the visualization may request an application to re-analyze the semantics of some data at a coarser level.

Upon receiving the request from a source (a user, an application, or a module), the request may then be analyzed at 605 to extract information relevant to the requested functionality. Based on the extracted information, including the specific functionality requested, different parts of the semantic information server 110 is activated at 610. If the requested service is to semantically model an entity, the aggregated modeling engine 530 is activated and to gather textual information relevant to the entity, the aggregated modeling engine may invoke, at 615, the search engine 510 at the search layer 595 to search for such textual information. Based on searched textual information related to the entity, the aggregated modeling engine 530 may then perform, at 620, the aggregated modeling to generate the requested semantic model for the entity. Such generated semantic model is then provided, at 625, to the requester of the functionality.

If the requested functionality is to be provided by an application at the service layer, one or more applications relevant to the requested service are activated at 630. To perform the requested service, the activated one or more applications may gather information needed for the requested service at 635. This may be done by invoking the search engine 510 to search such needed information or retrieve the information if it is already made available previously (e.g., semantic models for some entities may already be generated previously and can be simply retrieved). Based on such needed information, the invoked applications may then carry out, at 640, the computation based on semantic analysis of the information and generate some semantic service results related to the requested service. In carrying out the requested services, the invoked application may also issue further requests for certain functionalities or information to be provided by other parts of the semantic information server as depicted in FIG. 5A (e.g., aggregated modeling, search at the search layer, other applications, or certain modules at the visualization layer) to gather information needed to provide the requested semantic service results. Such obtained semantic service results are then provided, at 645, to the requester of the service.

If the request for service is related to visualization, an appropriate module at the visualization layer 570 is invoked at 650, which analyzes the request, at 655, to identify relevant information to carry out the requested functionalities and then proceed to visualize, at 660, certain semantic information in accordance with the request. As discussed herein, in implementing the requested service, the module invoked may also further issues additional requests of other functionalities or information (e.g., from an application at the service layer or even the search engine 510 to search for additional information) needed to implement the requested visualization functions.

Once the requested service is completed, whether it is related to generating an aggregated model for one or more entities, a specific semantics based services performed by one or more applications from the service layer, or a visualization scheme used to present certain semantic related information, the semantic information server 110 waits to receive next request and the processing goes back to 600.

Below, various parts of the semantic information server 110 as exemplified in FIG. 5A are discussed in more detail.
Aggregated Modeling and Search As discussed herein, the present teaching is capable of modeling an entity based on semantics extracted from textual information associated with the entity. Such semantic based modeling may be performed in an aggregated manner in accordance with semantic based search of information relevant to the entity and some intended criteria. For instance, a technology company may be semantically modeled based on different types of textual information or documents, including but not limited to, its IP granted in different countries, its pending applications of patents/trademarks/copyrights, its contracts, including sale contracts, agreements related to IP such as licensing or settlements, etc., documents related to its financial standing such as tax returns and investment agreements, etc. Such documents may be classified into different groups, each of which may be analyzed to characterize the company in a corresponding aspect.
Aggregated Modeling of Entities An entity may be modeled in a manner related to a specific role interested. For example, a company may be modeled in accordance with its role as an IP creator, an IP licensor, or an IP licensee. Below, details related to aggregated semantic modeling of an IP related entity are provided.

A semantic model for a document or any textual content, in accordance with an embodiment of the present teaching, comprises a semantic feature vector, which is a higher dimensional vector representation based on unigrams, n-grams, topics, concepts and combination thereof, and a semantic signature, which is a compact vector representation of high level semantics contained in the semantic feature vector. Concepts, which are part of the keyword models derived from textual information, represent meaning that may be defined by multiple related terms. Concepts can be uniquely identified and used as an entry in the semantic feature vector. A semantic model for an entity (such as, a company, government entity, not for profit, or university) may be generated by taking documents, such as patents or patent applications, and clustering them as a variation of word sense induction (WSI). The above-mentioned semantic model may be generated for any entity that can be represented by a set of technical disclosures (patents, patent applications, and other documents, from here on just referred to as "documents") or a technical standard, classification code, or product manual. Long documents like technical standards or product manuals may be subdivided into partial documents. In some embodiments, the semantic model of an entity may, more specifically, include or correspond to one or more semantic pseudo-documents which may comprise at least one semantic feature vector and one semantic signature and thus may be searched and compared with other documents based on words, concepts, and other search operators, as if they were documents. From the perspective of the user of the system, it is not apparent that the entity may be modeled with multiple pseudo-documents, because only the best match for any entity may be shown to the user by the system, if the user is searching for entities.

The pseudo-documents representing the entity can be created by clustering the documents associated with the entity and creating a semantic representation from the weighted set of documents that form a cluster. In other words, the semantic model for a pseudo-document is a mixture model, combining the semantic models of each document associated with that cluster. This makes the system analogous to some word sense induction algorithms; the entity plays the role of the polysemous word, and each identified cluster is then analogous to an induced word sense.

When modeling to represent an entity, it may be beneficial to cluster based on technology or operating space(s), based on semantic modeling of the respective documents. In certain embodiments, cluster centroids for each cluster of documents related to the entity may be modeled in the same feature-space that the documents are using, allowing the cluster centroids to be used as pseudo-documents which can be queried and analyzed in the same manner as other documents.

Any clustering algorithm may be utilized, including without limitation, graph clustering, connectivity clustering, neural models, and/or distribution models. In a preferred embodiment utilizing, at least in part, graph-clustering, the connectedness of graphing segments of a graph comprising vertices and edges, which separate each other, enable segments to be treated as feature-pair links. The edges of the graph are the similarities between the document pairs or document-term pairs (in certain embodiments an asymmetric bi-directional graph). A number of graph clustering algorithms may be applied. However, a key inventive aspect is in the building of a relationship group. How the graph is built impacts computational complexity. A map-reduce framework may be used to divide documents for analysis across different machines (i.e., a parallelizable training process).

Graphs are typically constructed based on individual documents. According to the present teaching, graphs may be constructed based on augmented documents, each of which corresponds to an artificially expanded document with one or more terms, document-term pairs, and document pairs, generated by looking at pairs of similar documents from the same entity within the set. In a situation where document pairs are utilized instead of individual documents, a set of vertices for 50 documents could be expanded from, e.g., 50 vertices to 2500, and would allow a document (such as a patent) to be fractionally included in some or all of the clusters (enabling more accurate technology comparisons between entities or clustering an entity of interest). Alternative to pairs of documents is a pair of an individual document and term(s) in the individual document (e.g., "gesture recognition on a mobile device with a camera" as occurring in a document). In this case a term can be a word, e.g., "gesture", an n-gram, and/or a hyphenated expression, and the corresponding document (which may be represented by a document ID) would be a vertex in a graph. The vertices may also be formed by pairs of documents, for each pair of documents that share a CPC or IPC codes, or other manually assigned classification code.

One way to enhance performance for modeling is not making as many links in the graph for analysis. In the extreme case, one may model an entity solely using individual documents, not pairs. For a very large patent portfolio, by way of example, e.g., IBM or similarly sized top filing entity, a finer grained representation of the clusters may not be necessary. In this situation the entire portfolio may be modeled without any other restrictions, e.g., time. The document alone may be used as vertices to reduce the algorithmic complexity to $O(n)$ instead of $O(n^x)$. Connectivity is less of an issue in terms of computational complexity, but the similarity threshold may be raised to reduce modeling time.

However, document pairing may be used with large data sets subject to computational resource availability. Each document may utilize a top N features within the document for modeling. By utilizing only a top subset of features, which best characterize the document, performance is enhanced. In an embodiment where pair of documents are used to enrich the feature space, a similarity threshold greater than a threshold value is utilized to create a document-pair connection (in some models, such as those using in part cosine similarity, such a value may vary between −1 to 1, or 0-1 when cutting off negatively correlated documents from retrieval between −1 and 0). Any arbitrary value may be used to define the relevancy similarity threshold, e.g., 0.4. Relevancy similarity values may be constant for modeling across all documents or vary based on criteria, such as distribution of concept relevancy, number of concepts, number of documents for a given entity, etc. Via such limits, the pair generation is computationally possible as it reduces the number of vertices.

Defining the weight of the edge is another inventive aspect of this modeling embodiment. In traditional word sense induction, one can use the model itself (co-occurrence data from training of model). However, as in an inventive embodiment, when document pairs or documents are used to generate a company model one may look at cross-similarity of the document or document-pairs from one vertex to one or more other vertices. Pair-wise, each vertex in certain embodiment may be the combination of the two or more documents. Combining or merging two or more vertices and the underlying documents during the clustering process can effectively reduce the computational complexity while ensuring the coverage of technical content during the modeling. This provides an improved strategy as compared with randomly sampling and the merged vertices, i.e., pseudo documents, add one or more levels of abstraction of the technologies, which can be fed into other applications, e.g., the semantic map, tree map, etc. This may ensure a more complete coverage of the technologies of large companies where the large number of documents potentially exceeds the technical limit of certain applications. For term-document pairs, a combination of a key concept with a document is utilized as in the aforementioned gesture example but may also be subject to a boost weight on one term by a defined amount. As long as there are at least two documents to model, it may be beneficial to use supplemental of pairs of documents to get the vertices, unless the computational resources available exceeds the costs based on algorithmic complexity. When an entity has thousands of documents, it is likely to have enough information to cluster the documents with a linear complexity algorithm.

However, if a user desires to do an analysis based on date restriction of a large entity for modeling, one may want to switch to pairs of document approach (even if they have a large number of documents for modeling). Date restriction may in certain embodiments, be enabled in a flexible matter by building an indexed search model on-the-fly, i.e., not pre-indexed, if an entity and a date filter are used in a query, because the model can be built when it is queried. In certain embodiments date may be a factor within the graph clustering algorithm itself, to separate out technology areas by date. In this embodiment, one may have a date on each of the cluster topics. Effectively, this is a fuzzy date-range date comprising a date range and a deviation on the date range. Date overlap score may be associated with filters for search. When using date as an input to the cluster, factors such as looking at the number of documents in each cluster, comparing the dates to topic clusters, and according for span across time, may impact the hardness of segmentation. In certain embodiments, edge weights may be multiplied by date closeness. The computation of the edge weights is a measure of the semantic similarity based at least in part on how the vertex is created (e.g., if the edge weight is constructed from the similarity of two inputs it may impact the cluster formation, and date influence in cluster may cause a hard separation). For patents, simple and/or extended families may be used as a natural date-based clustering and time-span measurement, or priority date, publishing date, or issue date may be used directly in certain embodiments. For non-patent literature, dates which are available, such as pre-publication date, conference date, publication date, or versioning/revision dates of documents may be utilized. When utilizing a pair-wise document embodiment, two discrete times or a time-range can be associated with a given vertex.

Automated sampling or filtering, particularly for entities with a large volume of relevant information, is a critical aspect of a company name-based modeling and search, as is the ability to focus by date, topic, and other relevant semantic weighting and/or Boolean filters to influencing sample and/or retrieval. Company acquisitions, mergers, divestments, and assignment changes may be treated differently and/or separately, and market or sector newsfeeds may be incorporated into the user interface or used in modeling. Sampling size for large entities, may be a challenge, because of the number of distinct technologies. The present teaching discloses an approach called sampling using diversity ranking, which corresponds to a soft or fuzzy de-duplication method. With this method, for each relevant document, scores of semantically similar documents with lower relevance scores can be reduced further based on a function of the semantic similarity among such documents.

The sampling or filtering may occur on an active patent and/or pending patent application data set globally, however it may also be restricted to certain jurisdictions and/or entity or entities (i.e., given portfolio) when coupled with a company number or a defined list of potentially relevant patents and/or patent applications. Any defined and taggable dataset, such as an arbitrary collection of documents, whether via user specified or linked via included metadata, e.g., company name, may be used as the basis of modeling as a single entity with a plurality of senses. Such methodology may assist in determining the relevant quantities of standards essential patents owned by a particular entity as a percentage of a whole pool.

In addition to a company name, a standard, e.g., IEEE 802.11ax or Wi-Fi 6, a product manual and associated documents, may be modeled in a similar manner, in order to automatically segment its contents and perform a fair, reasonable, and non-discriminatory terms (FRAND) analysis to ascertain standard essential patents when using a standard number as an input. The preferred indexing and modeling may depend on the length of the document, e.g., standard, and how many independent features do you want to identify. For example, at a length of 10 or more pages, just modeling as a single level container of feature(s) may be inadequate because too many distinct concepts exist, and therefore identification of key sections may be used to model each section distinctly, enabling sub-section matching against the long document. Document entropy of the semantic feature vector, the number of words, and existing boundaries in the document (e.g., number of chapters/sections), or similar criteria, may inform the granularity of the division for modeling. This represents a trade-off between obtaining high quality partial matches (for documents which are split to a greater degree for modeling) vs. weak matches across topics (for documents which are split to a lesser degree for modeling). In certain embodiments, a document may be uploaded by a user for modeling and indexing, and the criteria for splitting the document may be adjusted via user interface, in other embodiments such criteria for splitting may be solely based on automated inferences based on, at least in part, the aforementioned criteria for division for modeling or known equivalents.

The aggregated semantic modeling may also be used to characterize a set of documents defined based on, e.g., a classification code. For example, the USPTO may classify patents/patent applications in different technological fields based on its classification code. Documents categorized under each classification code may be used to perform aggregated semantic modeling.

In some embodiments, this method may be used to model certain areas in a classification schema. To generate a model of a particular classification area, one may pseudo-randomly sample documents in a class or use all documents in a class, either across all time or in a defined range, at a defined level of granularity, to build a graph-based aggregated entity model (as disclosed herein) for the classification codes based on the contents of the class. The desired granularity could be a subclass, subgroup, or a syntactically defined ranges of related classification codes. Optionally, this representation may be biased using fuzzy date ranges to influence edge weighting as disclosed herein. An aggregated representation of the classification code may be used as a query to retrieve closely related documents.

The semantic modeling as disclosed herein may also be used to semantically characterize an arbitrary set of documents created by, e.g., a user. Such a set of documents may be search results resulted from one or multiple queries, a user identified portfolio(s) of documents, a user created portfolio by selecting documents from a user interface such as the result list, a semantic map, a tree map, etc. Semantic modeling as disclosed herein may also be used to semantically characterize some particular portions of a document in aggregated modeling, e.g., claims or a specific portion of the specification of a patent.

In some embodiments, the result of semantic modeling of an entity or an arbitrary set of documents can be represented by concept clusters, which are similar to concept-based aggregation of documents in entity model. For each company, documents are reduced to aggregated technology clusters. Each cluster has an aggregated semantic feature vector and a semantic signature representation, which can be indexed and searched efficiently. In certain embodiments, the number of semantic feature vectors and/or dimensions of such semantic feature vectors may vary from company to company (e.g., typically, such variance may be apparent based on size of company, or number of distinct technology clusters for a given size). In certain embodiments, constraints may be introduced into the modeling process as to the maximum or minimum quantity of distinct feature vectors to be modeled based on one or more defined criteria (e.g., comparison to a global distribution, size of company portfolio, variance of classification codes, etc.). In certain embodiments, concept clusters for an entity may be formed hierarchically. This may be due to the merge of multiple vertices in the modeling process, which results in a set of clusters at multiple semantic levels each representing a certain technology at certain semantic levels.

Some entity may correspond to an aggregated one with one or more entities. For example, a company may have multiple subsidiaries (entities) involving multiple technologies and products, each of which may be represented by one or more semantic signature vectors and semantic feature vectors. According to the present teaching, an aggregated entity may be represented by a directed graph of nodes, where the nodes represent entities and edges represent relationships among entities. For example, a parent company A "owns" child companies B and C. Child company B "owns" multiple technologies represented by patent or trade secret documents. Child company C "owns" also multiple technologies represented by a set of patent documents and multiple products each in turn being represented by product documents. Technologies owned by a company may be further organized hierarchically within the company.

Figure 7A:
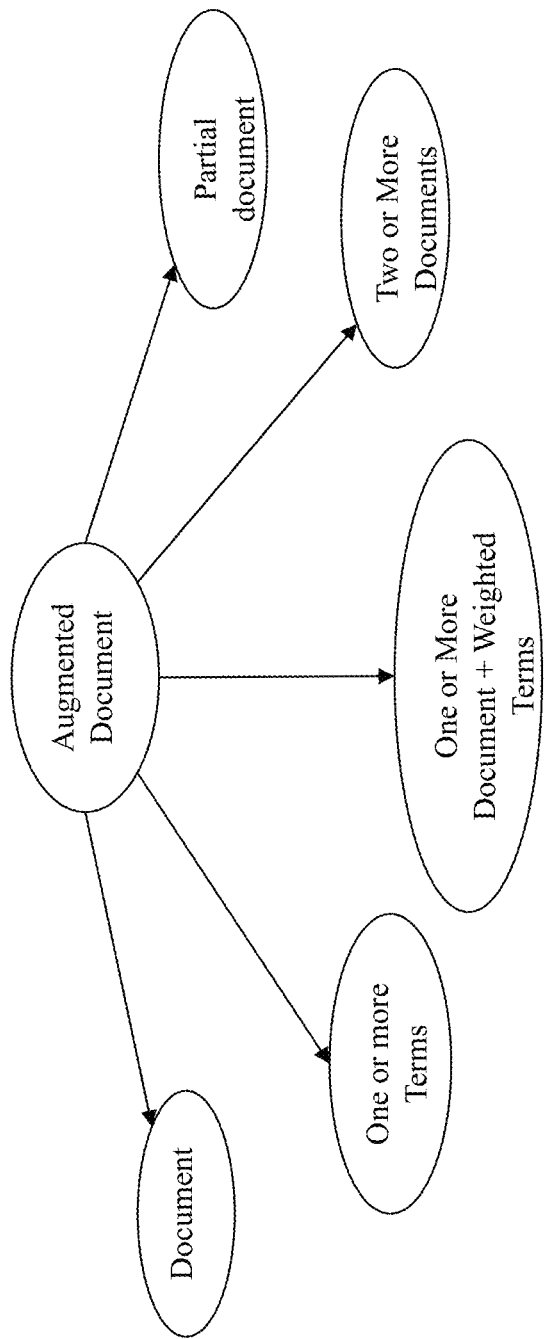
FIG. 7A shows exemplary types of Augmented Documents (AD), in accordance with an embodiment of the present teaching.

FIG. 7A depicts exemplary types of augmented documents, in accordance with some embodiments of the present teaching. As discussed herein, augmented documents can be created from documents related to an entity. Based on original individual documents related to an entity as an initial set of augmented documents, augmented documents can be created therefrom based on one or more terms selected from such documents, document-term pairs, two or more documents as discussed herein. According to this definition, documents created from multiple augmented documents are still augmented documents. Terms added to a document to form an augmented document may include concepts represented by a set of related terms which may not be in the original document.

Augmented documents can also be created from partial documents which may correspond to portions of long technical documents (e.g., product manuals or standards) such as sections, chapters, sub-sections, or segments derived using other criteria such as semantic boundaries recognized using various techniques. These augmented documents, optionally with various sampling, filtering, or selection processes, may then be used in clustering for modeling the entity. In graph clustering as disclosed herein, augmented documents may be represented as vertices in the graphs.

Figure 7B:
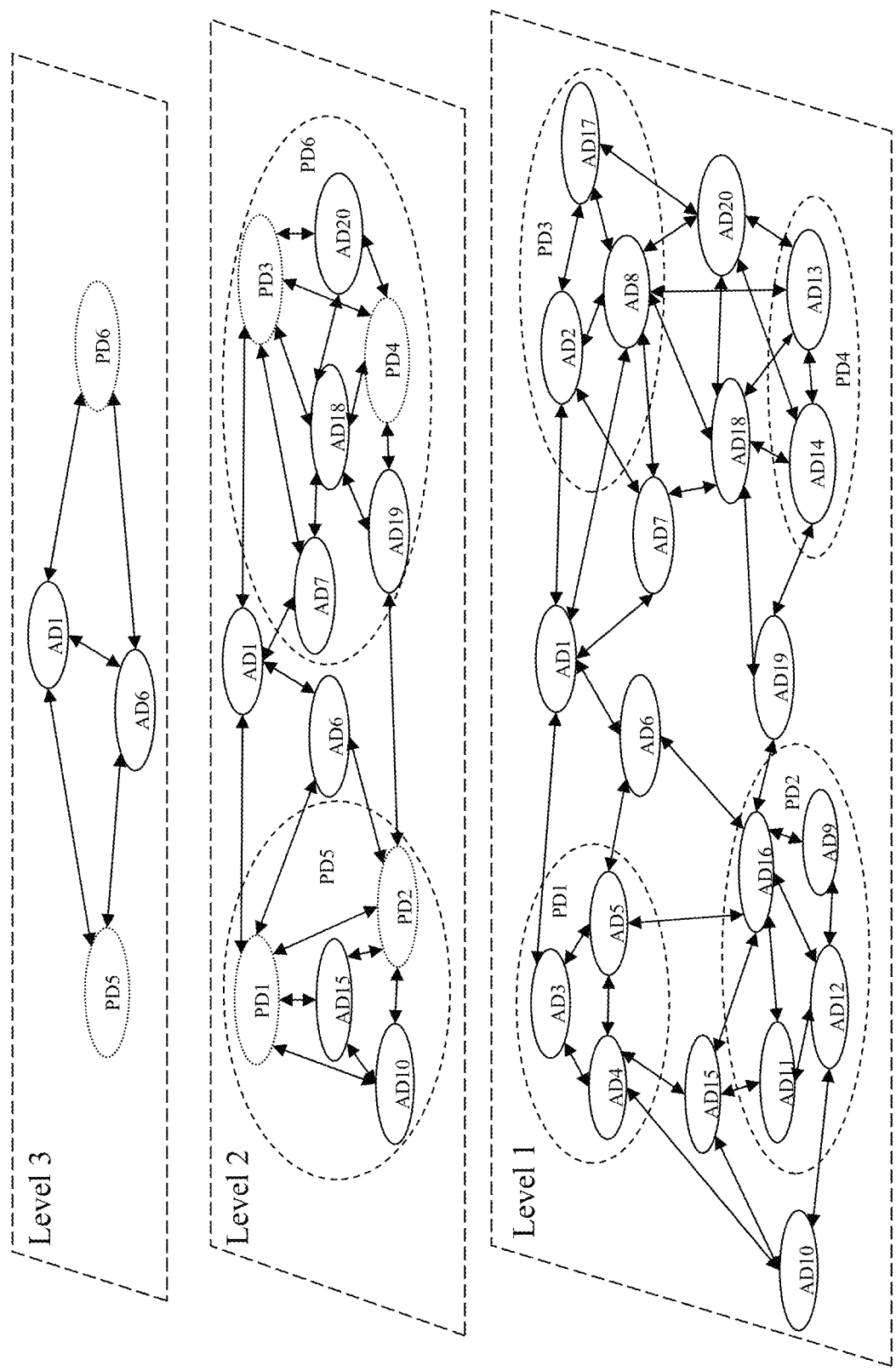
FIG. 7B depicts an example of entity modeling based on the graph clustering, in accordance with an embodiment of the present teaching.

FIG. 7B depicts an exemplary scheme for entity modeling via hierarchical graph clustering with multiple levels, in accordance with an embodiment of the present teaching. In this illustration, each vertex represents an augmented document, which can be of any type as described in FIG. 7A. The edges in the graph are represented based on semantic similarities between vertices as shown at Level 1 in FIG. 7B. As shown, closely related vertices such as AD3, AD4 and AD5 are grouped as a cluster shown as a dotted eclipse. Thus, a pseudo document PD1 is created based on the semantic models of the augmented document AD3, AD4 and AD5. Similarly, pseudo document PD2, PD3 and PD4 are created from corresponding clusters of augmented documents. In FIG. 7B, starting from Level 2, vertices of the resulting graphs also include pseudo documents of clusters, which in fact are special cases of augmented documents. As the hierarchical clustering process continues, more augmented documents and/or pseudo documents are grouped into clusters and further pseudo documents are formed for those clusters until some specified clustering criteria are satisfied. The resulting clusters, some of which may contain only one augmented document, and the corresponding pseudo document models form the representation of the entity.

Figure 7C:
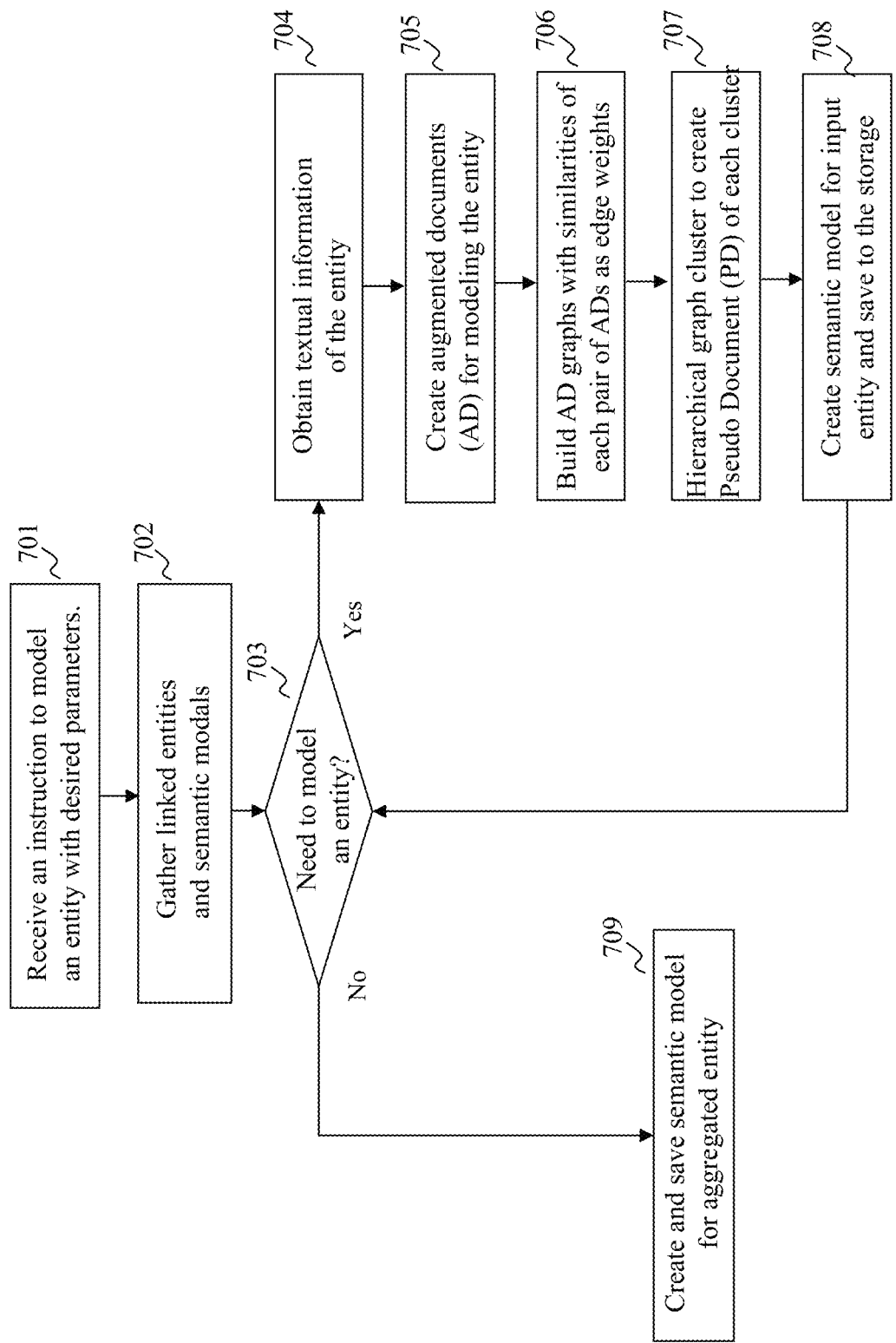
FIG. 7C is a flowchart of an exemplary process for modeling an entity, in accordance with an embodiment of the present teaching.

FIG. 7C is a flowchart of an exemplary workflow for modeling an inputted entity, in accordance with an embodiment of the present teaching. As discussed herein, an entity can be a company, a standard, or a product, etc., represented by a document collection. After receiving an identification of an entity (e.g., a name) and specified parameters for modeling the entity at 701, the aggregated modeling engine 530 checks the entity structure information in corporate tree and/or other information sources to see whether it has any linked entities and whether any aggregated models have already been previously created and saved in the storage at 702. If aggregated model needs to be generated for either the entity specified or a linked entity at 703, then go to 704 to gather textual documents for the entity that meet criteria such as the time and/or sampling requirement(s). The augmented documents are then created at 705 based on the gathered documents. For example, this may include creating augmented documents from individual documents, terms, document-term pairs, or document pairs for entities with an initial set of documents, creating augmented documents based on documents and/or document segments, and/or creating augmented documents from two or more documents. Entities with too many documents may use only augmented documents created from two or more documents in the modeling to reduce computational complexity.

The resulted augmented documents may then be used to create graphs, at 706, that have augmented documents as vertices and similarities between each pair of augmented documents as the weights of edges that connect the two vertices representing the pair of augmented documents. The weights may be biased based on the classification, patent families, specific, or fuzzy dates restrictions and other desired modeling parameters. Based on the graphs, a hierarchical graph clustering process may be carried out at 707 to create a pseudo document for each cluster formed at each respective level. Each pseudo document may be used to replace the cluster of augmented documents it represents and as such it becomes a vertex of the graph with updated weights on edges connecting to others. Such an updated graph may then be used for hierarchical clustering at the next level. The clustering process continues at the next level until requirements for desired modeling parameters are satisfied. Information about pseudo documents created for each cluster as well as their positions in the cluster hierarch is saved, at 708, in the semantic models storage 535 with respect to the entity.

Upon completing the semantic modeling for an entity at 708, the process goes back to 703 to check whether there is any other entity that needs to be modeled. If the inputted entity has other linked entities to be modeled, the steps 704-708 are repeated to generate aggregated models for such linked entities. The process continues until all entities (initial and linked) have been modeled. When the aggregated models for all the linked entities have been generated, the aggregated model for the inputted entity can be generated at 709 based on the aggregated models of the linked entities. The entity structure is then saved in the semantic models storage 535.

Search of Entities

Upon entities being modeled and indexed, they can be used to identify similar entities based on entity based search. In some embodiments, to identify similar companies of a company given in a query, a weighted search may be performed by comparing the modeled features of the company with that of other companies to identify matches. As discussed herein, such modeled features may include a set of semantic feature vectors and corresponding semantic signatures, e.g., 5 semantic feature vectors and corresponding semantic signatures, where each semantic feature vector and its corresponding semantic signature represent a technology cluster aggregation of an underlying company being modeled. In some embodiments, the comparison may be configured to be at any, some, or all technology levels associated with an entity. A query that supports weighting across different topic areas or technologies, may be combined with keyword text search, using the same underlying modeling (i.e., searching for "Google" is similar to a search engine as a semantic "and" operation with weighting, that represents "more like" 'Google' technology clusters).

By modeling an entity (name) as a semantic representation of multiple technologies, the present invention is capable of performing a partial match between a query entity and other entities. For example, an entity may match another entity with respect to some aspect of these entities, e.g., with respect to a particular technological space, even though both entities may also be engaged in other non-overlapping technological areas. The present teaching as discussed herein is also capable of providing explanation as to why the entities are related by, e.g., pointing to patents from the related company which are most closely related to the company in question. Documents associated with the matched company can be grouped or deduped by technologies at any selected level (e.g., a best matching level) and drilled down to individual documents as needed. The search results can be specifically influenced by the search parameters specified. For example, any text or document modifiers (in certain embodiments, although name-only search is suitable for a landscape analysis) specified may have direct impact on search results. Therefore, one may search competitors, potential partners, or licensees by searching, e.g., "Google related to RADAR or LIDAR within past 5 years", as well as incorporating (if needed) filters based on properties of the company (e.g., market cap less than X, more than Y patents). Note that the searching as supported by the present teaching is capable of facilitating the ability to search relationships between multiple aggregated document collections that are modeled separately.

A semantic search leveraging result ranking via artificial intelligence may typically be based on a textual description of a query (reflecting an intent of what to look for) or a different means of specifying what to look for, such as a document (e.g., a patent represented by a patent number). Such a search may also allow a user to express a variety of means to indicate weighting criteria and options. For instance, textual description such as "more like" and/or "less like" expressed via a natural language, document identifiers, as well as traditional filtering options (e.g., classification code, Boolean text or date filters, regular expression matching, or other syntactical filtering operations) may all be utilized to specify the parameters to be applied to the search. However, such types of searching are typically restricted to a particular narrow area of interest delineated by the aforementioned search parameters. In contrast, when reviewing a portfolio of a company, a product of a company, a standard of a standard body, a person or an inventor, a university, or another entity, the relevant information is much more diverse and may include a variety types of information such as technical literature, patents, patent applications, webpages, or any other class of information. The search result is most typically specified manually by a unique numerical identifier, e.g., Digital Object Identifier (DOI) number, Uniform Resource Identifier (URL), patent or patent application number, etc. and optionally queried thereafter by the aforementioned methods. Alternatively or additionally, in a traditional competitive intelligence or technology-based and/or name-based company search, a company may be searched by matching all of its legal entities (e.g., subsidiaries and acquisitions) between the parent company and patent assignees. Inventive embodiments disclosed herein can match current assignees to prior inventive activity by tracking changes across time since original assignment to present, and correlating such activity to market data, e.g., acquisition, divestment, subsidiary, stock price or other market performance fluctuations, e.g., changes in R&D expenditures, gross or net income, revenue, sector-specific activities/market trends.

The present invention, according to one embodiment, enables a new methodology of semantic modeling whereby a semantic signature can be generated to capture a full range of characteristics of a company as a whole based on diverse types of information and/or concepts associated with a plurality of related entities (subsidiaries, acquisition, co-assignees, etc.) and/or concepts (technologies, products, etc.). This is in direct contrast with the traditional characterization of a single or small set of conceptually related (whether specifically relevant and/or irrelevant) documents with respect to a specific technology. This further enables new user interaction methodologies such as one-click semantic company search, or comparison between one or more companies, or intracompany (e.g., parent vs. subsidiaries) semantically using company name(s) as a primary semantic input.

Further, company properties may be shown in certain embodiments, in a related column the list of recent acquisitions, divestments, financial statements, etc. In order to link such targeted news (relevant to the particular search) to the semantically searched data set, a corresponding news release index is generated, and returned within the context to the main query. The news release index may be stored alongside the search indices in a single database, or may be accessed via a separate database, or a third-party database. Certain information may be tracked from, e.g., patent data from a primary database (e.g., assignment changes), while the market source information is indexed as additional data, which may be separately searched as market events.

An overlay with a correlation of events/topic areas may then be compared to other AI visualizations, e.g., semantic or tree mapping, and displayed in certain embodiments in a manner which is specific to the current state of user navigation within such an AI visualization (via, e.g., a dynamically updating sidebar responsive to filtering, focusing, and navigation elements, e.g., lasso selection). Any pre-tagged data set may be grouped and treated as an entity for purposes of enabling a name-based search across its different concept senses.

Fine-grained user control of weighting parameters is achievable in an inventive embodiment, such as specifying weighting algorithms, or whether to incorporate certain metrics, e.g., claim bias, abstract focus, citations (forwards and/or backwards), date, etc., whether to treat particular words as phrases and, for particular words or phrases, or document ids, what weights to assign. Semantic "and" as well as semantic "or" have the ability to engage in probabilistic matching and treat clauses of a command specially, such as specifying one or more of a plurality of weighting algorithms (e.g., mean, weighted averages, etc.). Entity-specific citations may also be a weighting influencer (e.g., "any forward citations with particular emphasis to Microsoft, Google (if any)" vs. patent(s) from XYZ corporation).

In one embodiment, the entities are indexed ahead of time to build the entity company models (based on, e.g., current assignee), however in certain embodiments this is not done on a global data set, for performance. The portfolio, in certain embodiments, is searched and indexed at query time. While it may be computationally intensive, in other embodiments, a global model of data outside of a given company may be used to create a standard, and to create a semantic signature for long documents. This may help with conceptual segmentation, and the standard signature may be used for comparative purposes.

In one embodiment, the result set of the entity-based search is a list of entities ranked by the portfolio similarities between the company in the query and the companies retrieved. In one embodiment, the portfolio similarity between any two companies can be computed based on the number of technologies matched above certain thresholds between the two companies or weighted match of the technologies normalized by the technologies owned by each company. Detailed matching documents of each entity in the result set can be drilled down further. Entities in the result set can be chosen by the user via the UI to create a new portfolio for further visualization and competitive analysis, e.g., related documents of the chosen entities can be plotted in the layered semantic map, or a tree map can be generated for the chosen result set and use entities as filters.

Some embodiments may leverage a unified search model comprising a mix of semantic signature and keyword models for ascertaining document relevance. Some embodiments may utilize a dimensionality reduction via, e.g., an auto-encoder and neural network during modeling and training. Embodiments disclosed herein are compatible with retrieval of a result which may incorporate multiple or arbitrary combinations of methodologies into result retrieval ranking or scoring of each document or a set of documents, e.g., user ranking, user tagging, date ranking, citation ranking, term frequency inverse document frequency (tf-idf) cosine similarity, link analysis algorithms with numerical weightings, distance between code vectors generated by a neural network, Kullback-Leibler divergence (or any relative entropy measurement). Scores may be cut-off at any arbitrary point between, e.g., interval [−1, 1], interval [0, 1], etc. Inventive embodiments are compatible with scores which are converted to another more user-friendly scoring metric, e.g., semantic "relevancy" star ranking 1-5 stars. This may be achieved by assignment cut-off groupings, e.g., interval [0, 0.2] is 1-star to 5-star [0.8, 1]. Some embodiments may model solely based on an unsupervised deep learning approaches, while others may utilize semi-supervised learning or supervised learning approaches, either alone or in combination with additional models.

Figure 8:
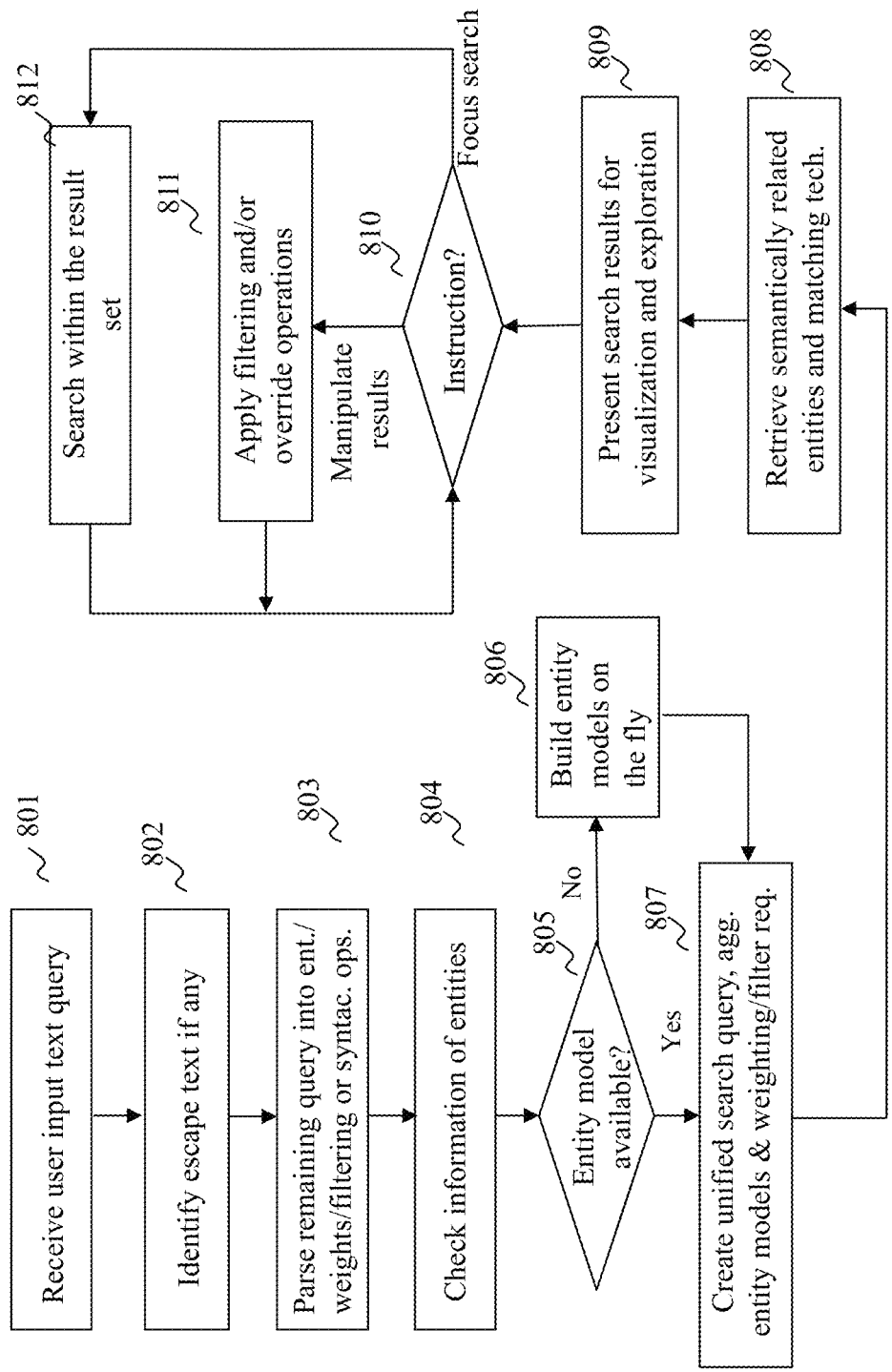
FIG. 8 is a flowchart of an exemplary process for unified search, in accordance with an embodiment of the present teaching.

FIG. 8 is a flowchart of an exemplary process for using the probabilistic parser and unified search box, in accordance with an exemplary embodiment of the present teaching. A user input query is received at 801 which may include one or more entity names, optionally dates or other parsable information, e.g., a standard of interest. Any escape character syntax in the query is identified at 802 which requires treatment of one or more particular portions of the input in a pre-defined manner. Remaining query components are probabilistically parsed into segments of one or more words, phrases, or related concepts which can be interpreted semantically either as a base query or a weight, e.g., aggregated models with a filtering or syntactical operation, and recorded to memory and/or storage media at 803. Related entities and available aggregated models associated with the entities are identified at 804, and optionally traverse market intelligence data, such as corporate tree, market newsfeed, to include in modeling/retrieval. If the entities do not have pre-calculated semantic models, determined at 805, then the aggregated models are generated on-the-fly at 806, which may follow the similar workflow as depicted in FIG. 7C to dynamically generate semantic models for entities and save in the storage. If semantic models for the entities are previously generated, such aggregated entity models are retrieved and used to build, at 807, a unified query based on the escaped text, the aggregated models, and/or any weighting and filtering requirements in the query. In aggregated entity modeling of a company, technologies modeled based on document collections can be treated similarly as multiple senses of a concept when building the semantic query for the unified search. For example, the technologies of the company represented as aggregated semantic feature vectors and semantic signatures may be weighted or selected based on the topics in the escaped text. At 808, the entity-based search is performed based on the query and relevant entities with matched technologies or products associated with the entity are identified. The search results are presented, at 809, to a user via an interactive interface, e.g., the Dynamic Plug-in Widget Framework (illustrated in FIGS. 19A-19O) for visualizing and further exploration of the result set. In some embodiments, the interface may provide an option to override one or more system configurations on treatment of at least one term as semantic versus filtering or syntactical. The interactive user interface may receive further instructions at 810. Upon receiving user instructions, the interface may proceed to override, at 811, the system configuration based on semantic distance for any syntactical or filtering operations accordingly. Query may be further modified at 812 to provide more focused search within the result set and create a more focused result set.

The search history may, in certain embodiments, be stored, e.g., within a database such as relational databases, ACID (Atomicity, Consistency, Isolation, Durability) compliant databases, non-ACID compliant databases, in connection with e.g., Extensible Markup Language (XML) files or binary files, whether locally and/or cloud stored. Search history may also be shared among applications (whether software-as-a-service [SaaS] and/or fat/local clients) and users. In certain embodiments, different classes of users may have access to additional functions or interfaces for, e.g., quality control. For instance, a quality reviewer or a supervisor may need to review a search history and sign off on when the quality (such as the completeness) of a search history satisfies certain criteria. In this case, an interactive interface may be used to present such users in a reviewer profile including, e.g., a list of references reviewed, time spent reviewing each reference, searchable reversed semantic vector representations, searchable classification code list reviewed. In some embodiments, a semantic vector may be reversed by going through an auto encoder (that captures residual terms involved in dimensionality reduction in a certain dimension) to accomplish the reversal. A reversed semantic vector, particularly given the effects of auto-encoding and optional automatic concept supplementation, has the potential to be a "noisy" representation of data, which may not particularly prone to intuitive review by a human. Thus, the reversed semantic vector may be clustered into related concepts and presented in a searchable fashion to the user via conceptual proximity in order to create a ranked list with an indication of word clustering and/or visualization techniques (such as k-means clustering, or t-SNE visualization) employed. Any potential gaps may be automatically flagged as, e.g., missed common cross-classification. Such suggestions may or may not be visible to a user with a different class of permissions, for the purposes of, e.g., enabling an optional quality review or audit.

In certain embodiments, AI-based and traditional criteria used by a search engine to perform a retrieval may be optionally included in a search history. Such information may include weighted keywords, triggered keywords, and concepts (including n-grams), and reversed semantic vectors as disclosed above. As discussed herein, a reversed semantic vector may be derived based on a representation of data in a lower dimensional space associated with a document or an entity. Such a representation in a lower dimensional space may be subject to some information loss. Conversion into a form that is more human-readable form (e.g., without an unstructured output) may be achieved by capturing residual terms and clustering thereof for display or recording purposes. For each search query, user-selectable options used to combine Boolean and AI-enabled methodologies to generate a unified hybrid search history include, but are not limited to:

- A current timestamp and user/session
- Different target content sources
- A natural language query along with its modifiers and weights thereof
- Boolean filters with target fields, values, and combination thereof
- Query limitations such as thresholds used for relevance determinations
- Combination used on results such as entity based grouping, technology based deduping, and any de-duplication and/or preferred document display rules
- Overflows which may occur when using broad Boolean filter pattern matches (e.g., "truncation")
- The sort order applied to the output (for example, oldest, newest, or most relevant)
- The count of documents discovered
- Weighted keywords and/or entities determined based on the query
- Keywords and/or concepts added by the language models
- A human-readable representation of the baseline semantic vector
- Information related to disambiguation associated with a WSI/WSD process
- The relevancy curve associated with the query result and/or attributes of the curve (e.g., slope/derivative(s))
- Terms related to concepts identified from the result set
- Classification codes identified from the result set with counts
- Model(s) applied, selected either automatically or by a user
- Identifying numbers for some retrieved documents A preferred embodiment may store such information in a database so that it is searchable, filterable, and accessible as, e.g., a list ordered/ranked by different criteria, e.g., by relevance, by timestamp, or by other user-defined ranking criteria. Such information may also be stored in combination with a visualization methodology employed as discussed herein. Once stored, such information may also be made exportable to another program (such as a spreadsheet program (e.g., Microsoft Excel®), or other formats, e.g., Microsoft Word®, Adobe Acrobat®/PDF).

Figure 9:
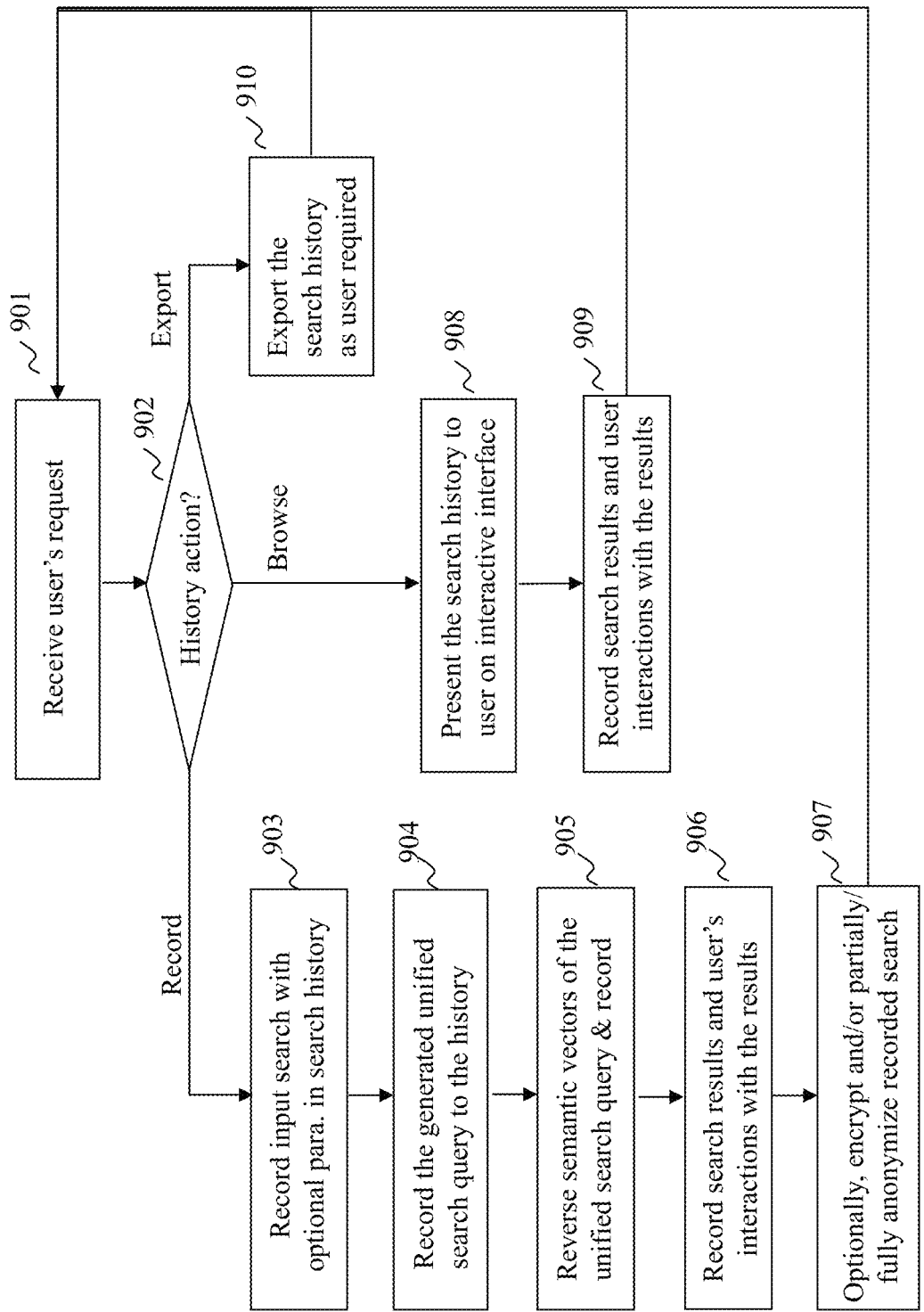
FIG. 9 is a flowchart of an exemplary process for creating an interactive AI search history, in accordance with an embodiment of the present teaching.

FIG. 9 is an example workflow for using a reversed semantic vector to create an interactive AI search history, in accordance with an exemplary embodiment of the present teaching. A user request is received at 901 and used to determine, at 902, whether any action related to the search history is needed. If the user request corresponds to a query for search, the process proceeds to 903 to record the search request from the user in a history memory (can be a file on disk), including, e.g., a unique identifier and/or certain search parameters. A unified search query may also be generated from user's request and recorded, at 904, to the history associated with the search request. If the generated unified search query includes a semantic portion, a "reversed" semantic vector may be computed, at 905, by reconstructing a dimensionality reduction based on, e.g., an auto-encoder, to capture additional terms and/or residual terms. Such resultant terms as well as other information related to the "reversing" operation may also be stored. Reversing operations may involve, e.g., words, word proximities, n-grams, phrases, hyphenated expressions, document signatures of the history associated with the recorded inputted search. The search results and user's interactions with such results (e.g., documents previewed, reviewed, and the time of such activities) are recorded at 906.

Optionally, the recorded search, including information from prior steps, e.g., any metadata and the results of reversing the semantic vector may be encrypted or anonymized (partially or fully) at 907.

If the user request is for browsing a search history, determined at 902, the process proceeds to 908 and the search history is presented to the user via an interactive interface. The presented search history may also optionally be made searchable, which includes searchable on the search history and any result of reversing the semantic vector(s) to present an AI supplemented search history. The search history may also be presented to a user in a manner that facilitate user interactions with the presented search history. The system may optionally record, at 909, user interactions with the presented search history as part of the search history. At any point, the search history (or a portion thereof) may be exported, at 910 per a request of the user, to another program, e.g., Adobe® PDF or Microsoft® Excel, such as a listing of some portion of any result of reversing semantic vector(s).

Services

As discussed herein, models that semantically characterize entities and are generated by the aggregated modeling engine 530 at the aggregated modeling layer 500 are stored in the semantic models storage 535 and are then used by different applications at the service layer 540 to carry out different tasks. As depicted in FIGS. 5B-5C, both generic services 550 and specialized services 545 may be invoked to accomplish various tasks and some may rely on models or semantic characterizations of certain entities. For example, an application for generic services may provide semantic information services for, e.g., trending topic identification, summarization of documents and pseudo-documents, classification of documents, and classification skew detection. The semantic analysis results from such generic services may be further utilized by specialized services to derive additional semantic-based analytical results. Below, details related to some exemplary generic services are discussed.

Generic Services

A "trending topic" of the present teaching refers to any topic embedded in documents that is more popular than other topics. Such a topic may be represented by term(s), phrase(s), or concept(s) identified from the underlying documents that are relevant to the topic. The "popularity" may be measured based on some metrics, such as the distribution rate of documents in that topic as compared with that of the entire set of documents over a set period of time. For example, the distribution rate of documents on topic "COVID-19" may be significantly higher than an average distribution rate of the documents of the entire document set and, hence, the topic "COVID-19" is considered as a trending topic. As such, if a result set has a bias toward recent documents, then it may not be sufficient for a term to have the same bias to be identified as a trend. Any terms which show a pronounced difference from a background model and where this difference does not appear to be random noise may be identified as trending. Therefore, the trending function could be said to have low frequency, i.e., it changes steadily over time, however the shape of the curve is not important in this context. Documents involved in trending topic identification and visualization thereof may selectively include pseudo documents generated for each technology at certain levels for entities during the entity modeling process. This allows trending topic analysis to accommodate as many raw documents as needed for queries that have large number of relevant documents.

In one embodiment, identified trending topics may be displayed to a user as line graphs signifying the relative presence of ranked documents on that topic. A user is able to toggle the display of individual trending topics over the background timeline histogram. In some embodiments, trends may be query specific, and trends that are not specific to a result set may be discounted by, e.g., comparison to a complement query having a large sample of documents that are not relevant to the user's query which created the result set.

Instead of a single score for "trendiness," three scores may be computed for each trending topic: falling, peaked, and rising. These three distinct scores may characterize the shape of a trend curve for the trending topic. Other derivatives, integrals, or additional equations and equivalents may be used to supplement user analysis. In one embodiment, top N results for each of the categories related to the search results for a query may be identified.

In some embodiments, the trend scores as disclosed herein may be computed in the following manner. Assume that each document has some data indicating the publication date of that document. First, the result data set may be divided into N bins, e.g., N=100, each of which represents a different date range. The boundaries between adjacent bins may be set such that the same number of documents have publication dates falling within the scope of the boundaries associated with each bin. That is, when there are too many documents having their publication dates falling between boundaries of a bin, the original bin is divided in such a way so that each of the divided bins has about the same number of documents falling within the newly derived boundaries. A probability distribution $f(x)$ with respect to the publication dates of the documents may then be created based on the counts of documents within each of the bins. This distribution $f(x)$ may then be smoothed based on some smoothing method such as a median or Gaussian smoothing or some combination of different smoothing methods. For each term, concept, or phrase, that is found in the result set documents and satisfies some other criteria, a number of occurrences thereof in each bin may be computed. In some embodiments, such criteria may include occurrence in minimum number of documents or occurrence in minimum number of documents with relevance value above some threshold. This may then be L1 normalized to create a probability distribution and/or smoothed in the same manner as for the background distribution. For each such topic distribution $g(x)$, a partial score for each topic t and bin x may be computed as $$b(t,x)=g(x)*\log(g(x)/f(x))$$

A raw trendiness score for each topic t may then be computed as a sum of all the scores with respect to the respective bins. If pseudo documents are included in the computation of raw trendiness scores, the document counts in each bin and the criteria that each term, concept or phrase need to satisfy may need to be adjusted accordingly.

To compute rising, peaked, and falling trend scores, an inner product may be computed between the $b(t,x)$ vector for each topic, and a shape function $s(x)$, which describes the desired trend shape as a function over the bin position expressed as a value in range [0,1], where the first (oldest or earliest) bin has value 0 and the last (newest or most recent) bin has value 1. In one embodiment, the trend shape for a rising trend is $$s(x)=-\cos(\pi x)$$

the shape for a falling trend is $$s(x)=\cos(\pi x)$$

and the trend for a peaked trend is $$s(x)=\cos(\pi(x^2-1)).$$

The general trend score is equivalent to using a shape function $s(x)=1$.

Once all the scores are computed for each topic, certain embodiments identify top N for each category (including any), take a union of all those topics and return the topics with the result data set.

Figure 10:
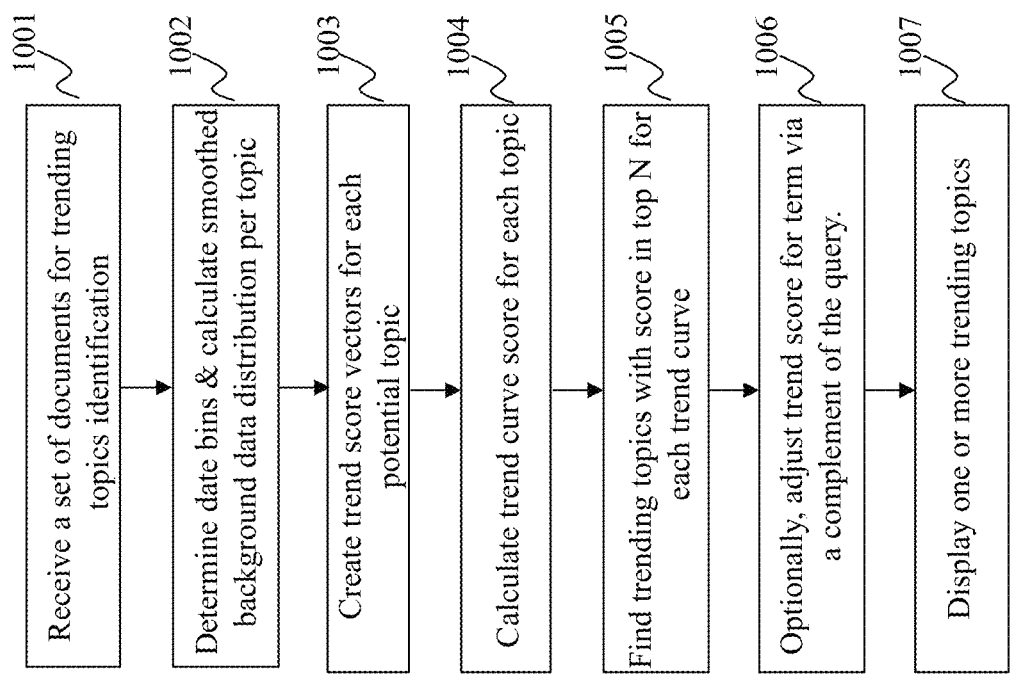
FIG. 10 is a flowchart of an exemplary process for identifying trending topics, in accordance with an embodiment of the present teaching.

FIG. 10 is a flowchart of an exemplary process for identifying trending topics, in accordance with an exemplary embodiment of the present teaching. Upon receiving a set of documents for identifying trending topics at 1001, date bins are determined, at 1002, based on the dates associated with the documents. A smoothed background data distribution $f(x)$ is accordingly determined per topic based on, e.g., document semantic feature vectors so that potential trend topic distributions $g(x)$ against the same date bins can be identified. Trend score vectors for each potential topic are then computed, at 1003, as $b(x)=g(x) \log((g(x)/f(x))$ for each bin x. Given trend curve functions $s(x)$, a trend curve score for each topic and trend curve is computed at 1004 as an inner product of $s(x)$ and $b(x)$. A union of those trending topics having their respective scores in top N is identified at 1005 for each trend curve function. Optionally, at 1006, each trend score may be adjusted, at 1006, by, e.g., subtracting from the trend score a trend score for the term using a complement of the query. Information related to such identified trending topics may then be displayed, at 1007, to a user. Information displayed may include at least one or more trending topics (word, phrases, n-grams, hyphenated expressions, etc.) and/or associated curves over a background histogram.

Another example of generic services is to automatically generate summarization of documents and/or pseudo-documents. In generating a summarization, Boolean search filters may be used to generate a list of keywords-in-context (KWIC) associated with a search, which may then be used to collapse the presentation of a result set and/or representation of a document in the result set. A collapsed presentation of a result set or a document may correspond to an incomplete display of information associated with the result yet the presentation may be expanded to display full information upon a user instruction provided in interacting with the collapsed presentation.

Document highlighting is a distinct, but related, expression for summarization. Highlighting and summarization may be restricted to literal matches for a Boolean search. Certain summarization techniques, such as Luhn algorithm, Rapid Automatic Keyword Extraction (RAKE), according to the present invention, may be used for new highlighting and/or summarization methodologies. According to some embodiments of the present teaching, a term co-occurrence matrix across a result set and/or intra-document (i.e., within a document) may be utilized for that purpose. For example, a combination approach may be employed, as a means of summarization, that uses trending topics and/or concepts detected from the result set to prevent "omitted summarization" of globally significant but low ranked terms intra-document. Via conceptual clustering coupled with count-based rankings, one may also supplement KWIC highlighting with related terminology (i.e., AI-KWIC).

Figure 11:
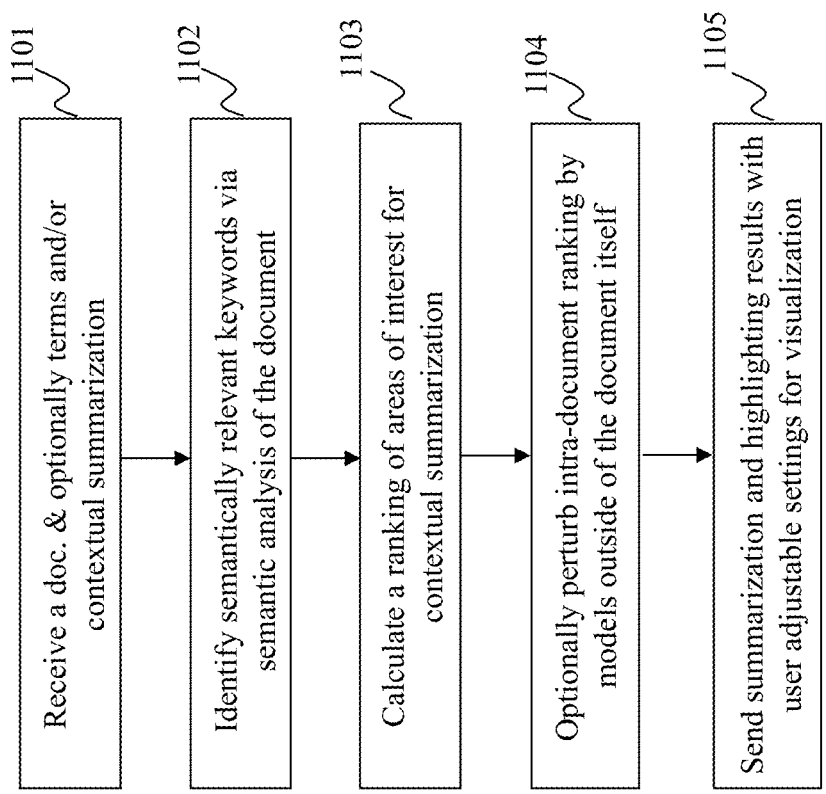
FIG. 11 is a flowchart of an exemplary process for creating semantic summarization, in accordance with an embodiment of the present teaching.

FIG. 11 is a flowchart for an exemplary process of AI-KWIC+Semantic Conceptual Summarization, in accordance with an embodiment of the present teaching. A document and one or more terms are received at 1101. The terms may include words, phrases, n-grams, hyphenated expressions, user inputs, keywords identified from models and/or other retrieval functions, or any combination thereof. Additional terms in the document that are semantically related to the input terms may then be identified at 1102. Then an algorithmic ranking (e.g., Luhn algorithm, RAKE algorithm) of areas of interest is calculated, at 1103, based on, e.g., semantic analysis and intra or within document term occurrences or co-occurrences. Such calculated ranking is for purposes of contextual summarization. In some situations, the intradocument ranking may be perturbed at 1104 by incorporating at least one model into summarizing additional results, which may be influenced by one or more models outside of the document itself (e.g., semantically-derived result set concepts). The summarization and highlighting results may then be provided, at 1105, to an interactive interface. In some embodiments, the results may be provided with user adjustable settings with, e.g., one or more sliders that allow a user to change the model thresholds (e.g., semantic similarity) for purposes of, e.g., setting a granularity to be applied to the presented highlighting and/or summarization. Sliders for adjusting the summarization scope and/or general summarization toggles (on/off) may either be separate or coupled with sliders for highlighting. Sliders for highlighting may be provided to adjusting thresholds, which may be general for all terms and/or term-specific via presentation of additional sliders.

In some embodiments, classification skew detection may also be achieved via a generic service and used for different purposes. Two- or three-dimensional mappings of documents (created by dimensionality reduction or embedding of high-dimensional semantic representations of patents and patent applications) can be used to identify classification codes associated with patent classification schemas, which may not adequately represent the classified patents and applications and may continue to degrade over time. Exemplary classification schemas include Cooperative Patent Classification (CPC), International Patent Classification (IPC), U.S. Patent Classification (USPC), Locarno Classification, North American Industrial Classification System (NAICS), North American Product Classification System (NAPCS), or any other classification schema. Such classification schemas may be hierarchical, matrix-based, or otherwise (e.g., Japanese F-term). By identifying inadequate or outdated classification codes, the system can alert a user the need for enhanced/new classification codes or modifications to definitions of existing codes.

In some embodiments, the quality of a classification code may be measured in the following manner. For a given set of patents and applications, a two-dimensional mapping thereof may be created. For each document, its nearest K neighbors in Euclidean space are identified. In a two dimensional mapping, each document corresponds to a state and a transition is between the document to each of its K nearest neighbors, with value associated with each transition proportional to the distance to the other document divided by a sum of distances to the nearest K neighbors. A Markov process is created based on the mapping, representing the probability of transitioning from one document to another semantically similar document. The initial state may have equal-probability for a transition to each of other documents with a given classification code. The Markov process may be iterative, i.e., be simulated N times, in M steps, to arrive at the final state, which is then examined for whether the associated document has the given classification code or not. The percent of the final states corresponding to documents that have the given classification code is indicative of the quality. Such a Markov process may also be used to detect skew or quality degradation of the classification code in the following manner. The initial state may have transitions only to documents that both have the given classification code and are more than T years old (e.g., computed based on the publication date of the document). Assume that X is a number of documents with the given classification code and more than T years old, Y is a number of documents with the given classification code but less than T years old, U is a number of final states after the Markov process simulations that have the given classification code and are more than T years old, and V is a number of final states that have the given classification code and are less than T years old. The skew factor may then be calculated as max(0, (U*Y)/(V*X+1)−1).

In another embodiment, the quality of a classification code can be measured in the following manner. A two-dimensional mapping may be quantized into a grid of N×N areas ("grid areas"). The density p of a classification code with respect to a grid area can be calculated as the number of documents in the grid area that have the given classification code (Y) divided by the total number of documents in the grid area. The overall quality of the classification code is then calculated as Σ log(γ+1)*|2ρ−1|/Σ log(γ+1), across all grid areas. Alternatively, the density p with respect to a grid area may be calculated as the number of documents in the grid area with the given classification code minus one, divided by the total number of documents in the grid area. Such an adjustment may be used to minimize the impact of individual outliers. This embodiment may also be used to detect skew or quality degradation of a given classification code in the following manner. The quality of a classification code is calculated only for (1) documents that have the given classification code and are older than T years and (2) all documents with the given classification code. The skew factor may then be calculated as a ratio of the latter value to the former.

Methods as described herein may be modified for adjusting weights given to particular classification codes and/or documents. For instance, classification codes, obtained via a specific schema such as CPC, that have been recently updated may be given a higher prior probability in terms of skew. Alternatively, those that have not been updated beyond a threshold timeframe may be prioritized for review or given a higher prior probability of skew. The average lengths of time between schema updates may also be used to adjust the prior probability of skew for a classification code. The classification skew probability models may consider different factors such as whether a classification code is assigned by an inventor or an examiner or how often the classification code appears in cross-classification. Depending on the situation, a classification code may be given different weights by adjusting the formulas used in each embodiment. A document may be given a different weight based on multiple considerations, including the date of the document, whether the document is a grant or patent application, and the number of distinct classification codes assigned to the document.

In certain embodiments, classification codes may be queried, based on aggregated entity models, to retrieve documents or pseudo documents that are semantically similar or topically similar to documents with the classification codes assigned. The result set may be sampled according to a certain depth (e.g., limited by document count, semantic similarity, or both). Documents that are classified differently than the original query (either in terms of inventive classification codes, and/or cross-classifications) may be flagged, counted, and/or visualized (via any disclosed visualization technique). In processing a query with an aggregated representation of a classification code, it may be configured to alert automatically if documents with newly discovered classification codes. By using an aggregated representation of the classification code, unique classification codes may be discovered even though it would not be apparent solely from reviewing cross-classifications, i.e., "additional" classification codes.

Patent applications generally will not be published eighteen months after their initial filing dates. In some situations, the publication dates may also be delayed. Given that, non-patent literature (NPL) may be used to generate a skew factor and this allows to capture, prior to publishing patent applications, emerging technologies. However, as NPL documents may be classified in a different schema than patents (often no schema at all), incorporating NPL into such analysis may inadvertently measure the performance of a classifier, rather than detect a skew. This may be mitigated by manually reviewing or auditing a percentage of the NPL to ensure that the derived classifications are acceptable and appropriate and/or using a less aggressive classifier (i.e., one which labels NPL into fewer classification codes with a higher confidence interval). Classifiers for NPL may utilize a variety of known techniques, e.g., a maximum entropy classifier, decision tree, support-vector machine, k-nearest neighbor classifier, and/or naïve Bayes classifier.

When visualizing results using, e.g., low-dimensional embeddings as described above, a user can be alerted on classification codes having low quality or high skew. Alerts may pop up based on a skew threshold to streamline the analysis and correspond to a defined region of interest. An alert may appear automatically or in response to a user event, e.g., mouse hover, gesture, selection, etc. A user may configure for receiving alerts with respect to a set of classification codes or subtree of a classification taxonomy. A user may adjust or specify preferred alert criteria via, e.g., a threshold slider UI. A user may review visual divergences between a defined schema and document locations in a ranked result set, document positions within a low-dimensional embedding visualization, hard clustering algorithm, or any intersection thereof via an interface. Alternatively and additionally, compatible interfaces include, without limitation, UI with one or more simple columns/lists to visualize such differences, by listing semantic distances, counts of divergences, etc. Such UIs may be implemented in certain graphically simplified means. Visualization scheme may provide means to flag potential areas of interested based on different criteria, including probability of drift (based on e.g., divergence in positions in a dimensionality reduction or other clustering means relative to classification code definitions over time) or date of last CPC/IPC code update (deviates in either direction overdue or recent). Overlays may be presented between NPL classification schemas and patents. If recent NPL (within a set period such as the most recent 18-months) is pre-labeled or classified with some patent classification codes, semantically indexed as such, and has its positions diverge or skew relative towards corresponding patents from a defined time period, then the recent NPL may be visual overlaid with distinctions identified based on regional density. If early publication requests show a similar skew, such an observation may be alerted via, e.g., automatically generated e-mail, RSS feed, or other alternative means.

Figure 12:
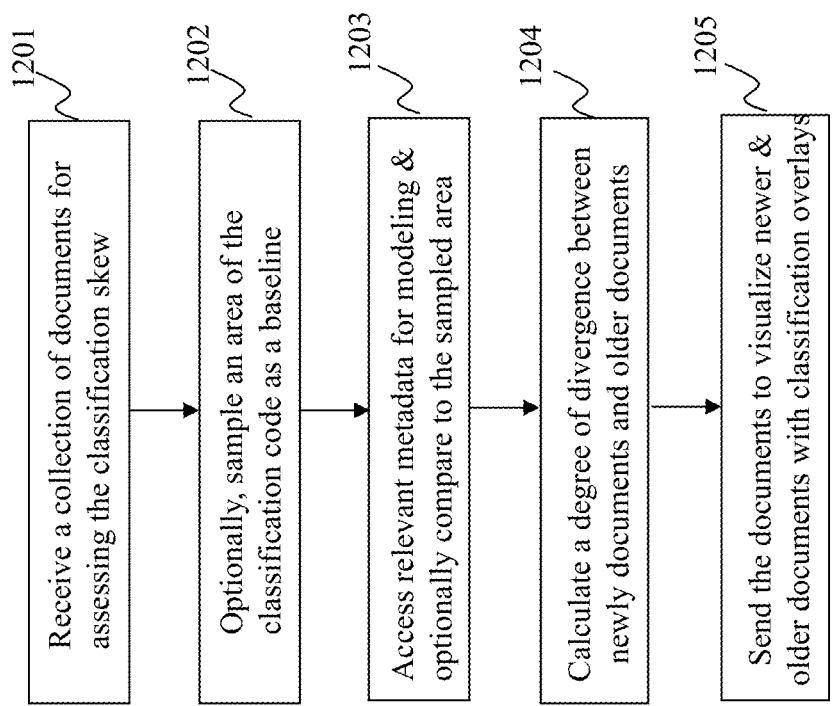
FIG. 12 is a flowchart of an exemplary process for calculating a classification skew, in accordance with an embodiment of the present teaching.

FIG. 12 is a flowchart of an exemplary process for calculating the classification skew, in accordance with an embodiment of the present teaching. A collection of documents is received at 1201 for assessing the classification skew. Documents with a classification code may optionally be sampled, e.g., pseudo-randomly, to determine a baseline set of documents to be used for modeling. Relevant metadata are accessed at 1204 for modeling and, optionally, may be used to compare with the pseudo-randomly sampled area. Modeling may be performed with respect to, e.g., inventive vs. additional classification codes, time since last schema update, rate of divergence in cross-classification from the collection of documents of interest. A degree of divergence (skew factor) may then be calculated, at 1204, between newly assigned documents and older documents (e.g., >18 months) for the collection of documents of interest using, e.g., Markov process or a grid area density calculation. Optionally, pre-classified NPL in accordance with a defined schema may be used in the calculation at 1204 to account for the publication delays in patent applications (typical 18-month). The documents of interest are then sent, at 1205, for visualization, e.g., t-SNE, k-means clustering with classification overlays. In visualizing such documents, the newly assigned documents and older documents may be compared with regard to classification overlays. Optionally, the skew factor alerts may be calculated based on, e.g., amount/regional density of classification codes from visualization subdivisions beyond a threshold count. The interface may provide means for a user to flag areas of interest with respect to the classification code to be updated.

Semi-supervised learning as disclosed herein relates to creating training data based on observed user interactions with the visualization modules. Such training data may then be used for machine learning from such data. When information is visualized to a user, the system may monitor and record user activities performed with respect to the visualized content on the interfaces. Such observation may be made during both a training period and a non-training period. Such observations may be made in a transparent manner. For example, a user may select a spatially coherent region on the visualization interface and add a user-defined label during the interaction with, e.g., semantic map (t-SNE) or AI tree map (k-means clustering). Such user defined labels may be used as ground truth for the training data for future supervised learning or training. If user interactions occur with a data set initially displayed with labels derived from unsupervised learning, the user provided labels will trump and be used to improve the training data. With time, more and more such user interactions and labeling activities produce enhanced training data and, thus, improve the trained models.

In some embodiments, some models have customers (e.g., model specific to one particular customer or entity) and such models may be restricted from being accessible by others (such as competitors) so that to prevent such models being utilized to influence results r. According to the present teaching, both supervised learning and unsupervised learning may be applied in different situations to be compatible with an underlying application. With unsupervised learning, labels defined by users via interactions may be used as part of a description which may be utilized for, e.g., searches. In this regard, a semantic map may be generated based on t-SNE algorithm, which does not require data to be pre-classified and may be executed simultaneously on patents+

NPL (including patent specific operations in mixed mode such as simple or extended family roll-up or patent-only search filters which are ignored for NPL, e.g., claims).

Figure 13:
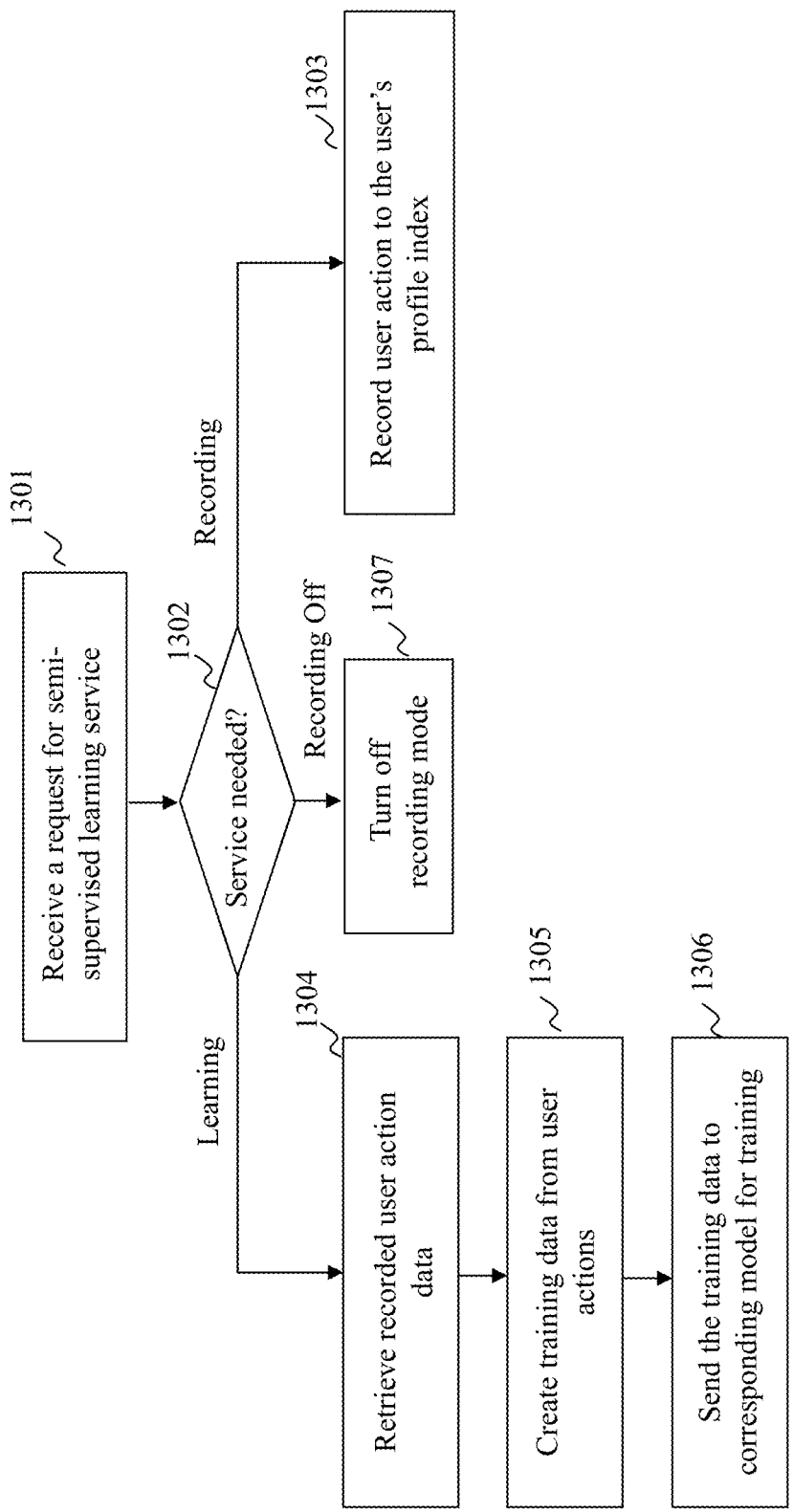
FIG. 13 is a flowchart of an exemplary process for semi-supervised learning service, in accordance with an embodiment of the present teaching.

FIG. 13 is a flowchart of an exemplary process for using the semi-supervised learning service, in accordance with an embodiment of the present teaching. A service request is received at 1301 which is examined at 1302 as to whether it is a request for the semi-supervised learning model to operate in a recording mode, a recording-off mode, or a learning mode. If the request is for recording, the process proceeds to 1303 to record user's action as well as the underlying data related to the user such as the user's identification, profile, or index. For example, if a label is changed for a tree map or an area on the semantic map during user interaction, the corresponding documents associated with the label are also recorded as what can be included in the training data with that label.

If the request is related to a learning mode, user activity data are retrieved at 1304 and parsed to create various training data sets at 1305. In some situations, there may be noise in the retrieved user activity data. Such noisy data may be identified and removed to maximize the relevance of the training data to be created. Such generated learning training data are then sent, at 1306, to the training mechanism for training models at issue. If the request is for turning off the recording, the process proceeds to 1307 to turn off the recording as requested.

Some data sets may include information on document classification with respect to some schema or taxonomy. Visualizations created using algorithms that do not rely on classification data (such as t-SNE) may nonetheless aggregate and display the classification data independent of the visualization algorithm itself. In such cases, user interactions with respect to group and label data may be used to classify previously unclassified data.

Specialized Services

As discussed herein, with the semantic analysis results obtained by generic services, in some embodiments, some specialized services may utilize such semantic analysis results to further derive additional semantic-based analytical results. For instance, based on trending topics related to a field identified by a generic service based on relevant documents, a specialized service may predict, e.g., via extrapolation, future trending topics in the that field or other associated fields. As another example, based on the semantic summarization or characterization (see FIG. 5B) of a patent (a document), a specialized service may be invoked to identify target(s) (products or companies making such products) that may infringe on the patent (see FIG. 5C). Another specialized service may be invoked to assess the validity of the patent based on prior art, either searched by the application search engine/search request processor 560 as invoked by the specialized service or provided as input.

As discussed herein, a specialized service may be used to predict trending topics. In some embodiments, trending topic prediction may distinguish rising, peaked, and falling topics from a background distribution. A rising topic has the potential to predict a future area of technology advancement or investment (e.g., R&D spend) before it peaks. The background distribution may not contain topics for certain words, phrases, hyphenated-expressions, etc., that are newly indexed and relatively rare thus not yet accounted for in existing models (even if the model accounts for semantic drift). By aggregating related, e.g., rising topics, together based on appropriate distances (e.g., term or semantic distances) between distinct yet related terms, future trending topics may be inferred or predicted. Such rare or newly appearing terms can be scored based on the number of rising topics they are associated with and weighted by their rising scores. This methodology may be used when two or more terms exist in the trending topics baseline model. However, the methodology may also be used for combinations of terms that are modeled and not yet modeled so long as they are indexed, because they are still identifiable based on their relationship/proximity to the defined model. Such terms may be tagged as potentially important for future modeling/training. In some embodiments, trending topic prediction may also leverage information about the trend of patent applications filings per classification code or entity information. Entity information may include, e.g., the number of large companies that tend to file more applications in the related topic area, whether the topic area is related to the company in the query, or whether new competitor/company has entered into the related topic area, etc.).

Such exemplary entity information may be leveraged alone, or in combination. Other types of entity information such as auxiliary information or metadata about a company such as R&D spend, involved industry segment, acquisition history, subsidiary/parent relationships, or equivalents thereof may also be utilized. The approach for trending topic prediction disclosed herein can be applied to pseudo documents created during entity modeling by combining two or more semantically similar documents. In some embodiments, potentially future topic related terms identified in pseudo documents may be weighted more than those identified in single documents.

Figure 14:
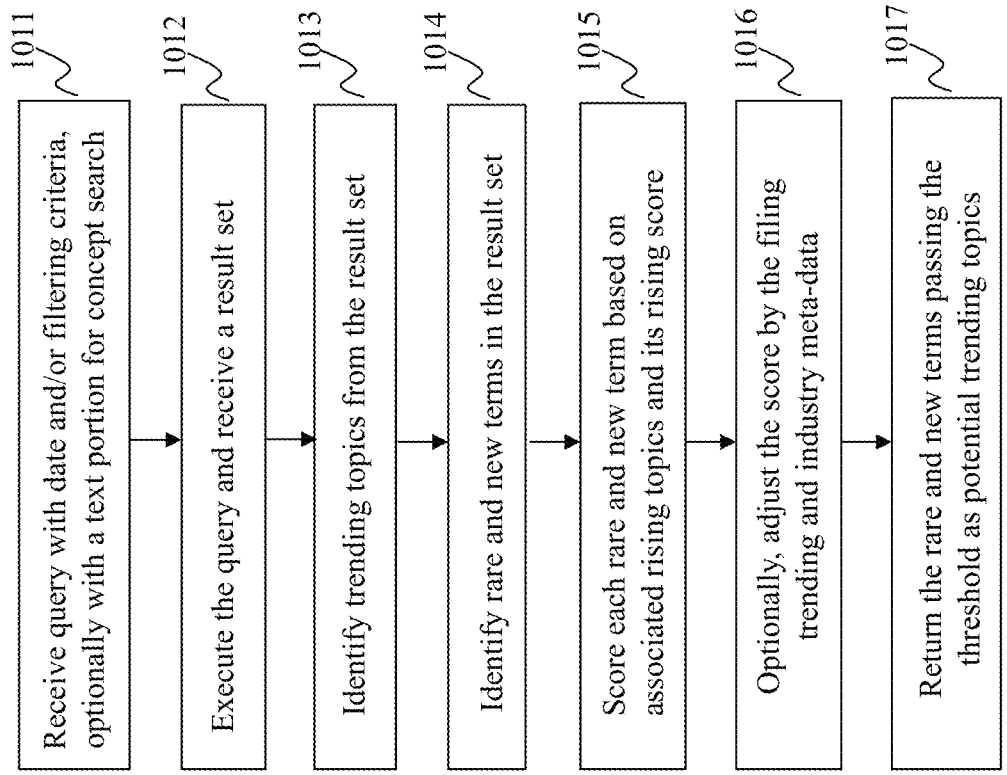
FIG. 14 is a flowchart of an exemplary process for predicting trending topics, in accordance with an embodiment of the present teaching.

FIG. 14 is a flowchart of an exemplary process for predicting trending topics, in accordance with an embodiment of the present teaching. A query is received at 1011 with a date and other filtering criteria, optionally with a text portion that specifies the area of interest. The text portion can be specified broadly or narrowly. A broad text input may define an industry or a sector. A narrow text input may specify a technology field or an entity. Additional selection criteria may include, but not limited to, conditions set for content selections, classification code selections in sampling the result set for analysis. Without the filtering criteria or text portion provided as input, the trending topic prediction may rely simply on the input on date limitation, e.g., recent 10 years.

The query is processed at 1012 to obtain a result set. Based on the result set, trending topics are identified at 1013 based on, e.g., approaches such as the ones depicted in FIG. 10. Rare and new terms may also be identified at 1014 from the result set that are not included in the trending topics. The rising score for each rare and new term is computed, at 1015, by identifying associated rising topics and assign a rising potential score to each term. Such a rising potential score can be adjusted, at 1016, based on the filing trend, e.g., CPC codes or other meta-data related to the technology or industry. Rare and new terms whose scores satisfying certain criterion, e.g., a pre-defined threshold, may then be deemed as potential trending topics in the future and returned as detected trending topics at 1017.

According to another embodiment of the present teaching, a specialized service is AI-enabled conceptual highlighting and summarization, which may be used to ascertain whether a claim of a patent or patent application passes the muster of various legal requirements. Such requirements may include adequate support under 35 U.S.C. 112(a) including written description and/or enablement or indefiniteness under 112 (b). In addition, the present teaching may also be used to identify disclosed structure in the specification that can perform certain functions recited in the claim in question to facilitate means or step plus function analysis under 112(f). The function of highlighting and summarizing concepts may also be used to determine and score the likelihood that a reference (i.e., a patent, a patent application, or NPL) constitutes an enabling disclosure in order to be properly used as a prior art reference. Such AI-enabled conceptual highlighting and summarization may be used to characterize any set of documents, including pseudo-documents generated via entity modeling or documents selected by user or other means.

Figure 15:
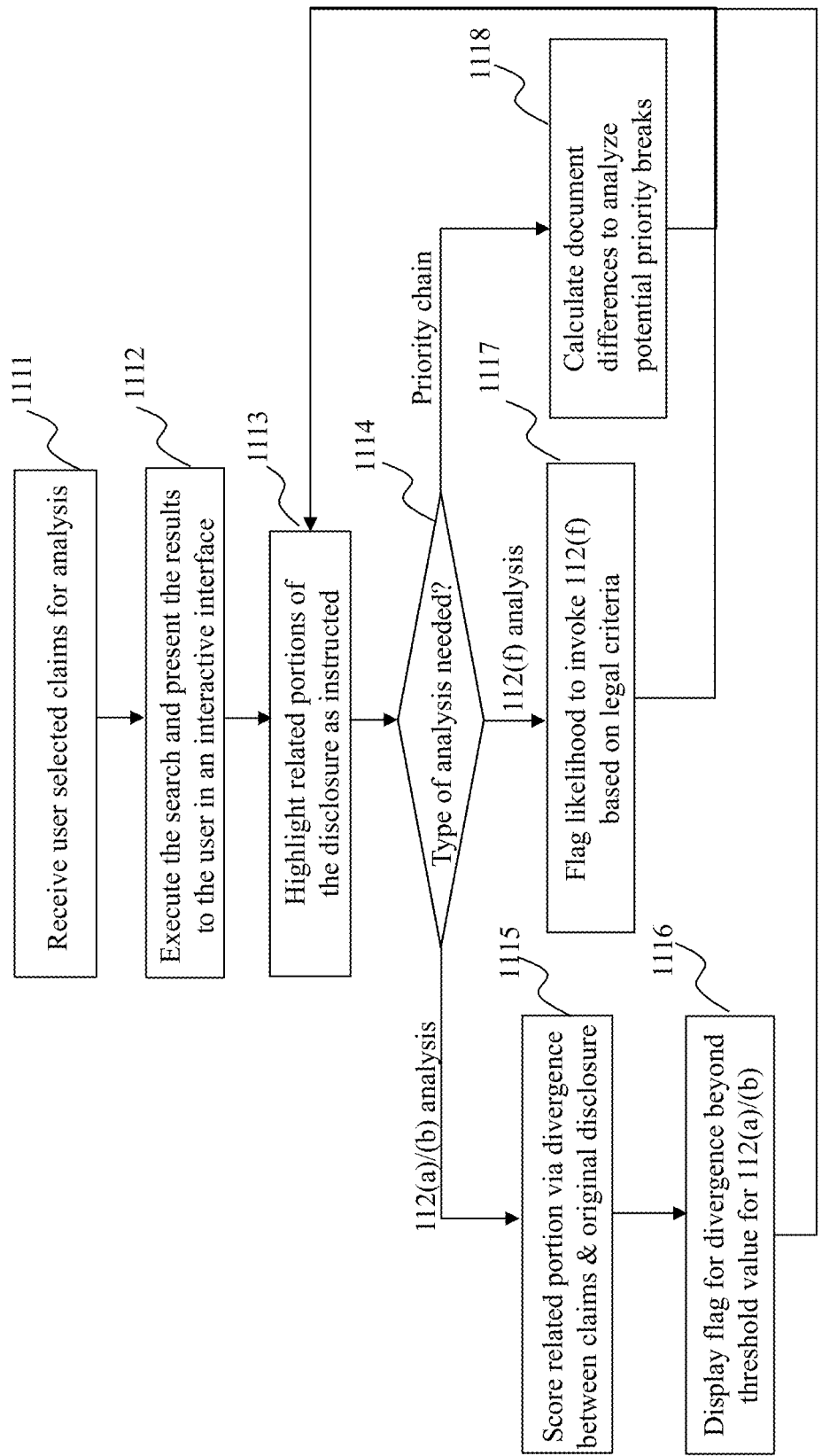
FIG. 15 is a flowchart of an exemplary process for a 112 semantic analyzer, in accordance with an embodiment of the present teaching.

FIG. 15 is a flowchart of an exemplary process for a 112 semantic analyzer, in accordance with an embodiment of the present teaching. At 1111, input related to claim(s) of patent(s) or patent applications or portions thereof is received. Such claims or portions thereof may be claims as appearing in a patent or a patent application (original claims) or a proposed amended claims or a portion thereof. Claims or portions thereof are provided for analysis based on the specification(s) of patent(s) or patent application in order to automatically assess whether such claims or portions thereof with regard to 112(a), 112(b), and 112(f) and such an assessment may also enable automated suggestions to claim amendments. Such an analysis may also be applied to, e.g., determining priority for claims in a continuation-in-part application. If what is submitted for analysis is a proposed amended claim, its corresponding original (or unamended) claim is tracked during the analysis. Assuming a claim tree is constructed based on a set of claims according to the dependency relationship of the claims and can be displayed to a user. A user may select, from such a claim tree, one or more claims to be analyzed, or to be included in the query. This may be done by interacting with the claim tree via UI interface. A user may also specify the weights to be put on different selected claims. In query, a user may also specify additional terms for emphasis or de-emphasis via semantic weighting. Such a specified query is then analyzed for execution at 1112 with respect to specified claims and the result is presented to the user via an interactive interface.

At 1113, portions of the underlying specification relevant to the requested 112 analysis with respect to specified claim(s) may then be highlighted based on the AI-KWIC & Conceptual Summarization Process. Highlighted areas may be dynamically adjusted based on interactions via the UI, by which a user may actively redraw or change the highlighting. It is then determined, at 1114, what type of analysis is needed based on the query request. If 112(a) and 112(b) analysis are needed, related portions in the specification may be scored, at 1115, based on divergence in semantic distance between claims/amended claims (if any) and the original disclosure in the specification to assess the likelihood of adequate support. Different observations, e.g., a percentage of text highlighted, may be considered in determining the score. Any divergence beyond some pre-set criterion such as a threshold value with respect to 112(a) written description/ enablement analysis may then be flagged, at 1116, on a display to the user.

If the requested is an analysis with respect to 112(f), the system performs analysis with respect to queried claim element/limitation under 112(f) based at least in part on pre-defined rules derived based on legal requirements associated with 112(f). The analysis result may include a measure indicative of the likelihood that the query's claim element/limitation likely will invoke 112(f) interpretation. Such analysis result may then be flagged, at 1117, to the user via an interface on a display. If the requested analysis is for tracing the priority chain, determined at 1114, the system may determine, at 1118, differences among documents (e.g., via text difference module) to assess whether potential priority breaks exist, and score/flag differences via semantic distance. Via the UI, a user may also adjust various controls related to the highlighting with respect to repeated analysis.

In some embodiments, a specialized service may also provide services related to, e.g., identify competitors. Companies with similar technologies can be competitors to each other. As discussed herein, companies can be modeled based on their respective technology documents including but not limited to patent documents, technical disclosures, product documentations, etc. Companies, once characterized using semantic representation derived from aggregated modeling, can be indexed using such semantic representation in the database for future tasks involving the companies. For example, companies having similar technologies with a query company can be semantically searched based on such semantic representations. Companies with technologies related to that of the query company may be identified in such searches and information related thereto may be retrieved via indices. Matching companies may also be assessed from different perspectives. For example, the query may be dynamically modified on-the-fly to focus on one or more technologies of interest and search for competitors with respect to such selected technologies. Each time when the query is modified, a dynamic set of competitors may be identified and the list may be accordingly re-ranked based on the semantic representations of the searched companies. Top ranked companies may be deemed as the key potential competitors.

Technologies and/or products owned by a company of the query may be displayed to the user with its technologies and products information display as well. For each technology or product displayed, a user can drill down to corresponding technical documents via simple UI interactions. The technologies and/or products of matched companies and the relatedness to that of the company in the query may be displayed as well and each technology of the matched company can also be drilled down to access related technical documents. With the capability of easily accessing relevant documents via interactions with displayed information, various services or data analytics techniques can be applied to any selected documents or collection of documents via simple UI interface interactions. For example, once a set of documents is selected with respect to a matched company, a filter may be invoked to filter, e.g., by certain technologies, by dates, by geographical areas, etc. In this manner, a user can quickly identify competitors according to relevant criteria.

Figure 16A:
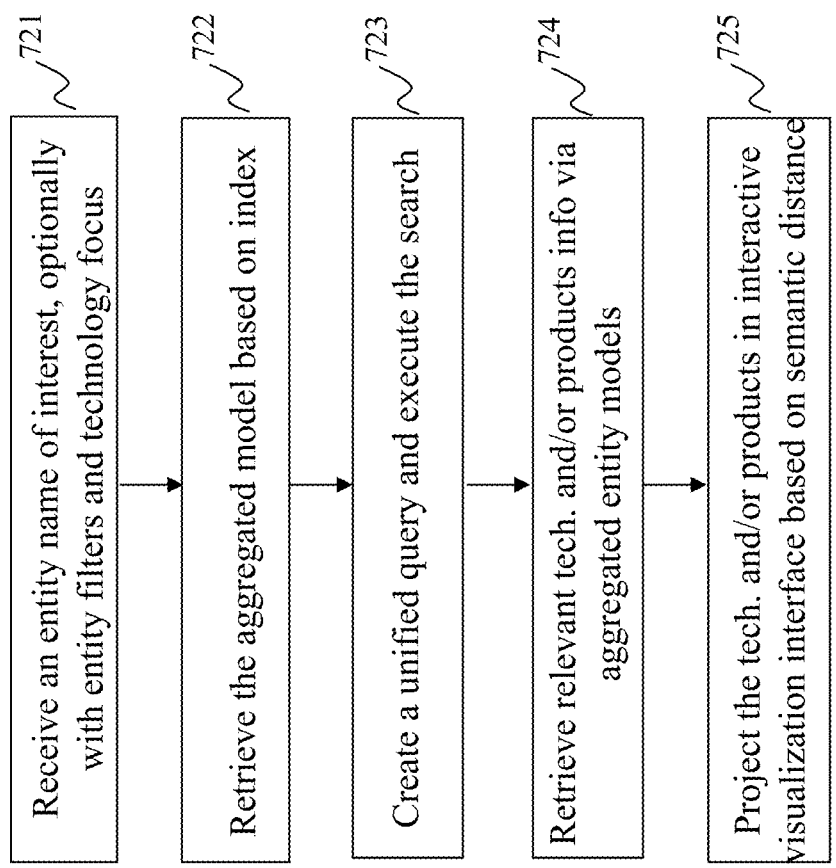
FIG. 16A is a flowchart of an exemplary process for competitive analysis, in accordance with an embodiment of the present teaching.

FIG. 16A is a flowchart of an exemplary process for competitive analysis, in accordance with an embodiment of the present teaching. A request for a competitive analysis may be received at 721 with an entity name of interest relevant to the competitive analysis. The query may also include a textual portion that specifies, e.g., technology focus for the competitive analysis. This can be used when the entity of interest has a broad technology portfolio but the competitive analysis needs to focus on only some specific area of interest. In general, once the name of entity of interest and the technology of focus are provided, the competitive analysis is capable of identifying all entities that are in the same technology space and may potentially be competitors. The result can potentially be numerous but can be scoped via different means. For example, the degree of relevance between the technology of focus of the entity of interest and that of other entities may be controlled at a certain level so that others with a lesser degree of relevance may be removed. In some situations, a user may already know the competitors to be analyzed so that the scope of the competitive analysis may be restricted to that known group of competitors. In this case, the query may also specify a list of names of such competitors so that the competitive analysis is applied to only such named competitors.

Upon receiving the query, the aggregated model of the entity of interest is retrieved, at 722, based on the index associated with the entity. A unified query based on the aggregated model is created at 723. If the query also specifies some focus of technology area and/or entity filters, the unified query may be created based on such specified criteria as well. Information related to the specified technologies and/or products is retrieved at 724 based on the aggregated entity models of companies. In some embodiments, a relevance cut-off may be applied in retrieving such information to yield a result set of a reasonable size. The retrieved information on related technologies and/or products may then be projected on an interface, at 725, e.g., together with the projected information related to the technologies and/or products of the entity of interest. The interface may correspond to an interactive 2D visualization interface and the projection may be made based on the semantic distances determined among semantic models of different entities. An exemplary semantic map is shown in FIG. 17C. Through such an interface, any overlap between the projected information representing technologies and/or products of other entities and that of the entity of interest may correspond to competing technologies or products. As discussed herein, underlying documents associated with each projected technology and/or product can be readily accessible via the interface when needed.

In some embodiments, some of the specialized services may also be used for identifying, e.g., potential licensors or licensees based on some given IP assets. Candidates for a license of certain patents may be companies that are involved in the same technological space but need the patented technology. Given that, to identify licensing candidates for a given patented technology, a search may be conducted to identify companies that are involved in the same technology space with, e.g., some filtering based on, e.g., a degree of relevance. Information on technologies of the searched companies, which may include their corresponding semantic vectors, can then be projected into a 2D space for visualization using any known dimension reduction techniques such as t-SNE algorithm.

In some embodiments, such analysis may also be used for identifying licensing opportunities, i.e., from which company the entity of interest (company involved in the query) may be able to license needed technologies. To do so, representations of technologies of each searched company and that of the company of interest may be mapped to a layered semantic map. White space analysis can be applied with respect to the company of interest to locate searched companies that have complementary technologies for licensing opportunities. Conversely, white space analysis may be applied with respect to any of the searched companies to identify technologies that the company of interest has some patents on technologies that the search company may like to or need to license. To control the scope of any of such inquiries, different criteria, such as time, relevance, or size may be applied as filters to identify preferred candidates for licensees or licensors. In another embodiment, technologies of each company in the result set and the technologies of the company in the query are mapped to the tree map, which provides a way to view technologies organized hierarchically and help identify technologies for potential licensees and licensors.

Figure 16B:
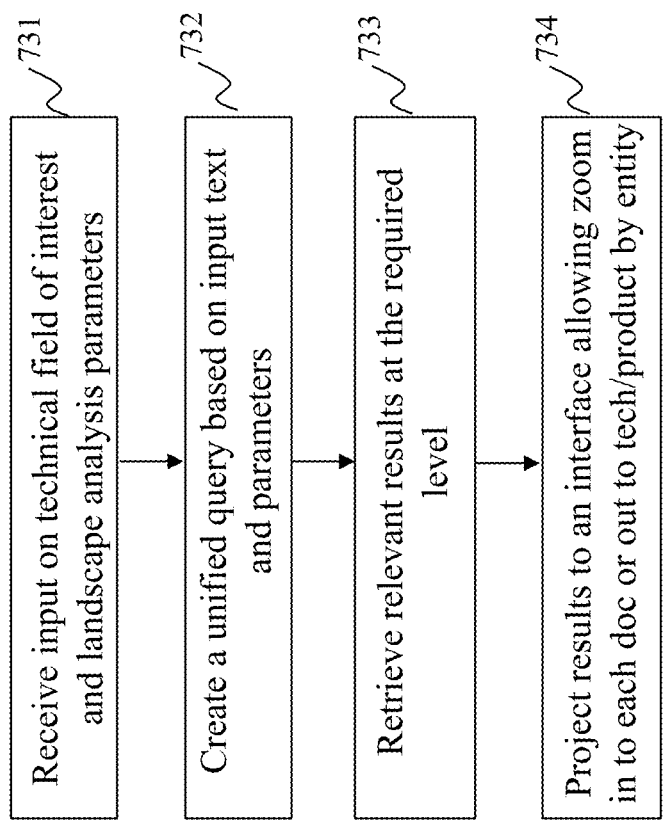
FIG. 16B is a flowchart of an exemplary process for landscape analysis, in accordance with an embodiment of the present teaching.

FIG. 16B is a flowchart of an exemplary process for landscape analysis, in accordance with an embodiment of the present teaching. Information about a technical field of interest subject to landscape analysis is received at 731, optionally with additional parameters that may be relevant to the landscape analysis. In general, a landscape analysis may be performed at the level of or based on individual documents. As the present teaching provides characterization at different levels, such as characterization of entities via aggregated models and summarization of technologies, a user using the present teaching may specify, in a request for landscape analysis, preferred levels of information used for the requested landscape analysis. For example, a user may specify in a request to focus the landscape analysis at an aggregated level of technology or product of each company (as opposed to the level of individual documents). Additional filters may also be specified with the request such as dates, some specific document collections (e.g., patents only), or geographical regions (e.g., in the U.S. only). Based on the request with specified parameters to be applied to the requested landscape analysis, a unified query is accordingly created at 732. The unified query is then processed to retrieve, at 733, information at the specified aggregated level on relevant technologies/products. Such search information on technologies/products is then projected, at 734, to an interactive 2D or 3D visualization interface in accordance with the semantic distances among different representations. One such example on a projected a semantic map is provided in FIG. 17D.

A potential licensee in general likely is an infringer, to whom enforcement of patent rights may be carried out. In enforcing a patent, both infringement and invalidity issues need to be considered at the same time. As such, issues related to both infringement and invalidity may be assessed for each patent/claim at the same time. Traditionally, infringement potential, as well invalidity studies, are assessed on a per patent and per claimed limitation(s) basis. by conducting one or more of chemical structure, DNA/RNA or gene sequence, semantic, and/or Boolean filtered (e.g., filtered by publication date, earliest priority date, classification code, and/or text search with wildcards and/or term proximities) searches, and in each category are focused on a series of searches related to specific claimed limitations for infringement, and in the case of invalidity studies on novelty/obviousness. Aggregated modeling as described herein may be utilized effectively for infringement and invalidity related analysis. For example, each claim of a number of issued patents (e.g., 5 patents) of interest may be modeled to facilitate assessment of infringement potential. In some embodiments, representative independent claims of a patent may be used to generate a set of related claims. Given a set of patents with claims directed to different technologies, entity modeling may be applied to model them in order to separate claims into different technology areas. For each patent of interest in an aggregated infringement analysis, the results may be obtained by segmenting based on the models derived from a graph of the aggregated claims (e.g., each claim set may be tied to a document or related document-pairs). An aggregated invalidity analysis may be performed in a similar manner with date filters created based on the priority date of the patent at issue and utilized to limit a set of prior art documents to be used in the invalidity analysis.

The aggregated modeling as described herein may also be used for freedom-to-operate assessment, which is to evaluate the semantic similarity between a product and existing patents. In this situation, a product description (a manual or a specification) is used as the basis of the aggregated modeling. In cases where the product description is long, the textual information can be segmented, e.g., by chapter or by some other defined boundary. To proceed with freedom-to-operate analysis, a user may provide one or more patents or claims based on which clearance is sought. Claims subject to such an analysis include both independent and dependent. In some embodiments, patents and/or claims to be subject to a freedom-to-operate analysis may be automatically searched and identified using the various functions as disclosed herein in accordance with the present teaching. For instance, aggregated semantic modeling may be applied to the description of the product and the modeling result may then be used to conduct search by identifying other entities having assets in the same technology space based on semantic models of such entities. Via the matched entities, a user may select documents (patents) associated such entities, which may be further analyzed semantically on each individual document to identify claims that may cover the product by assess the semantic distances between the product and each of such identified patents.

Freedom-to-operate analysis is in effect related to infringement analysis. A product that is to be cleared via a freedom-to-operate analysis can be modeled via aggregated modeling based on documents related to the product. Aggregated modeling may also be applied to individual aspects of the product. For instance, a product may have design features as well as functional (utility) features. Such different aspects of a product may both need to be cleared but need to be done separately. In this case, the design aspect of the product may be aggregated modeled based on the design description of the product. The functional aspect of the product may be separately aggregated modeled based on functional description of the product. In some situations, each aspect may have sub-aspects that may also need to be individually cleared. As such, different aspects of the product may be modeled using respective documents.

In some embodiments, different aspects of the product may be described in different parts of a long document. In this case, the long document may be segmented into multiple sub-documents based on content and each sub-document is then used for modeling a corresponding aspect of the product. Such generated aggregated semantic models of each aspect of a product may then be appropriately indexed and stored in a manner similar to entities. That is, a product may be indexed and searched either with respect to individual aspects of the product or as a whole. Similarly, a product so modeled may be visualized and explored based on semantic models for individual aspects of the product or based on the semantic model for the whole product.

Figure 16C:
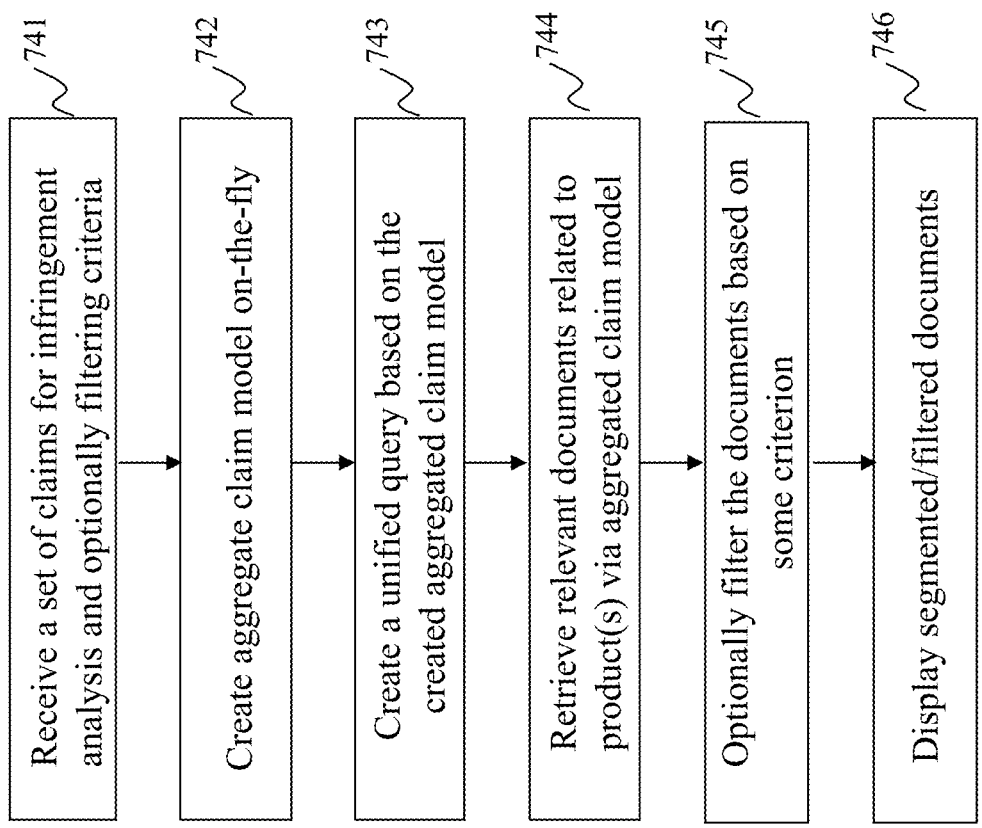
FIG. 16C is a flowchart of an exemplary process for infringement analysis, in accordance with an embodiment of the present teaching.

FIG. 16C is a flowchart of an exemplary process for infringement analysis, in accordance with an embodiment of the present teaching. A set of claims and optionally filtering criteria is first received at 741. As discussed herein, such filtering criteria may include, e.g., priority date of each claim and/or country of interest where the enforcement is contemplated. Based on such an input, an aggregated model for the claims set is created on-the-fly, at 742, in a manner similar to creating an aggregated model for an entity. A unified query is then generated, at 743, based on the aggregated model for the claims set and the filtering criteria if any. Based on the unified query so generated, product(s) that may infringe the claims may be searched against the semantic representations of products, either already indexed and stored in the system or identified via search and semantic modeling on-the-fly. Based on the matched semantic models of the claims and a product, relevant documents associated with the matched product may be retrieved at 744. As discussed herein, a product may be semantically modeled based on either individual aspects of the product or the overall characteristics as a whole. The infringement analysis as described herein may leverage such enriched semantic representations of a product to identify infringing aspect(s) of a product. For example, a product may infringe claims of a utility patent (functional aspect) but not any design patent (which covers the aesthetic aspect of a design). As such, infringement analysis may be carried out with respect to claims directed to certain aspect of invention against semantic models for corresponding aspects of a product in order to assess whether the product infringes the claims directed to the certain aspect of an invention.

The infringement analysis may be based on some segmented documents retrieved as relate to certain aspect(s) of a product and then the analysis is to assess whether that aspect of the product as described by such documents may potentially be covered by at least some of the claims in the claim set. In some embodiments, the retrieved documents related to some aspect of a product may also be filtered at 745 according to some criteria and segmented documents after such filtering may then be displayed at 746. As a decision as to infringement is generally a legal decision, the present teaching as disclosed herein generally leave such a decision to a user by presenting information (e.g., documents or models thereof) and semantic characterizations to the user without providing a decision. In this manner, the system as disclosed herein facilitate a user in making a legal decision rather than rendering a legal decision.

A change in market data may in certain situations trigger a recalculation of a prior assessment such as a comparison between a company and its competitor. This is especially so when the basis of the prior analysis is what is changed. For example, stock price, R&D spend, material patent portfolio sale or acquisition, or other relevant information that may change over time, patent grant, patent family expansion to additional countries, abandonment of granted patents due to, e.g., failure to pay issue fees, information disclosure statement (IDS) filed for some patent application, notice of allowance in some pending patent applications or other relevant prosecution status changes, etc. Such information changes may be monitored or inferred via information from various public information sources (such as SEC, patent offices around the world, or information channels such as email, push services, etc.) or private information channels. Assessing competition by monitoring high and low performances relative to competitors may provide relevant information such as trending topics to assist ongoing or continuous assessment of a situation for a user in connection with others in the marketplace.

Visualization—Semantic Map

According to the present teaching, various semantic analysis can be flexibly applied to individual documents, collections of documents, portions of documents, and pseudo documents to derive semantically enriched characterizations of information or entities at different levels of abstraction. Accordingly, such semantically enriched representations (of information or entities) together with the AI based data analytics as disclosed herein support various effective visualization schemes and means that can allow users to explore and understand information in a more meaningful way and even discover new relationships (among different pieces of information or entities) in a way that is not possible previously. For example, the semantic characterization at different levels (individual or aggregated) makes it possible to visualize a diverse range of information in an enriched and multi-facet way, making it more effective for a user to leverage such visual presentation to reach a deeper understand of semantics of information, entities, markets, and inter or intra relationships thereof. The enriched semantic representations of information/entities plus the effective visualization approaches, as will be discussed below, also make it possible for a user to recognize implications embedded in information and discover hidden relations with others so that to provide meaningful guidance in terms of maximizing benefits and minimizing market risks hidden in a complicated information web.

To allow semantic characterization for information and entities to be visualized effectively and to support effective exploration of such information to uncover complicated relationships and implications, concepts and visualization methods associated with a semantic map is disclosed. To effectively visualize semantics directed to different information/entities, different semantics detected may be presented via visualization using different means such as colors, hues, sizes, locations, or other ways such as highlighting. Application of different presentation means to different semantics may be determined automatically on-the-fly based on the actual situation.

In some embodiments, information may be segmented and each segment may be separately coded by, e.g., color-based highlighting metrics. Options for information accessibility may be presented using different color-profiles to accommodate color-blindness or vision impairment or enabling screen readers or braille devices via embedded tags, e.g., XML or HTML markup tags, in one or more of the dynamic widgets and the content thereon. Information may also be segmented by a number of additional means, either independently or simultaneously as an overlay. For example, in certain embodiments, information may be also segmented along a z-axis displayed with an illusion of depth in a 3D space. Alternatively, such segmented information may also be visualized in real 3D space with, e.g., actual depth on devices supporting 3D display. Means for 3D display for segmented information of any arbitrary grouping may adopt any known or future methodologies. For example, various known techniques may be used such as, without limitation, alpha-blend (or transparency adjustment), multi-axis, e.g., xyz-axis, widget or content with a widget positioning manipulation, haptic feedback upon overlay, visual overlay, audio prompt (optionally corresponding to on-hover events), voice based command triggering, eye or gaze tracking, number-based labeling, force feedback, user-based tagging, creation of visually distinct color groups (whether by contrasting colors, alpha blend, or other means) representing different classes of information (e.g., a classification code in one case, company names in another case, and semantic relevancy in another case). Haptic feedback overlay may be achieved via, e.g., dragging a finger across a semantic map with locations rumbling to correspond to layer density, relevance, classification grouping, or any arbitrary combination thereof via a pulsing or other secondary/tertiary haptic feedback mechanisms.

As discussed herein, the interactive interface may have multiple widgets that may present different information in each but are capable of presenting such different types of information in different widgets in an inter-connected manner, e.g., information displayed across different widgets may be coordinated dynamically in response to, e.g., user interaction activities. The interface may also facilitate a user to specify or choose some content to be displayed in certain manners. For example, a user may select some information or content in display with emphasis, e.g., highlighted. In some embodiments, the interface may allow a user to select one class of information (e.g., current assignee) to be emphasized in a particular manner, e.g., highlighted, across one or more widgets, in order to more easily infer groupings or relationships within that content set, the information may be separately filtered by one or more additional supported metrics (e.g., earliest priority date). In other embodiment, the same manner(s) of emphasis (e.g., highlighting and/or alpha-blend) may be subdivided into a visually or otherwise notable distinct sub-classes (e.g., highlight in green with alpha-blend of 0.5 for relevant selected CPC codes, highlight in blue with alpha-blend of 0.5 for company name, and/or highlight in different shade of green with alpha-blend of 0.9 for relevant selected IPC code), simultaneously while representing multiple classes of information (i.e. both company names, and classification codes). Searchable indices of document clauses allowing for multi-layer grouping may enable such functionality.

When focusing a t-SNE algorithm or other semantic map, some embodiments of the present teaching may allow positions to be optionally held state and filtered inside without redraw. Caching techniques may be used to store further state information as described herein.

In certain embodiments, t-SNE positions may be recorded and stored in memory or disk such that, upon adding additional data points (whether new documents upon an updated search at a later date, or a supplemental data set from the same initial data), only the new positions are calculated and the new items are merged into the original map (possibly with a visually distinct overlay, e.g., z-axis, alpha-blend, color). In other embodiments, a t-SNE may be held fixed during filtering operations which may not result in a new query executing and a shift in the map. Shift prevention may also leverage caching techniques. A shift may be forced if desired by a user at any point (e.g., user applies a filter and actively selects for the map to re-draw for comparative purposes). Old map states may be stored and retrieved at future times in certain embodiments or may be presented simultaneously in time series (such as via multiple resizable panes, selectable drop-down, z-axis shift, and combinations thereof). Common snapshots may be automatically generated, e.g., search "autonomous vehicle with lidar" and provide a map for all changes quarterly between 2014 and 2016 for a defined list of entities or across all patent data, subject to user modifiable intervals.

Visualization may be challenging when a small subset of documents, e.g., 50-100 documents is retrieved. In this case the relative distance space between elements (e.g., hexagon, dot) of, e.g., t-SNE, may be automatically adjusted to remove whitespace, and the pane may be scaled down in certain embodiments. In certain embodiments, results from multiple independent queries may be visualized in a single embedding to produce a layered visualization. Relevant results from one of the multiple independent queries constitute one layer.

In certain embodiments, results from multiple independent queries may be visualized in a single embedding to produce a layered visualization. Relevant results from one of the multiple independent queries constitute one layer. The results from each layer are jointly visualized such that documents of similar semantic content or technologies are mapped close to each other, even across layers. Layers may include documents associated with one company, different portfolios, documents relevant to certain technologies, or any other query supported by the system. The system gives the option to present documents from a certain layer using a different color or pattern than other layers; in such a way the relative number of results from a layer in different conceptual areas can be easily seen. This has different practical effects depending on the individual queries used as layers, e.g., if the layers represent patents assigned to companies, the layered presentation helps to show the conceptual or technological areas of independence and overlap for each company. The user may also toggle visibility of each layer or view only results from one or more selected layers.

Visualization of Document Clusters and Relationships

In certain embodiments, a polar or degree-based coordinate system is used to distribute word clouds representing semantic topical relationships radially, in a manner by which a circular restriction operates as a date filter (i.e., tree-ring style search interface) and/or radial segments represent topical distinctions. Documents grouped by bins can be distributed with regard to the topic relevance and date. Document coloring can be determined based on relevance or based on date. Bins in visualizations may be colored using a power mean of document values so that bin colors are closer to the most relevant or newest document in the bin.

In certain embodiments, coloring may be consistent with coloring in visualizing for the semantic map and the tree map. A word cloud may be visualized to also show topics associated with the underlying document. In certain embodiments, a time tube may be used that may comprise a word cloud sorted radially by topic according to semantic-derived document angles. In certain embodiments, one may change the starting position of each term based on its angle. In other embodiments, just the color of words may be impacted by their angle. In certain embodiments, the words and weights may come from a search engine document retrieval request.

Traditionally citations, whether forwards or backwards, are presented in a list or tree format. In certain embodiments, citation information, of documents, such as patents or technical literature, may be presented as embedded within a disclosed hard clustering and/or dimensionality reduction visualization. Such information may be determined automatically upon user selection (whether forwards, backwards, or both), and a depth of citation level, may be selected (typically 1 to 5 levels). In an additional embodiment, a directed two-way bi-partite citation graph may be presented, wherein a user-defined or automatically generated grouping (e.g., an entity, such as a company, a classification code across a defined period of time, or a group of semantically related documents) is used as a node, and the arrows are the relationship to another defined entity in terms of citations (e.g., a second entity, such as another company or an inventor) with visual indication of directionality. Counters or other known visual means, e.g., size, shape, location, may be used to indicate the closeness of a relationship and its magnitude.

An entity can be a company, an organization, an individual, a product, a technical standard, etc., that can be modeled as multiple semantic vectors from a set of technical documents associated with the entity.

An aggregated entity thus can be visualized using any techniques that are suitable to visualize a directed graph. Aggregated entities can also be indexed and searched using any graph based indexing and matching techniques. Matching individual entities within an aggregated entity can also be performed, e.g., matching products represented by product documents to technologies represented by patent documents. The graph-based visualization of entities can be integrated into the search system and allow users to visualize entities in the query and matched entities in the result set.

In another embodiment, pre-modeled entities or aggregated entities of multiple companies can be combined into one directed graph by linking/overlaying the nodes that meet certain criteria, e.g., relevance or time criteria. The merged directed graph can be visualized to see the relationships between technologies or products owned by different companies. In another embodiment, the matched entities or aggregated entities in a search result set can be combined into one directed graph on the fly by linking/overlaying the nodes that meet certain criteria, e.g., relevance or time criteria.

Figure 17A:
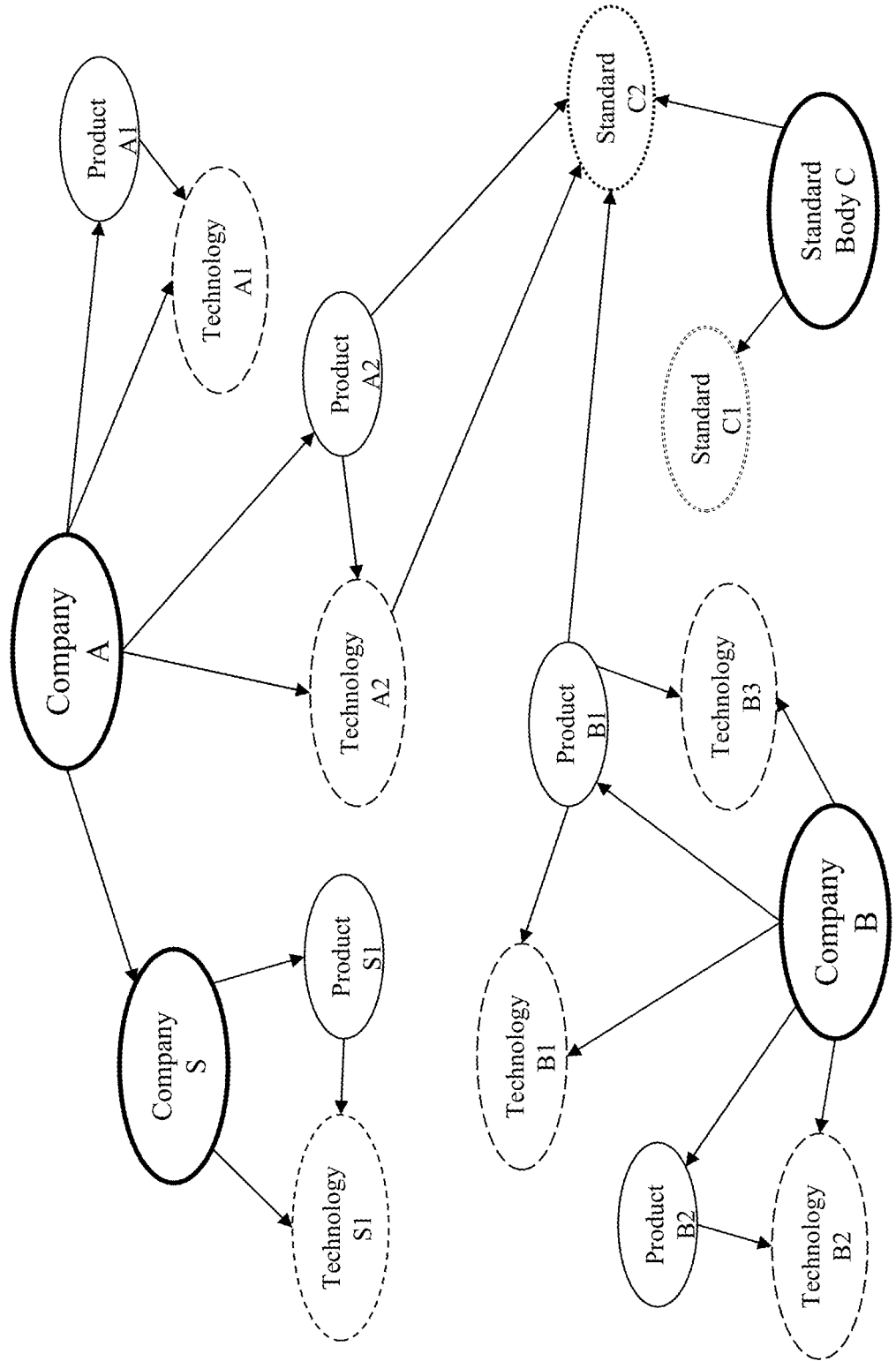
FIG. 17A depicts exemplary visualizing entities and relationships thereof, in accordance with an embodiment of the present teaching.

FIG. 17A depicts an example visualization of entities and relationships thereof as directed graphs, in accordance with an embodiment of the present teaching. According to the present teaching, a directed graph may be used to visualize an entity. As discussed herein, an entity can be a company, a technology, a product, a standard, an individual, etc. Each entity may have one or more aspects. For instance, a company may have technologies and products, each of which (also as an entity) in turn may have its respective aspects. For example, a product may have design documents, marketing documents, etc. In accordance with the present teaching, an entity, e.g., a company, can be represented or visualized as a graph, with nodes represented as the entity and its associated aspects such as technologies and products of the entity. For example, company A in FIG. 17A is presented as a direct graph with a node representing company A which is linked to other nodes representing different aspects associated therewith, e.g., technologies A1 and A2 and product A1 (using technology A1) and product A2 (using technology A2).

Different graphs representing different entities may be linked via relationship between entities. Some examples are provided in FIG. 17A. In this example, company A owns a subsidiary company S, technology A1 represented by, e.g., a group of patent documents, technology A2, product associated with technology A1 and product associated with technology A2. Also as shown, a company S has its own technology S1 and a corresponding product related to technology S1. Product associated with technology A2 comply with a standard C2 and the associated technology A2 is also covered by standard C2. In this example, standard C2 is shown developed by standard body C. In addition, company B owns multiple technology, e.g., B1-B3 and has products associated with technologies B1-B2. Product associated with technology B1 also complies with standard C2 and relies on multiple technologies, including technology B1, which is related to technology A2 through standard C2.

As seen in FIG. 17A, companies A and S are related because of their subsidiary corporate relation (company S is a subsidiary of company A). Given that, the two directed graphs representing respectively company A and company S can be connected. Entities may also be linked via other relationships. For instance, company B is related to company A because both companies have products (product B1 and product A2) that comply with the same standard C2 and as such both companies A and B are related to the entity node for standard C2. As such, the directed graphs for company A and company B are connected in FIG. 17A and both directed graphs for company A and company B are connected with the directed graph for standard body C.

By linking the entities in this manner and visualizing such linkage via, e.g., shading or coloring based on the relevancy, companies with similar technologies and/or products may be more easily identified via visual information. The graph as shown in FIG. 17A may be displayed through either a 2D or a 3D visualization scheme, which may provide various operational tools embedded therewith to allow a user to manipulate the presented graph. For example, a user may specify, via such embedded tools, to redraw the graph or center the graph around a particular entity being clicked.

Figure 17B:
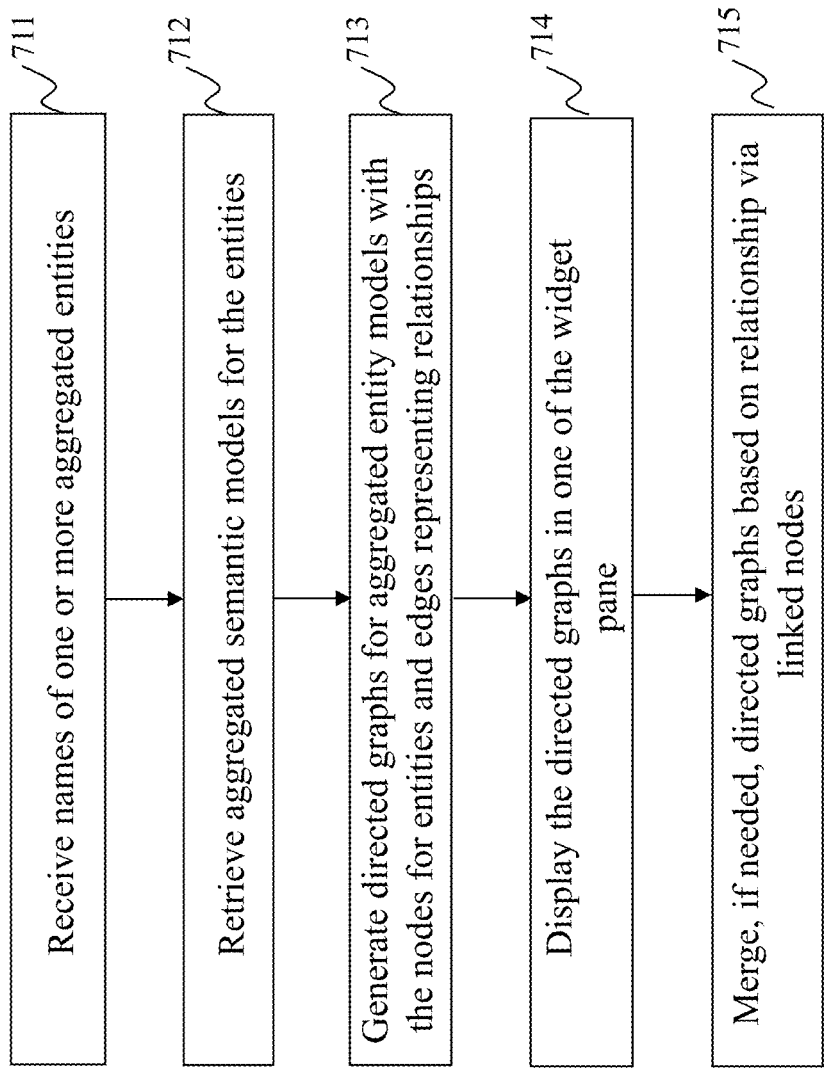
FIG. 17B is a flowchart of an exemplary process for visualizing entities, in accordance with an embodiment of the present teaching.
Figure 17C:
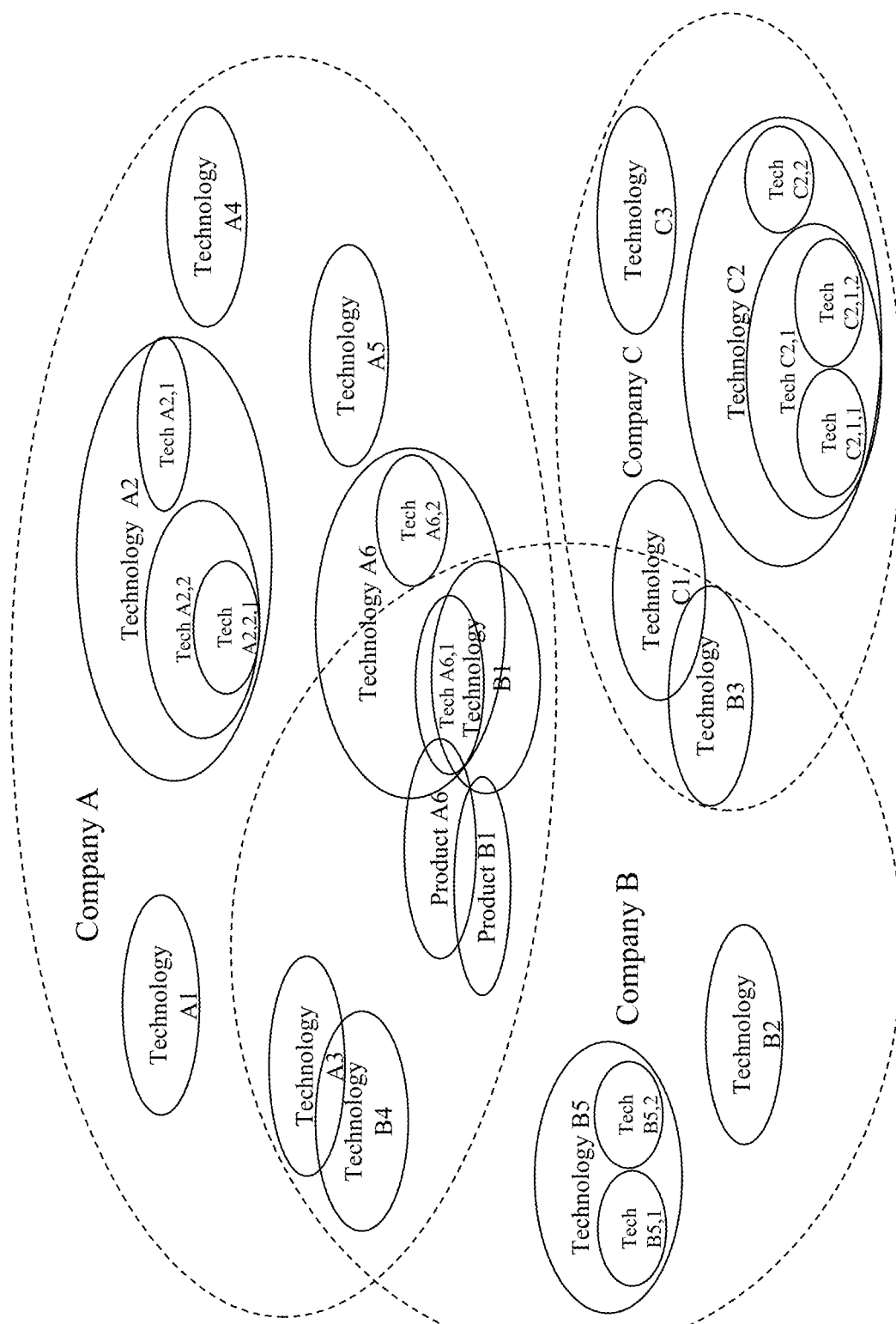
FIG. 17C depicts an example of competitive analysis of entities, in accordance with an embodiment of the present teaching.

FIG. 17B is a flowchart of an exemplary process for visualizing entities, in accordance with an embodiment of the present teaching. One or more names of aggregated entities is received at 711. As discussed herein, an entity can be an individual, a product, a standard, a company, etc. An entity may be semantically modeled based on a collection of documents associated therewith. Each of the aggregated semantic models for those entities is then retrieved at 712 based on, e.g., some index thereof. For each of the entities, a directed graph is generated, at 713, with nodes in the graph representing different aspects of the entity and edges representing relationship among these aspect of the entity. Such directed graphs generated for entities may be visualized, at 714, in some widget panes. When different entities are related via some semantic relationship, directed graphs representing such related entities may be merged and displayed, at 715, as linked directed graphs.

FIG. 17C depicts an example of competitive analysis applied to entities, in accordance with an embodiment of the present teaching. The illustrated example may correspond to a search for technologies related to a specific technology, e.g., Tech A6,1, and the search may focus on specified company A, company B, and company C. The result shown in FIG. 17C includes technologies and products from the three companies that are related to Tech A6,1. The searched technologies and products may be at different levels. Each searched technology or product is displayed as an entity, represented by an aggregated semantic model having an aggregated semantic feature vector representation and a semantic signature representation, which can be used to map the technology or product to a 2D visualization scheme.

In some embodiments, a semantic map, capable of mapping individual documents, can be used to map entities, i.e., technologies and products, on an interface to visualize the inter-relationship among such entities. The distance between a pair of entities represents the similarity between the underlying entities in the pair. In visualizing the entities, an eclipse may be drawn around each entity in a manner that the size of the eclipse is determined based on the number of documents representing the entity. From the exempla semantic map shown in FIG. 17C, it can be seen that Tech A6.1 is in close proximity to technology B1 and corresponding products product A6 and product B1 are also close to each other. The semantic map also shows that company A competes with company B in the area of technology A3 and technology B4 and their products, i.e., product A6 and product B1, also compete. In addition, company B competes with company C in the area of technology B3 and technology C1. That is, through a semantic map, one can visualize various relationships in an efficient way. This is due to the aggregated semantic representations for entities as well as the way the semantic map is constructed and projected. A semantic map, as shown in FIG. 17C, can be used as a basis to drill down to any individual documents associated with any entities displayed therein. Different data manipulation, visualization, or interaction tools may be activated based on any of the entities displayed in the semantic map or documents associated with any selected entities. For example, a user may select entity Tech A6,1 and request to perform trending topics analysis with respect to Tech A6,1. As another example, a user may select entity technology B1, product A6 (of company A), and product B1 (of company B that uses technology B1) to analyze the documents associated therewith in order to determine the timeline of developing each of the selected technologies and products associated with development timeline of each related technology and product of the two companies.

Figure 17D:
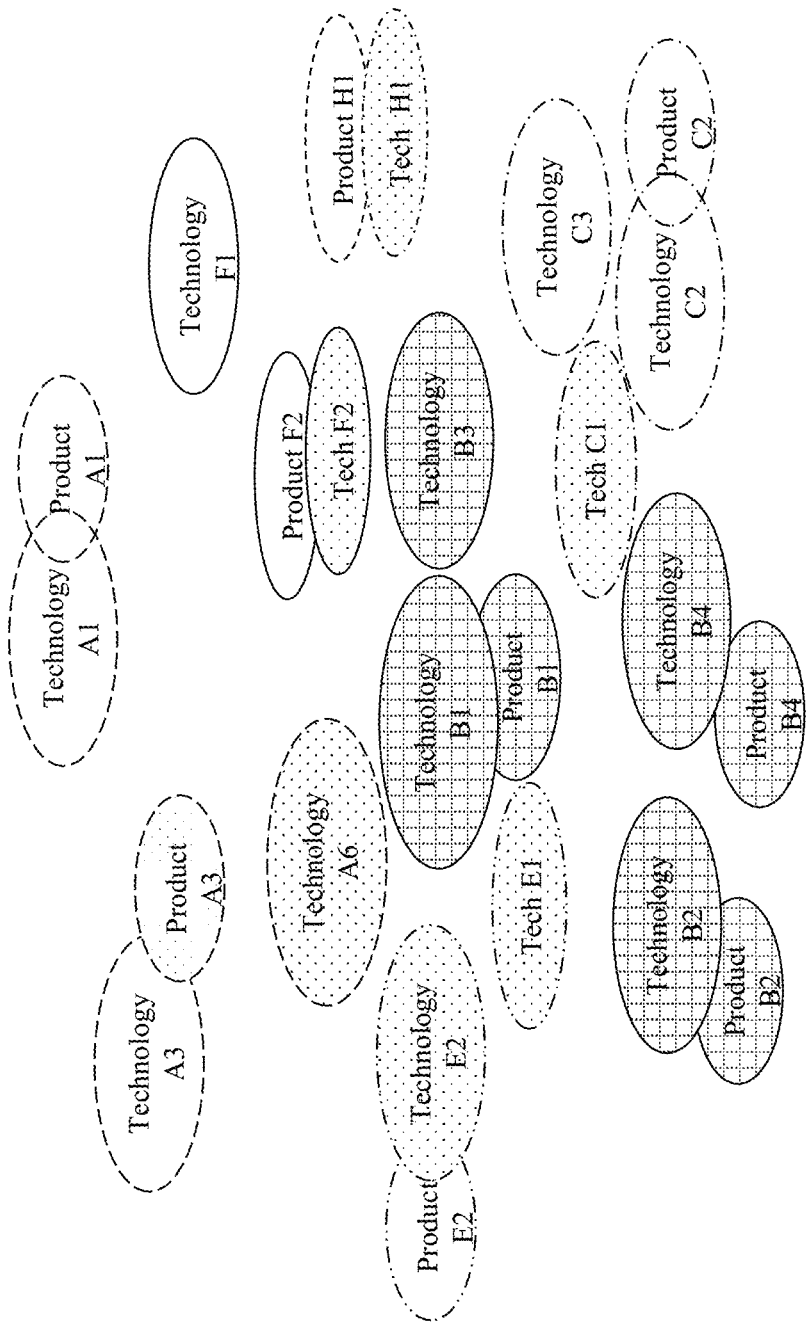
FIG. 17D depicts an example of white space analysis of technologies and products, in accordance with an embodiment of the present teaching.

FIG. 17D depicts an example visualization of a result of white space analysis performed with respect to some technologies and products, in accordance with an embodiment of the present teaching. White space herein refers to a technological space that has not been occupied from IP landscape point of view. To perform white space analysis, a search directed to concepts related to a specified technology of interest may reveal technologies and products related thereto. The search may be based on the semantic model of the technology of interest and that of the candidate technologies and products. Such identified related technologies and products may then be visualized for white space analysis.

The example of white space analysis as shown in FIG. 17D include technology B1 as a specified technology of interest, based on which a search for related technologies and products is carried out based on semantic models of technology B1 and that of other modeled technologies and products. The search result is visualized in FIG. 17D in a 2D visualized scheme, where for each searched technology or product, an ellipse is drawn with a size determined based on the number of documents associated with the underlying technology/product of the ellipse. For example, the research result reveals different technologies and products that are relevant, e.g., technologies A6, B2, B3, B4, C1, E2, etc. and products that use some of such searched related technologies. Each of them is presented as an ellipse of an appropriate size indicative of the amount of supporting documents used to model the entity.

For illustration, FIG. 17D shows searched technologies/products of different companies at a top level. For example, technology A6 belongs to company A; technologies B1-B4 belong to company B; technology C1 belongs to company C; technologies E1 and E2 belong to company E; and technology F2 belongs to Company F. What enables such a visualization is the aggregated semantic modeling of each entity (company, technology, product, standard, etc.) so that not only each of the technologies and products may be sized (ellipse) based on the number of documents used in modeling but also how each entity is positioned in the visualization is based on the relative semantic distances among different entities. As such, from the visualization of technologies/products, a user is able to visually detect relevant information. For example, as can be seen in FIG. 17D, technologies E1 and C1 occupy the space between company B's four technologies B1-B4. This indicates that company B, company E, and company C have similar technologies and likely competing products.

Information conveyed visually to a user in such a semantically relevant manner enables the user to quickly see various implications that are made visually explicit which are otherwise difficult to detect without the technical advancements of the present teaching. For example, from the visualization as shown in FIG. 17D, a user can easily identify, visually, the area(s) that have not yet been occupied (white space) by any other company. In addition, a user may also, via such a visualization, identify competitor(s) or collaborator(s). In FIG. 17D, because of the close proximity between technologies E1 and C1 with company B's multiple technologies B1-B4, company E or C may consider licensing its related technologies E or C to company B. On the other hand, company B may consider acquiring rights to technologies E and C or cooperate with one or both in these areas.

As discussed herein, each of the entities presented in such a visual representation may be individually drilled down to explore further at lower levels. For instance, based on each technology in FIG. 17D, a user may elect to perform a trending topic analysis based on the aggregated semantic model for the technology and/or various documents associated with the technology entity. Leveraging such predicted trending topic(s), a decision may be made as to whether a company should invest to expand its technology base in a promising new direction. For example, company B may perform a trending topic analysis on some of company A's existing technology and recognize that it is a promising direction even though company A has not yet headed that direction, company B may decide to invest to expand its own technology in that direction in order to occupy the market.

As discussed herein, a tree map may be used to represent clusters of documents. Each cluster may be represented or visualized in a tree map as a block with a label. A block in the tree map may be nested or a block (cluster) may have sub-blocks (sub-clusters) therein, and each of the sub-blocks (sub-clusters) may further have sub-blocks (sub-clusters). In this way, textual information may be represented as a hierarchy of clusters or blocks. A tree map may be visualized at a top level of a hierarchy. Once presented or visualized, each block rendered in the visual presentation may be further explored to examine the sub-block structure therein, etc. When visualizing each block in a tree map, there may be visualization parameters involved. For example, such parameters in presenting each cluster may include a position to render the block representing the cluster and a size of the block. The size for a block of a cluster may be determined according to, e.g., the number of documents in the cluster or the value of a relevance score with respect to a query which may be computed as a sum of relevance scores with respect to all documents in the cluster.

A position of a block in the tree map representing a cluster may be determined based on, e.g., any of box-packing algorithms. In some embodiments, an N-dimensional representation of a cluster centroid can be embedded onto a unit circle using, e.g., 1-D polar t-SNE algorithm, in such a manner that semantically similar cluster centroids are mapped to similar angles or positions on the circle. Using this embedding approach, centroid representation of each cluster can be used to derive an angle and a position on the circle with a color, where the color associated with each centroid of a cluster is so determined that semantically similar clusters are associated with visually similar colors. By using such a color scheme to visualize different clusters in the tree map, relationships among clusters can be visualized. Such relationships include hierarchical or nested block relationships. As discussed herein, information may be represented as a hierarchical tree map, i.e., a block in the tree map may correspond to another sub-tree map and so on.

As discussed herein, similar coloring scheme may also be adopted in visualizing the time tube and the semantic map, where colors to be assigned to documents are determined based on weighted similarity to top N (e.g., N=3) clusters and the mean of the cluster angles. Thus, the coloring scheme is consistent in visualization of information presented across the time tube, the semantic map, and the tree map.

In some embodiments, the tree map may operate to respond dynamically to changes in dimensionality reduction or in AI-based visualization to show relative distinctions between different visualization methodologies. This may be used to simplify navigation. Such a tree map may in certain embodiments use word labels which are obtained from the semantic result concepts using, e.g., a greedy algorithm, for display within a given tree map node (e.g., square). Tree map provides another way of visualizing aggregated entities as discussed above.

Visualizing Related Processing—Highlighting

As discussed herein, in visualizing semantics embedded in documents, certain content associated with certain semantics may also be made visually explicit via visualization related operations such as highlighting. In some embodiments, highlighting may also be applied to concepts. Concepts may be detected from documents (words, phrases, etc.). In some embodiments, concepts may also be highlighted, e.g., via keyword highlighting. In doing so, keywords (which may be specified via short natural language queries) may be supplemented using, e.g., keyword models, so that closely related concepts may also be highlighted. This is because a keyword model provides a model for closely related concepts for keywords or concepts.

In certain embodiments, semantic/conceptual highlighting may leverage such automatic concept supplementing, thereby allowing a search engine to link portions of a document (for example, claimed limitations) to other portions of the same document or even another document (e.g., a patent or application along the priority chain). In this manner, linked content in different documents associated with the same semantics/concepts may be highlighted to make the semantically meaningful linkage of textual content visually explicit. In addition, limitations specified with respect to claims in a claim tree may be used for supporting context and/or weighting. As discussed herein, highlighting concepts may leverage keyword models to identify not only specified words in documents (e.g., a disclosure of a patent) but also words/concepts closely related to the specified words. For example, a user may select (a relevant portion of a document (e.g., an original or amended limitation in one or more claims). The search engine may, based on the selected text and keyword models, identify other portion(s) of the same or a related document, which may be determined via, e.g., a priority chain, incorporation by reference, or other qualifying criteria. Such an identified linked document, e.g., disclosure(s) that relate to a specified claim limitation, correspond to related semantics/concepts that either support the selected text (e.g., a claim limitation) or similar in semantics/concepts so that they can be highlighted as well. In this way, while highlighting specified keywords or concepts, by leveraging keyword model enables, the system is able to highlight also concepts that semantically are closely related. For example, if a user selects to highlight "cell phone," using the keyword model, the system is able to also highlight "smartphone."

Portions of document(s) identified to be relevant to certain concepts/semantics for highlighting may be ranked in terms of, e.g., relevance or closeness. The ranking may be represented via, e.g., a number of discrete scales such as high, medium, or low, or via visual representation using colors. In addition to substantively assessing legal requirements related to enablement and written description for patents or patent applications based on text based processing, the highlighting function as disclosed herein may assists a user in spotting issues more effectively via visual means. This is particularly so when coupled with citation, user-specified, and/or author-based document linking and the fact that the solutions disclosed herein according to the present teaching are applicable to all documents, including patent and non-patent related literature to help a user to identify quickly and more effectively, via both substantive (e.g., semantic modeling) and effective visual (e.g., highlighting) means.

As discussed herein, various aspects of the present teaching can be applied to different tasks related to patent asset exploration, examination, monetization, and management via effective means enabled by the present teaching to assist users, who can be corporate personnel, investors, examiners of patent offices, and individuals. With respect to the application to assist in examining whether a disclosure of an invention satisfies certain legal requirements, various aspects of the present teaching may provide means to assess against different legal requirements of a patent or an application. For example, a patent or a patent application may be evaluated with regard to possession of the invention (i.e., its written description) and enablement. Different tasks may present different levels of difficulty. However, providing effective and useful tools to reveal different types of relationships (some can be implicit) among different pieces of information may enhance a user's ability to understand information and assist decision making. For example, semantic models characterizing entities at different levels in combination with semantic/conceptual summarization/highlighting are effective to help users to focus quickly on most relevant information in their tasks. In addition, when combined with inputs provided by users via interactions, the present teaching allows the most relevant information to come forward, whether it is from a single document or one or more collections of documents, in a way that is the most engaging with the tasks in hand. Some example applications of the present teaching include:

Analysis as to whether a patent/patent application satisfies 112 related legal requirements: 112(a) on written description and enablement, new matter issue, 112(b) on indefiniteness, and whether 112(f) is to be applied to certain claim limitations as recited.

Analysis on whether a document is a qualifying prior art reference: ascertain priority date certain disclosed concepts are entitled to, whether a reference is enabling, or lacks written description.

Such analysis may be performed automatically to detect potential non-compliant issues and flag such issues. For instance, the precise priority date of a claim recited in a continue-in-part (CIP) patent may be ascertained by analyzing the disclosure of the CIP patent in light of the language of the claim. As another example, the priority date of a claim in a utility patent application claiming priority of a provisional patent application may be ascertained by analyzing the disclosure of the provisional application with respect to the claim at issue. Through such analysis, an interruption of a priority chain may be detected automatically and that the result could impact applicable dates as prior art for references potentially applicable under AIA 35 U.S.C. 102(a)(2) or a similar statute internationally (and, e.g., pre-AIA 102I).

Although similar analytical functions may be applied for different underlying purposes, the analytical results may be used differently in each scenario for a different task and, as such, distinctions exist in implementing solutions for different tasks based on analytical results via different means on a user interface. For example, determining whether a priority chain breaks exists for an AIA 102(a)(2) art is similar functionally to determining whether new matter exists. The emphasis for a new matter analysis is more focused than text differences or additions alone. For example, based on what is revealed in conceptual highlighting of information provided by the search engine, a flag may be raised that informs a user that, e.g., a lower level of match in content in the specification against a claim in question may warrant additional scrutiny. On the other hand, with respect to a claim reciting a black-box function, an analysis may be performed, e.g., against the specification of the patent/patent application, to automatically recognize that the claimed function is not adequately disclosed, thereby flagging that issues of written description, enablement, and indefiniteness may exist.

The conceptual highlighting as disclosed herein can be used to evaluate written description, enablement, priority chain breaks, and potential new matter issue. In some embodiments, it is achieved via, by way of non-limiting example, at least the following sub-tasks:

1. A user selects all or a portion of a claim from a patent or a patent application being assessed with respect to, e.g., written description, enablement, new matter, prior art, or priority date. A user may also select a portion of a disclosure that may apply as a potential prior art for the same assessment.
2. Activate conceptual highlighting to, as described herein, identify key portions in the specification of the patent/patent application or the specified disclosure.
3. Identify related figures that are mentioned in the text of the highlighted portions (e.g., based on content processing) for presentation to the user.
4. Flag and visualize to a user any issue related to written description or enablement based on relevancy/match results and rankings thereof.
5. When applicable, flag issues related to priority date (e.g., directed to a continuation-in-part claim or an application claiming priority to one or more provisional applications) based on any potential breaks in priority estimated in comparing with priority documents in the chain. The flag may be provided with automatically identified most relevant portions in the analyzed documents that support the flagged issue.
6. When applicable, flag any issue related to new matter based on an analysis directed to amendment made to claims or specification during prosecution with automatically identified closest supporting disclosures relevant to the issue.

The above issues are identified and flagged based on analysis of relevant documents and, specifically, on similarities or divergence thereof. The flagged issues may also be provided with a score indicating the confidence in the detected issue. Scoring each of the issues may be achieved based on a degree of divergence in semantic distance among relevant documents. For instance, for written description/enablement issue, the divergence is between a claim and the disclosure on the claimed subject matter in the specification. For new matter issue, the divergence is between amendments made to a claim relative to the original disclosure on the subject matter in the specification. On the issue of priority date of a claim in a utility patent application claiming priority from a provisional patent application, the divergence is between the claim as recited and the disclosure of the provisional patent application.

Textual comparisons for assessing the divergence may be time-sensitive based on prosecution history and associated data and/or metadata. This may require information tracking and indexing of document variations. Some tracking may be achieved by taking advantage of known format of documentation so that relevant information may be readily identified and tracked. For example, for claim amendments on added new clam limitations may be tracked by identifying underlined texts. Whether certain amendments in a claim is relevant may also be tracked by recognizing the location of the amendment. For instance, a change in the status of a claim (e.g., changing from "Original" to "Currently Amended") does not change in anyway the analysis of the claim and an amendment in the preamble may not impact the analysis of a claim. Separation of individual files in prosecution history may also be used to assess events along a relevant timeline.

As discussed herein, conceptual highlighting may link content in different documents in a semantically and conceptually manner, effectively assisting a user to visually see inter relationships among different pieces of information and enabling the user to be able to make a substantive decision with a deeper understanding of interrelated documents. Conceptual highlighting may enable correlations between a claimed limitation and the disclosure, which may relate to both 112 written description/enablement as well as indefiniteness issues. As noted above, in different situations where issues under Section 112(a) are raised (such as a "black box" software algorithm), the issue concerning indefiniteness can also be raised.

Additionally, a level of degree on indefiniteness may also be indicated via semantic highlighting. For example, when a user selects a claimed limitation of "a car seat which fits through a car door," the portion of the disclosure that discusses the dimensions of a car door, if any, may be highlighted for review to determine if some standard is disclosed in the specification that may be relevant to the degree of indefiniteness as to the claimed limitation. Other common terms of degree, such as "approximately," "about," etc. may be flagged in accordance with some set rules and corresponding disclosure related to such terms related to a claimed degree may be semantically highlighted for a user. A related, although distinct, issue to indefiniteness is Section 112(f), which enables the option to claim a claim limitation functionally without reciting structure to perform the recited function. In this situation, although 112(f) is not a basis for rejection and merely a statutory construction for functional claim interpretation, such a claimed limitation on a function may raise not only 112(f) issue but also issues related to indefiniteness, written description, and/or enablement.

Relevant legal rules may be programmed therein according to the present teaching to identify automatically relevant 112(f) triggering terms such as "means for" or "step for." Simultaneously, any equivalents in terms of generic placeholders and bridging terms (such as "module configured to," etc.) may also be automatically recognized and submitted to a user as a potential issue. Conversely, certain claim language that may prevent the application of 112(f) interpretation may also be automatically incorporated (such as "circuit configured to"). These first two prongs of 112(f) analysis, when potentially satisfied, may result in a flagged issue on certain claimed limitations for a user's consideration by highlighting the function claimed to be performed. The user may be given an opportunity to input additional potential equivalents, or any already known disclosed structures to perform the recited function to assist in identifying portion(s) of the specification for 112(f) analysis and determination. In some embodiments, semantic highlighting may subsequently provide a summary of relevant portions of the disclosure for review in order to ascertain the metes and bounds of the functionally claimed limitations under 112(f), potentially aide the user in identifying any issues relating to the inadequacy or indefiniteness of the disclosure. Thus, such analysis based on semantic highlighting enables a more effective and rapid identification of a broader range of supporting disclosure than the traditional keyword-based searching or manual operation.

Term co-occurrence observed intra-document or concept term co-occurrence in a result set (query specific or entire corpus) may be used to in scoring particular words or phrases, which may then be grouped together semantically to improve the accuracy of summarization of prior art. According to the present teaching, this is achieved by going beyond keyword only or linguistic/sentence centric work and performing compound generation via a combination with a semantic model. Leveraging the concept of trending topics (rising, peaked, or falling), certain topics may be specially emphasized or deemphasized for highlighting with respect to a corresponding query (although summarization or highlighting may also occur in the absence of a query).

Highlighting may also be applied according to some specified timed schedule. In some embodiments, the granularity of a date-based highlighting may be specified by a user, e.g., according to a desired interval such as monthly, quarterly, yearly. The granularity may be optionally influenced by any date filters as applied to some pre-defined default (e.g., monthly when searching within 1 year). For patent related applications of the present teaching, highlighting may be used for, without limitation, highlighting based on assignees (original, intermediate, current), parent company, dates, authors, inventors, CPC or IPC subclass, CPC or IPC subgroup.

For semantic highlighting (e.g., AI-KWIC) with optional conceptual summarization, the user may set one or more sliders to change relevant model thresholds (e.g., semantic similarity) for purposes of setting a granularity to be applied to any highlighting and/or summarization. Sliders for specifying summarization scope and/or general summarization toggles (on/off) may be separate or coupled with highlighting sliders. Highlighting sliders may correspond to threshold sliders which may be general for all terms and/or term-specific via presentation of additional sliders.

In some embodiments, different elements or widgets in different visualization modules on a user interface may be customized by users. Visualization interfaces disclosed herein form a dynamic and modular plug-in UI framework that supports message passing between different widgets or interface elements. As a result, information may be dynamically pushed/pulled or updated from one visualization to another in relevant widgets. Performing an operation in an initial visualization UI element may cause another to update its visualization accordingly with changes corresponding to the operational result performed in the original visualization UI element. Due to reduced processor usage, polling is preferred. However, any other known message passing techniques may also be used. The ability to update display of results dynamically across multiple visualization panes in a UI interface enables a user to get coherent information in multiple dimensions so that they can quickly find relevant relationship among different pieces of information, understand intersection of different aspects and their classification metrics (e.g., CPC, hard clustering algorithms, dimensionality reduction algorithms, bar charts sorted by semantic relevance, etc.), and always obtain focused data with enhanced user experience.

Visualized information in different panes of a UI interface may be dynamically updated in accordance with an event occurred with respect to one or more visualizations triggered, e.g., by a user interaction. This is discussed in detail with respect to FIG. 18.

In accordance with an embodiment of the present teaching, the number of widgets (i.e., panels) to be included in an interface may be configured and reconfigured. A user may also configure the layout of widgets for an interface using, e.g., drag/drop, touch gestures, or equivalent means to move or designate the locations of widgets. A user may also size and resize the widgets within the confine of an interface along their respective borders to optimize or customize the screen layout. One special exemplary type of widget may appear to be an overlay, which a user may deposit over any other widgets to create the overlay effect.

A user may provide an input via a device to manipulate or control the operation, behavior, or visualization schemes. A device compatible with the disclosed interfaces, include, without limitation, mouse, keyboard, trackball, touchscreen, touchpad, pointing stick, joystick, videogame controllers, gesture sensitive devices with multi-axis gyroscopes, haptic-feedback enabled devices such as rumbling controllers, multi-touch sensitive devices, capacitive touch devices, resistive touch devices, stereoscopic or depth-sensing cameras, other known input devices, or any combination thereof. Compatible display devices include, without limitation, traditional displays (irrespective of touch sensitivity support), e.g., LCD, OLED, QLED, as well as augmented or virtual reality glasses, however certain display functionality may be enabled, in computing devices with display devices and/or graphics cards or processing units (GPU), tensor processing units (TPU), or central processing units (CPU) which support the aforementioned input devices, as well as Vulkan®, Apple Metal®, DirectML®, OpenGL®, OpenCL™, CUDA®, DirectX®, augmented or virtual reality (AR/VR) overlays, alpha-depth blends, and/or parallax display, such as 3-D glasses, or non-glasses based parallax-capable display screens (e.g., New Nintendo 3DS®) or certain client or server machines with support for certain machine-learning accelerators (e.g., AVX, AVX2, AVX-512, Vector Neural Network Instructions (VNNI) [e.g., Intel® Deep Learning Boost], NVIDIA CUDA® Deep Neural Network Library®, OpenCL™). Software may be SaaS, fat or local client, with or without connections to one or more local or cloud servers for computation and retrieval, including traditional operation systems, such as Windows®, Linux®, and macOS®, as well as smartphone, tablet, smart device, IoT device, smartwatch, or similar apps, e.g., iOS®, Android®. Certain embodiments may incorporate models via machine-learning interoperability frameworks, such as ONNX®, to support multiple third-party frameworks, converters, runtimes, compilers, and visualizers, e.g., TensorFlow®.

Visualization of Weights and Relationships

As discussed herein, AI-KWIC may be used for conceptual highlighting for user-defined (or automatically determined based on a query or Boolean filter) or manually specified (by the user in a separate highlighting interface) concepts. Such automated highlighting may correspond to a togglable global option setting. In certain embodiments, AI-KWIC may be set to a relevancy threshold or "fuzz" factor of zero, thereby functioning the same as traditional KWIC with regard to applied filters. The fuzz factor may be controlled via a slider or other known UI means. In certain embodiments, a curve or tapering of the "fuzz" factor for a given highlighted term may define a variable per-term cut-off point. In certain embodiments, the "fuzz" factor may be based on an analysis of the result set as a whole (omitting any non-matching intradocument terms). In other embodiments, it may be based on an intradocument analysis, or a combination of both. It can also be used in combination with Luhn, RAKE, or equivalent algorithms to influence the ranking of word counts or, compound concept counts, respectively, used in the ranking process. A list of stop words, which are ideally supplemented by corpus specific information may be used in a preferred embodiment. Multiple terms or phrases may be highlighted separately in separate colors, and for a given phrase or term, related terms may be highlighted in certain embodiments at a different level of opacity, which represents the closeness of the relationship or the "fuzz" factor.

In some embodiments, results may be added to a 'topic' element in a visualization-related response from a search engine. In certain embodiments, a topic that resembles the clustered results summary response may be defined as a list of objects with term and weight. A topic may be characterized by one or more terms, so that terms with similar time distributions can be merged into one topic. Each topic may be stored with an indicator of the presence of that topic at a particular time. This may form a series of two-dimensional points, with the x-coordinate being the date and the y-coordinate being a weight of the topic at that date; and as a result, these points may describe a curve.

A timeline control module is compatible with not only a mapping client, but also a clustered-based concept wheel in a preferred embodiment (i.e., depicted time tube, semantic map, and tree maps). To ensure cross-compatibility, one embodiment takes as input a document field (present in the map results) to use as the date. Selection of a date range should be allowed. Filters on other widgets may, in a preferred embodiment, cause the timeline widget to be updated.

Control of Granularity

In some embodiments, a visualization layer may also include modules that can be used for labeling or sampling depth with respect to, e.g., a semantic map, a tree map, and/or charts. In certain embodiments, whereby NPL has previously been classified into either its own schema, or a known classification such as CPC, labels for word concepts or highlights may apply across data sets that are not originally classified in said schema. Labels may comprise semantic labels and/or classification schema derived descriptions (e.g., portion of subgroup description). The percentage of classification schema labels for use on a map may be customized by a user to be between 0% and 100%. Such labels may appear in a different color than concept labels based on one or more additional models. A hierarchy may be visually indicated and zooming on a particular area of the map may introduce labels derived from subgroups rather than subclass. In certain embodiments, a semantic map may be generated based on t-SNE algorithm, which does not require data to be pre-classified to draw and may be executed simultaneously on patents+NPL. Patent-specific operations may be executed in a mixed search and display mode, such as simple or extended family roll-up for patent documents (while ignoring for purposes of roll-up but continuing to display NPL) and/or patent-only search filters which similarly may be ignored for filtering purposes for NPL, e.g., claims.

However, in certain embodiments the labeling content is not tied to the zoom but may be tied to other metrics such as the specificity of the query (as determined by the relevancy curve or its derivatives/slope, document counts, etc.), and in certain embodiments is based solely on option settings provided by the user as to which models to use (as between subgroup, subclass, data source specific (e.g., particular classification codes or particular content collections), semantic, etc.). This may be particularly useful when conducting a broad landscape search but wishing to highlight by a very narrow metric, e.g., CPC subgroup.

Syntax may be used to select applicable classification code ranges for labeling, such as wildcards or ranges. Potentially useable labels may be stored in a search engine or database as a key-value pair, including both the label itself and its source (semantic modeling, CPC, etc.), and optionally its rank in a hierarchy if derived from, e.g., CPC. Given the potential length of such classification-based descriptors, in certain embodiments the labels may be based at least in part on pre-training to identify concepts from a schema. Hover events in certain embodiments may show full schema descriptions or a portion there of.

Further, stop words for legal or technical common terms such as "preferred embodiment" or "non-transitory computer-readable medium" may be used either automatically or subject to user modification to suppress labels. Label density may be adjusted and particular labels may be hidden or added by a user in certain embodiments. In another embodiment additional descriptive text labels may be suggested in a structure optionally organized into a hierarchy, or automatically generated based on user tagging.

Sampling depth may be defaulted to a particular value (e.g., 4,000 documents) and may be executed based on defined criteria. In certain embodiments, the criteria include semantic relevancy, but semantic relevancy may also be influenced by additional criteria such as date and/or citation activity. The sampling depth may be constant across all visualizations and/or may vary based upon user-defined criteria and/or computational cost. For example, a t-SNE algorithm utilizing a Barnes-Hut approximation for semantic mapping has a complexity of O(nlogn) and therefore, the sample depth of, e.g., 20,000 may be calculated within 30 seconds in a typical case, but a depth of 4,000 may appear near instantly. Further, sample sets may be cut-off based on relevancy and/or consistent entirely of pre-curated data sets. Traditional charts and portfolio-level information, e.g., overall count of active patents, may be presented distinctly from sampling size.

Tree Map Buckets

Tree map buckets are defined based on k-means clustering in certain embodiments. A user may navigate via, e.g., a hover, click, or touch event between different zoom levels in a hierarchy. A tree map may be sorted by relevancy or by count. Colored horizontal bars may appear within a node of a tree map to indicate a separately highlighted piece of information, e.g., distribution of classification codes, distribution of current assignees within a node, relationship between parent/child companies. Document counts may also be shown on a per category basis. In alternative embodiments, bars may be displaced using patterns, or equivalent UI means may be utilized to show content distribution, e.g., named list with counts, vertical bars, etc. As filters are applied a tree map nodes may rearrange based on distribution of content within the subset of filtered information.

A tree map in a preferred embodiment, acts in combination with a t-SNE map to show corresponding highlights and preferentially the t-SNE positioning is held static during the filter operation, except for, in certain embodiments, collapsing to reduce exceeds space taken by node (e.g., hexagon element) distances. The tree map may in certain embodiments be rectangular, but any shape is supported. The tree map may in certain embodiments use different clustering methodologies than k-means, e.g., classification, or another known clustering algorithm. When highlighting information from, e.g., a bar chart, across certain additional widgets, e.g., trending topics, time tunnel, t-SNE, and/or tree map, information may be hidden from display or may be grayed out (e.g., trending topics no longer relevant to the filtered query). Tree map nodes may be sorted by relevancy to a semantic query and/or by count. Highlighting by relevancy or count may be distinct from sorting for purposes of display.

Figure 18:
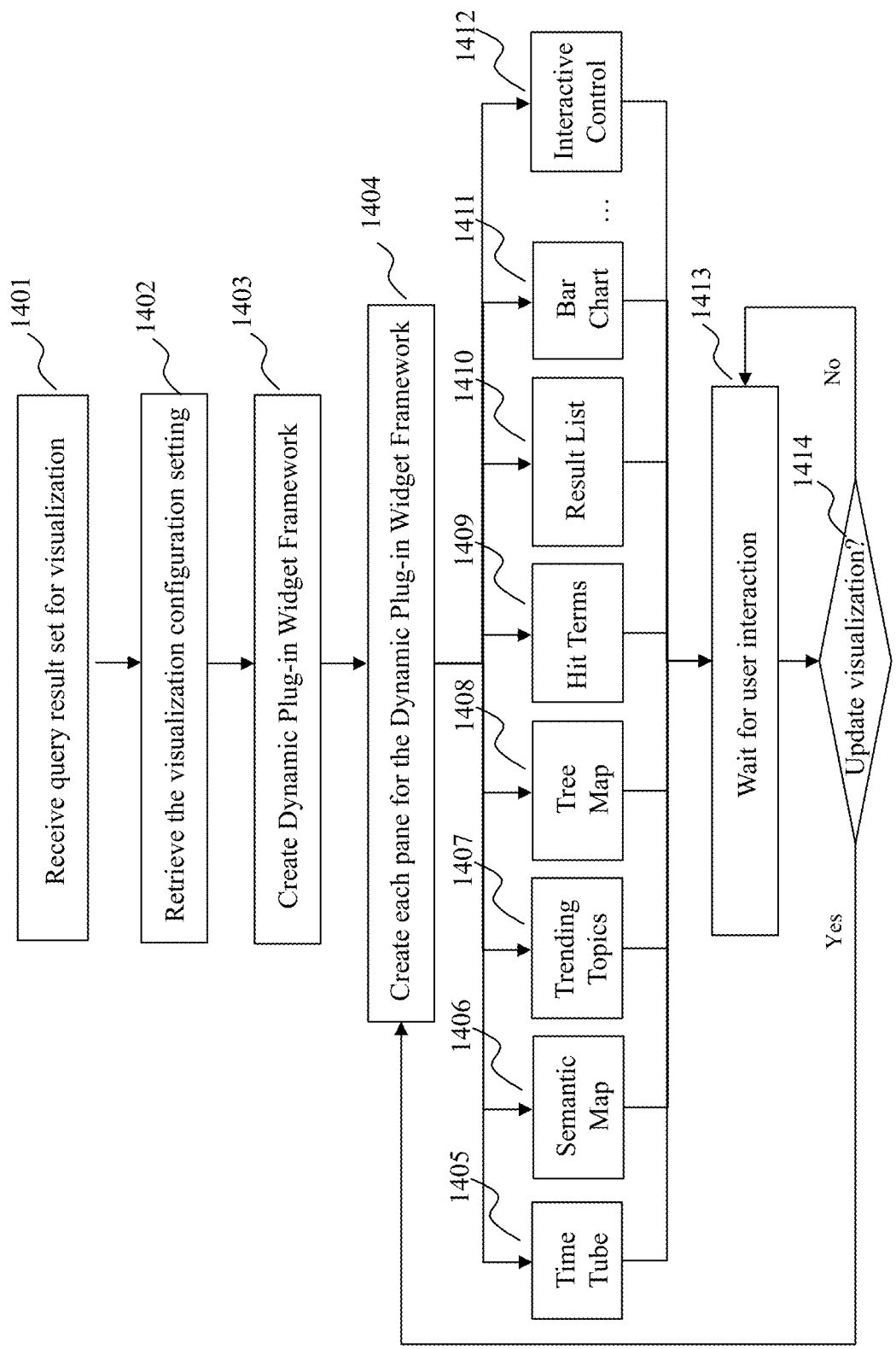
FIG. 18 is a flowchart of an exemplary process for visualizing results in an interactive UI with AI-based visualization, in accordance with an embodiment of the present teaching.

FIG. 18 is a flowchart of an exemplary process for visualizing query results in an interactive UI with mutual interactive AI-based visualizations. Receive a result set from a query for visualization at 1401 that includes various visualization information and requirements from the user. Retrieve the visualization configuration setting from the System Configuration Unit 590 for the user at 1402 which determines the parameters for each pane, e.g., the number of panes for the visualization, the size and position of each pane, the corresponding visualization widget selected for each pane, and how these panes interact with each other, i.e., how a color picked based on relevancy or frequency selected in one widget pane affects the colors in other widget panes. Additional settings for individual visualizations are also configurable, for example the sample size used for the semantic map or tree map visualization. Create a Dynamic Plug-in Widget Framework based on the requirements at 1403. Create each pane at 1404 with the required visualization, e.g., a time tube at 1405, a semantic map at 1406, trending topics at 1407, tree map at 1408, hit terms at 1409, result list at 1410, a bar chart of patent assignees at 1411, and the interactive control at 1412, etc. Once all the panes are updated with the corresponding visualization, the system may wait for the user to interact with UI at 1413.

Automated interactions (e.g., polling, push/pull message passing) between each displayed model-based visualization are enabled, such that interaction with one model-based visualization impacts another and activates the check at 1414 to update the visualization in each pane that are affected. This may cause a redraw (optionally in a consistent color or with other identifier(s) between visualizations) based on a user input between two or more model-based visualizations, optionally, minimizing redrawing of visualizations in the situation where a pre-existing data set is filtered (e.g., holding t-SNE static during filtering, shuffling existing tree map nodes, zooming, filtering, labeling). One example is presented in FIG. 18, in accordance with an embodiment of the present teaching. At step 1414, triggered by an event (e.g., a message passing), a particular element in a visualization interface may be automatically initiated to redraw in a consistent color or with other identifier(s) between visualizations. It may be based on a user input between two or more model-based visualizations, optionally, minimizing redrawing of visualizations in the situation where a pre-existing data set is filtered (e.g., holding t-SNE static during filtering, shuffling existing tree map nodes, zooming, filtering, labeling).

Figure 19A:
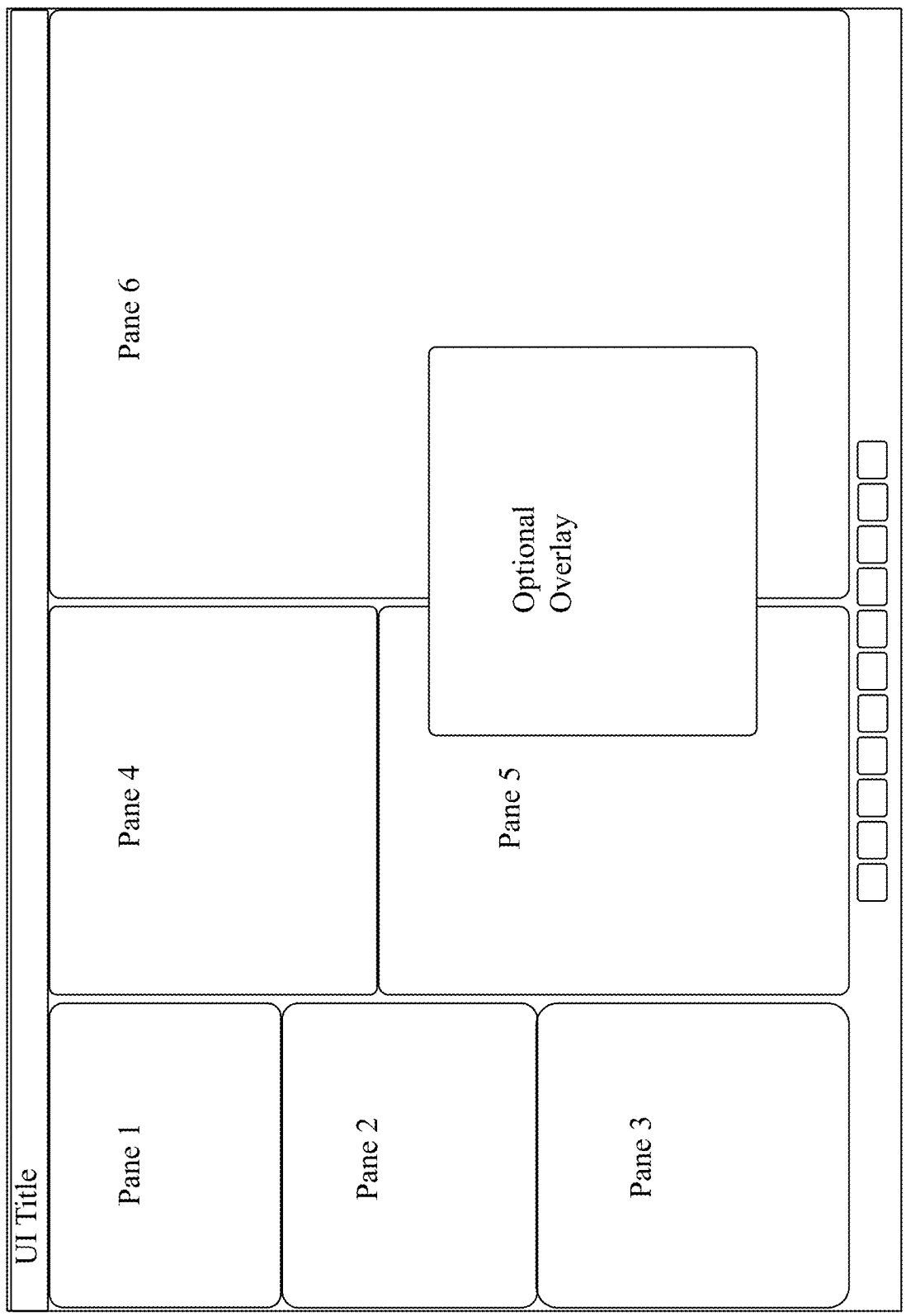
FIG. 19A depicts an exemplary dynamic and modular plug-in widget framework, in accordance with an embodiment of the present teaching.
Figure 19B:
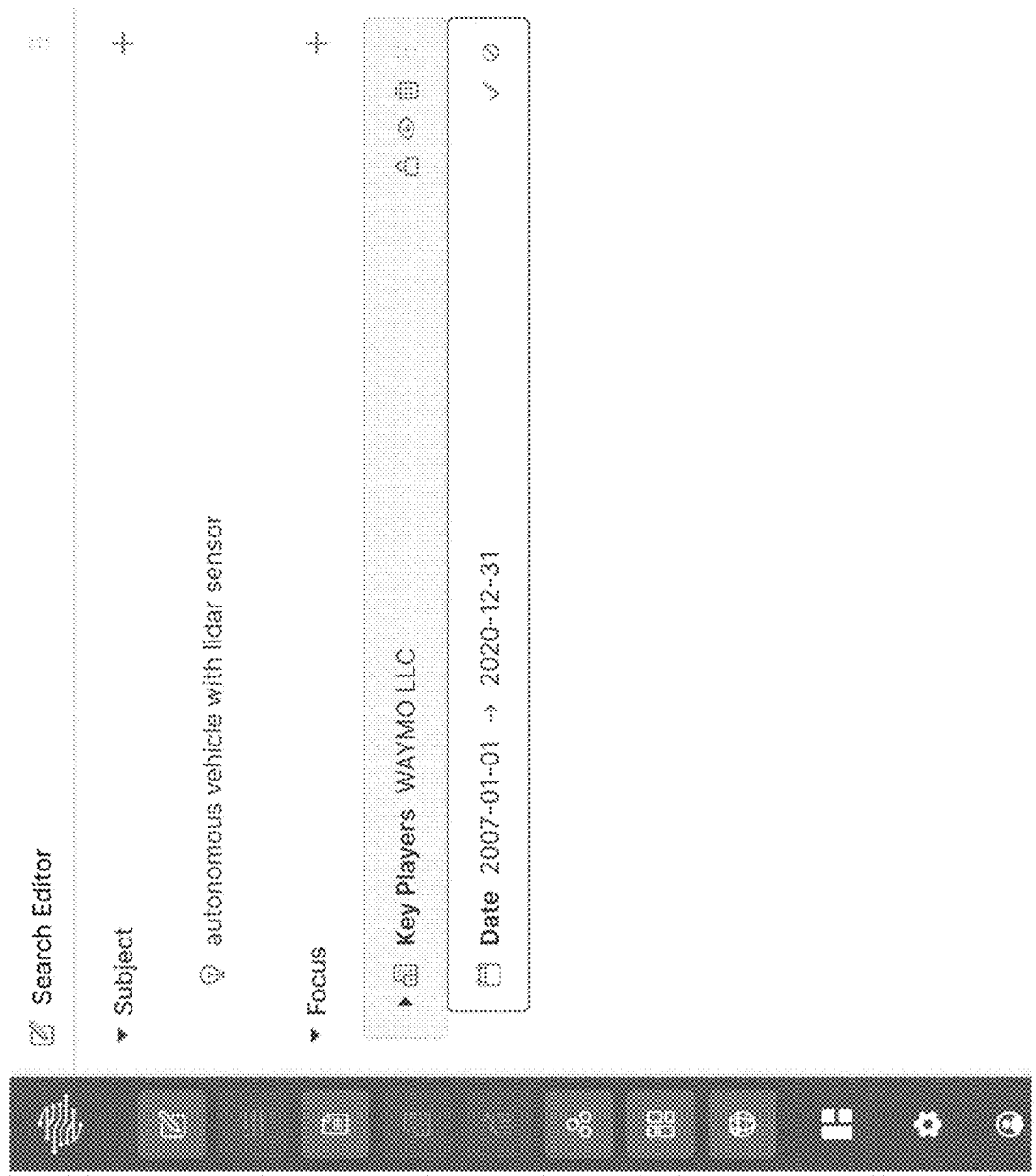
FIG. 19B shows an exemplary visualization of a concept query with focus widget, in accordance with an embodiment of the present teaching.
Figure 19C:
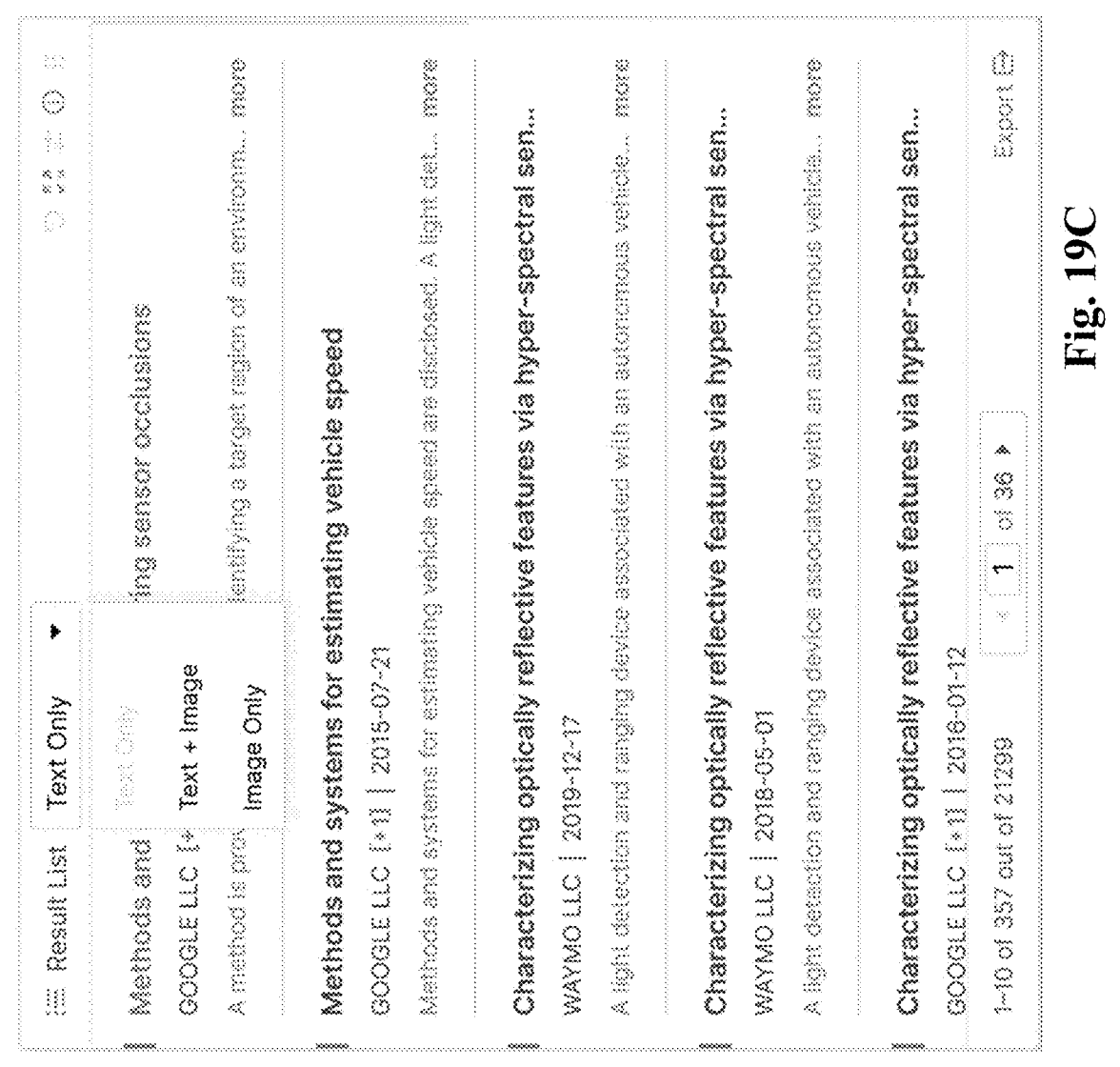

Below, various illustrations related to user interactions with different aspects of the presentation teaching are provided. FIG. 19A is an exemplary dynamic and modular plug-in widget framework and depicts associated front-end interface in a 6-pane configuration. In some embodiments, the number of panes is configurable, and additional panes may be displayed as overlays. The panes 1-6 shown may include a Search pane with focus widget as illustrated in FIG. 19B, a results pane with list of documents as in FIG. 19C, a document view pane as in FIG. 19D, a tree map pane as illustrated in FIGS. 19E-19F, a semantic map pane as in FIGS. 19G-19H, a time tube pane as in FIG. 19I, and a trending topics pane as in FIG. 19J. Additional widgets, e.g., an assignee bar widget as in FIG. 19K, a hit terms widget in FIG. 19L and a geographical coverage widget in FIG. 19M, can be activated based on user interactions as one of the panes or added to the UI as overlays. A settings bar appears along the bottom that can be used to rearrange panes via, e.g., drag and drop. In the time tube widget, + icon functions as a zoom in and the − is a zoom out. There is an additional icon to enable or disable markings to show where the top results documents are in the results, which is selected and in green. The settings gear icon presents options for bin size, label density, and color preferences.

Figure 19D:
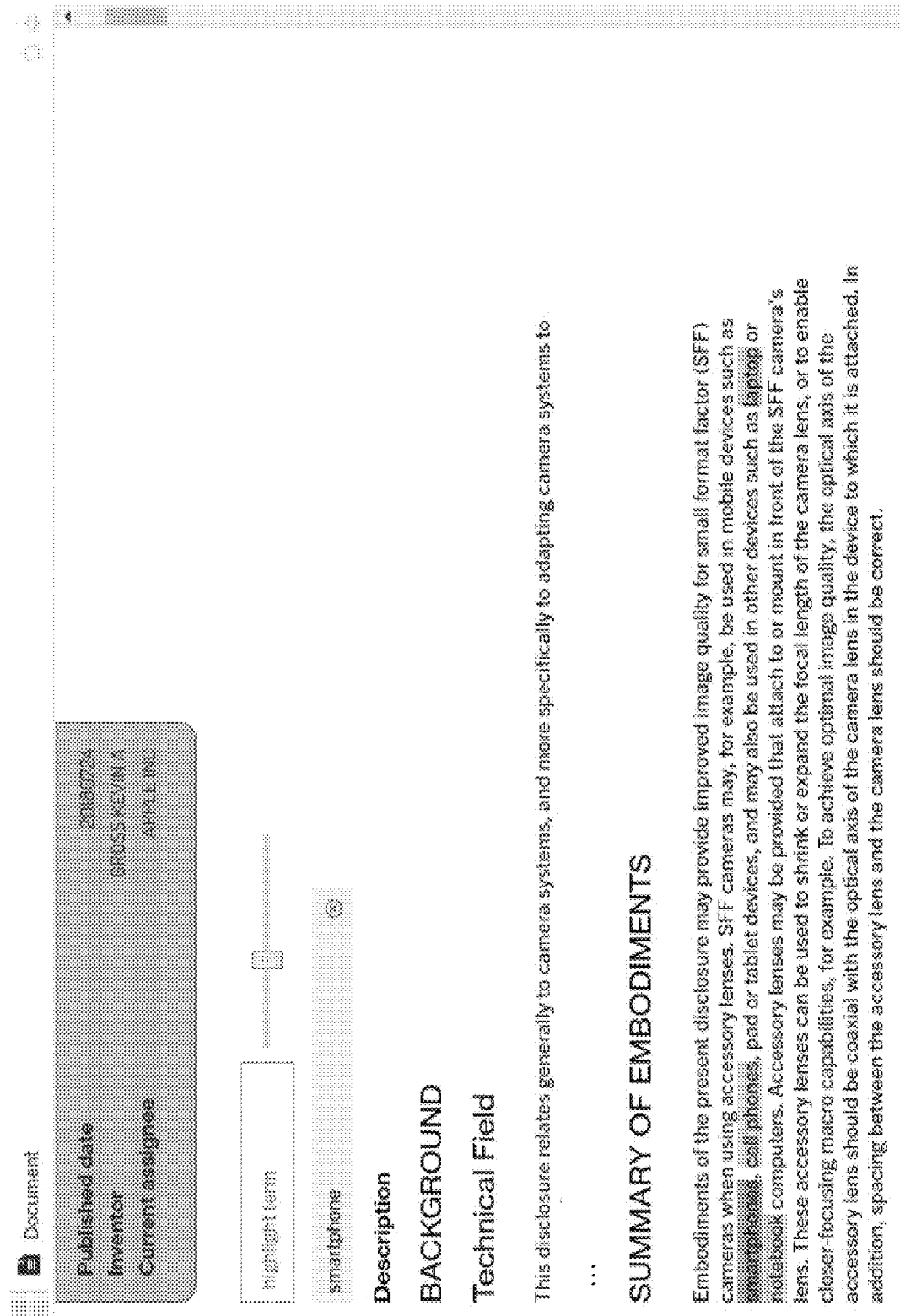
FIG. 19D shows an exemplary document visualization with AI Keyword-in-Context (AI-KWIC), in accordance with an embodiment of the present teaching.
Figure 19E:
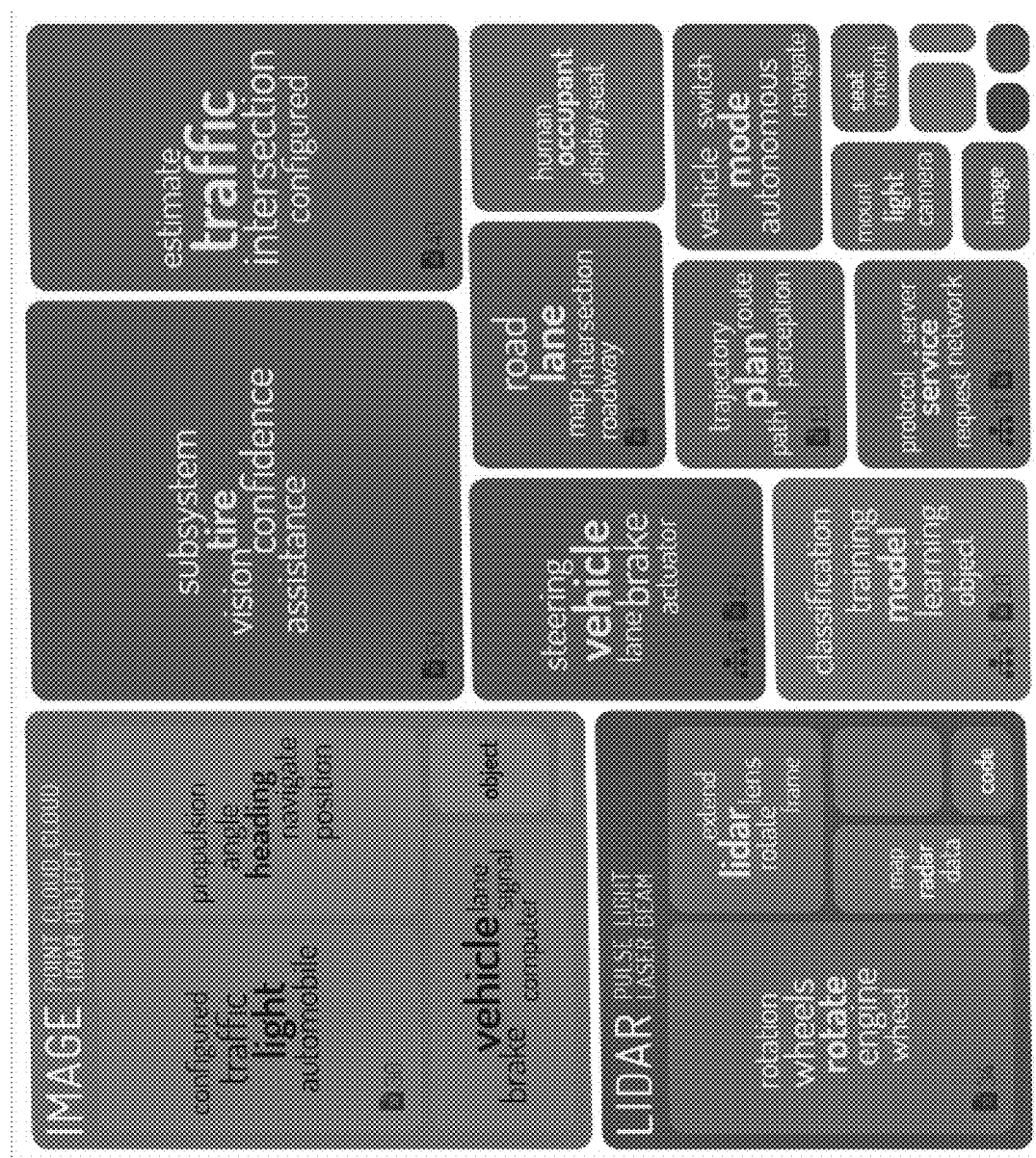
FIG. 19E shows an exemplary AI tree map visualization as a plug-in widget, in accordance with an embodiment of the present teaching.
Figure 19F:
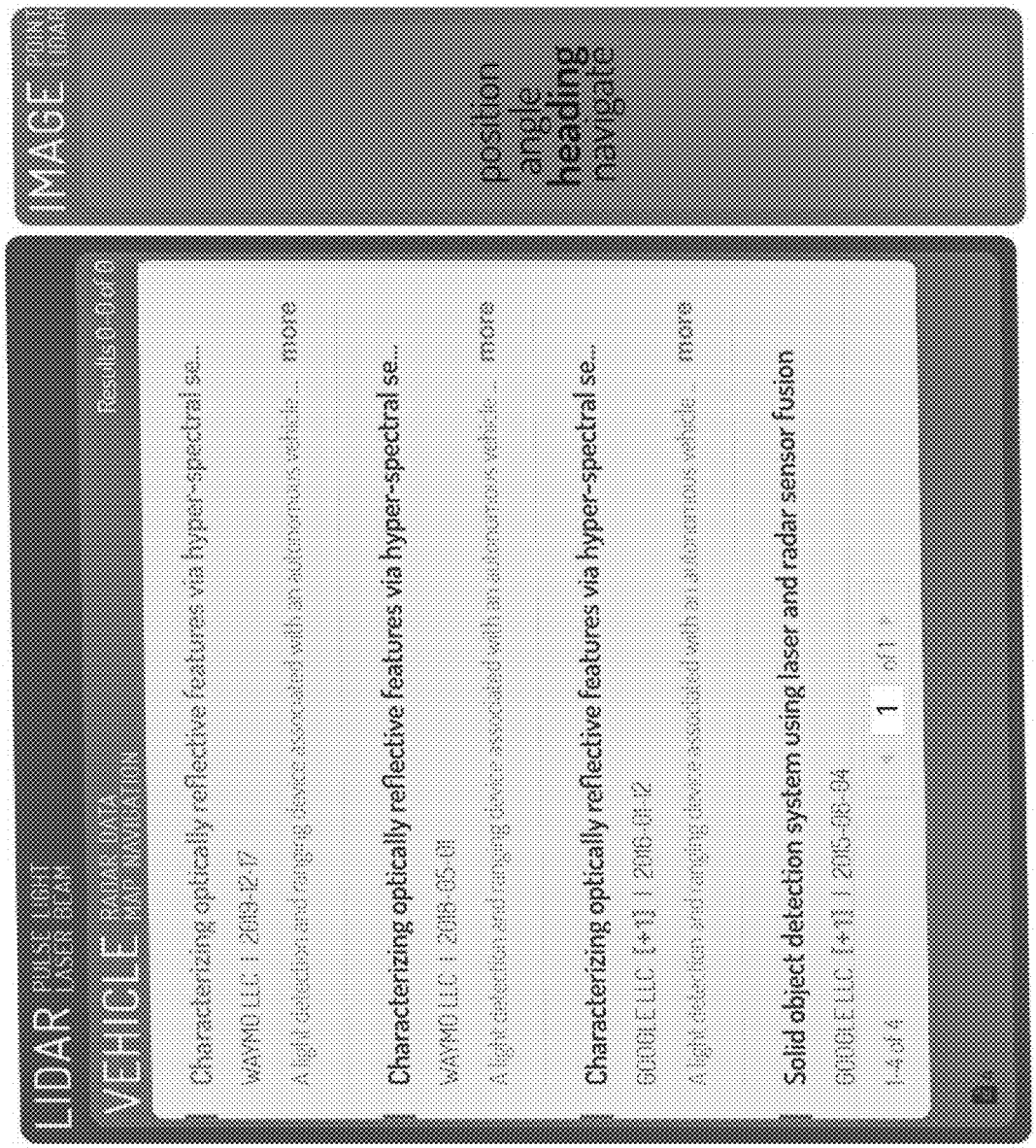
FIG. 19F shows an exemplary zoom-in AI tree map visualization with document lists, in accordance with an embodiment of the present teaching.

In the focusing widget as illustrated in FIG. 19B, the focusing filter may be pinned to the control pane to be turned on or off. The pin icon is for pinning filter and the eye icon is for disabling filters without removing the filters. There may be a plus icon is for adding a new child clause to the search. The X icon deletes an element from the search string. When a focus-widget is applied to a specific assignee, the current assignee frequency pane as illustrated in FIG. 19K can be brought up as an overlay. Highlighting two assignees in the assignee bar widget may cause cross-widget highlighting using similar colors across widgets for cross-widget consistency and/or an AI-tree map cluster redraw with relative frequency bar on the tree map. The colors are consistent between current assignee selection and the corresponding bars in the A1 tree map, which is clustered by topic and colored by similarity between topics. Similarly, a CPC frequency bar widget may be used to provide highlighting focus for specific CPC codes. A user may note the distinctions/overlaps between classification-code based clustering, dimensionality reduction clustering, and hard clustering algorithms simultaneously to assess divergence, and for searching purposes.

Figure 19G:
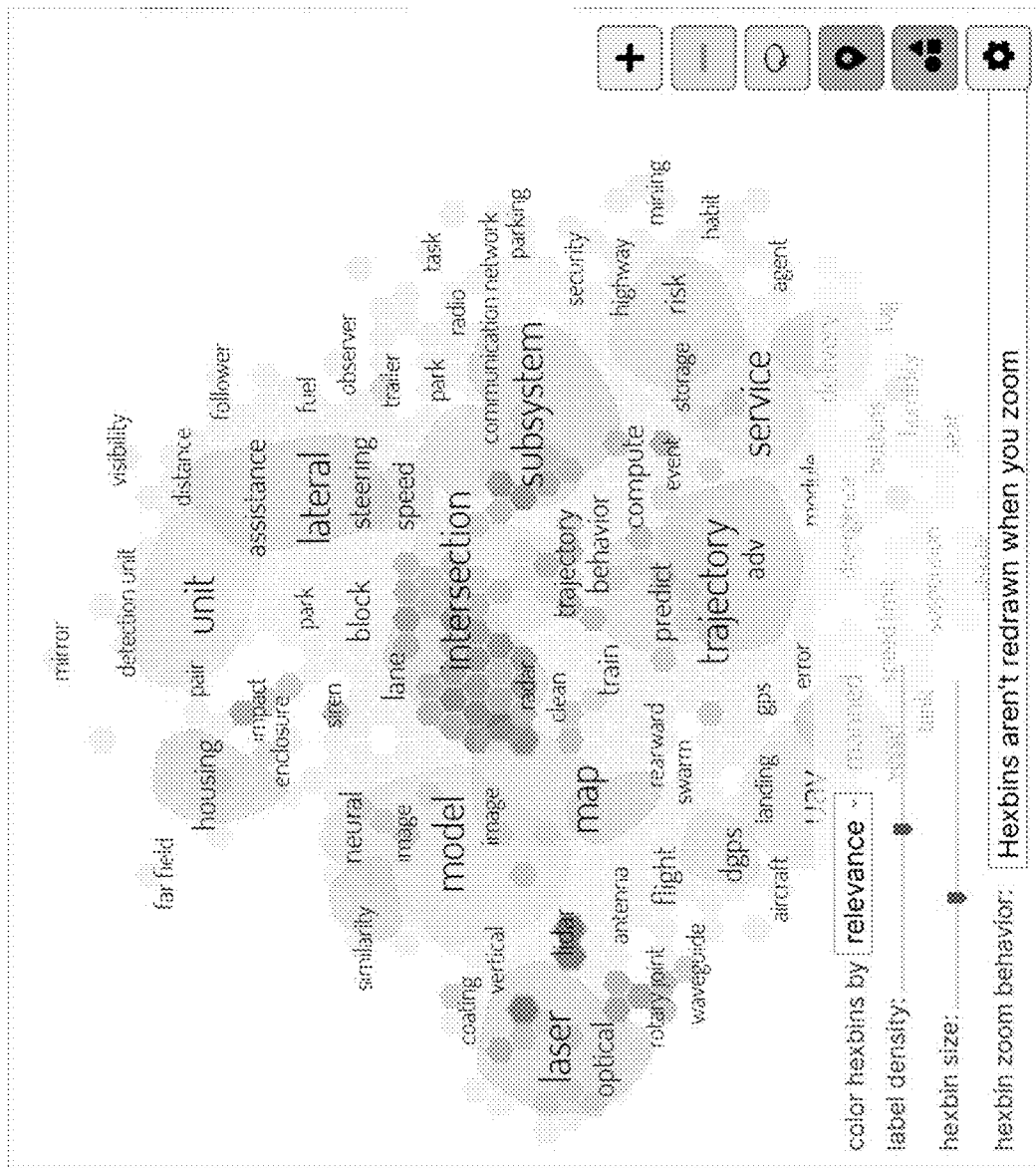
FIG. 19G shows an exemplary semantic map visualization with regions as a plug-in widget, in accordance with an embodiment of the present teaching.
Figure 19H:
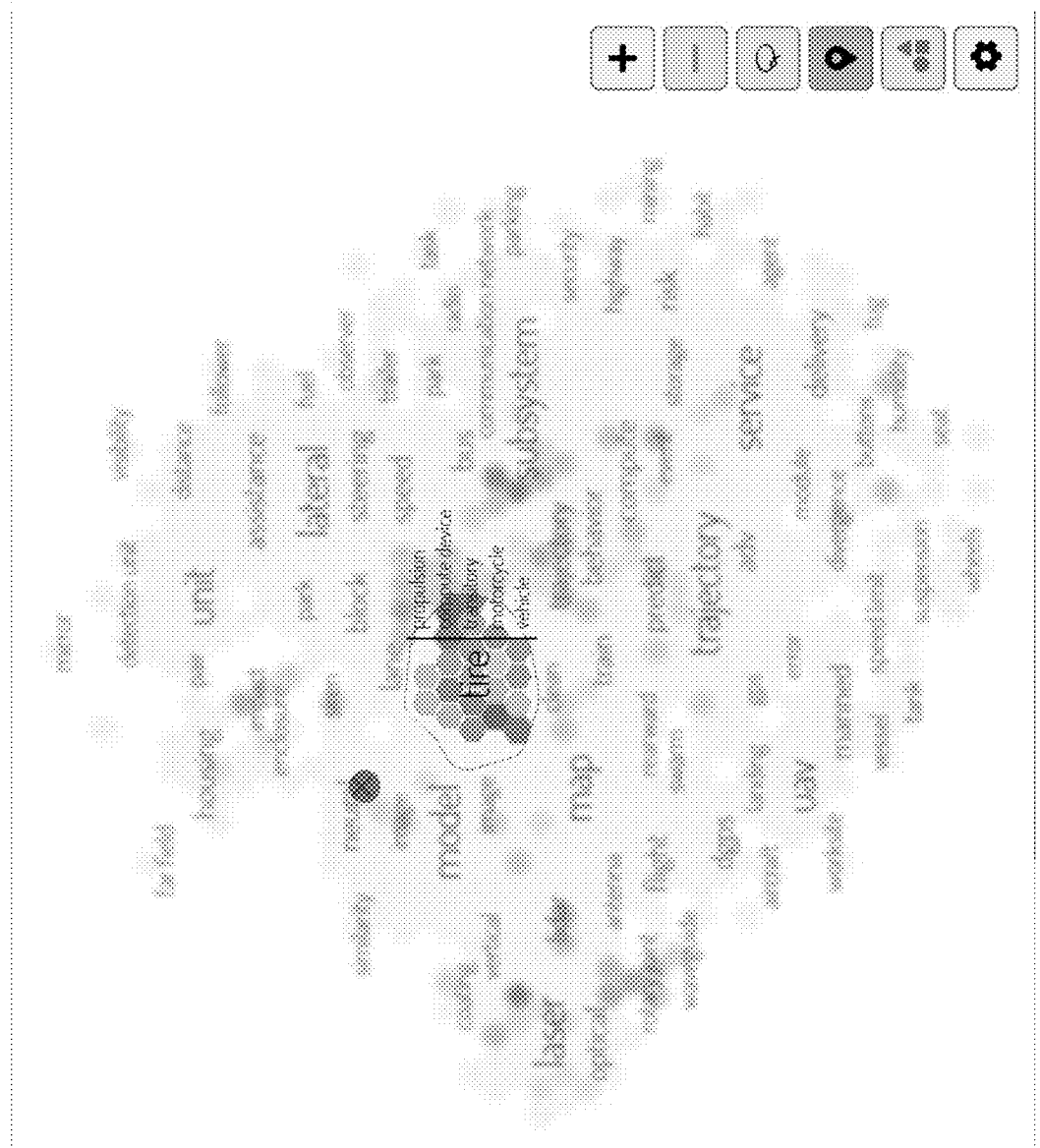
FIG. 19H shows an exemplary semantic map with a lasso focus with related widgets, in accordance with an embodiment of the present teaching.
Figure 19I:
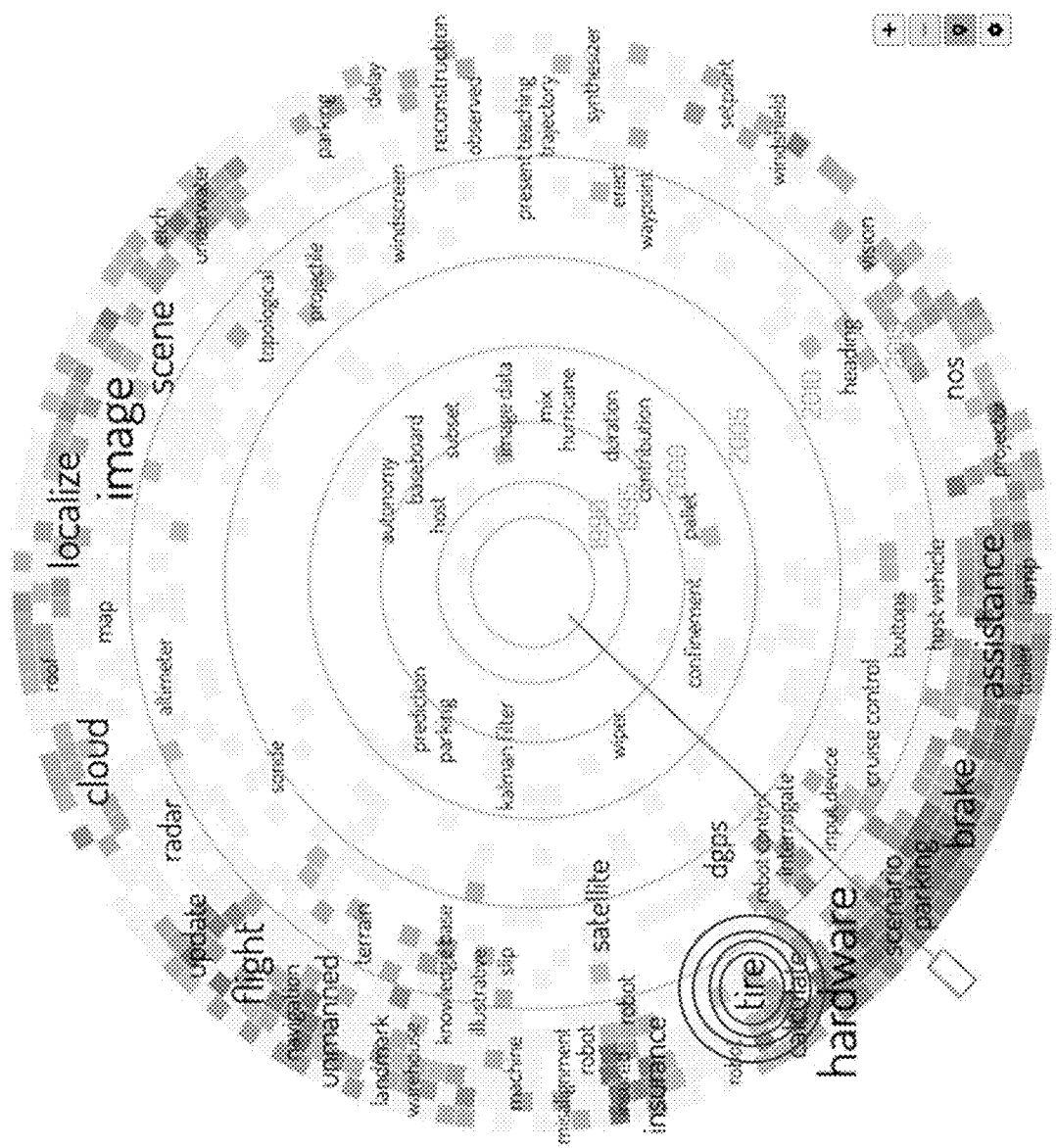
FIG. 19I shows an exemplary time tube visualization as a plug-in widget with a focus triggered via other widgets, in accordance with an embodiment of the present teaching.
Figure 19J:
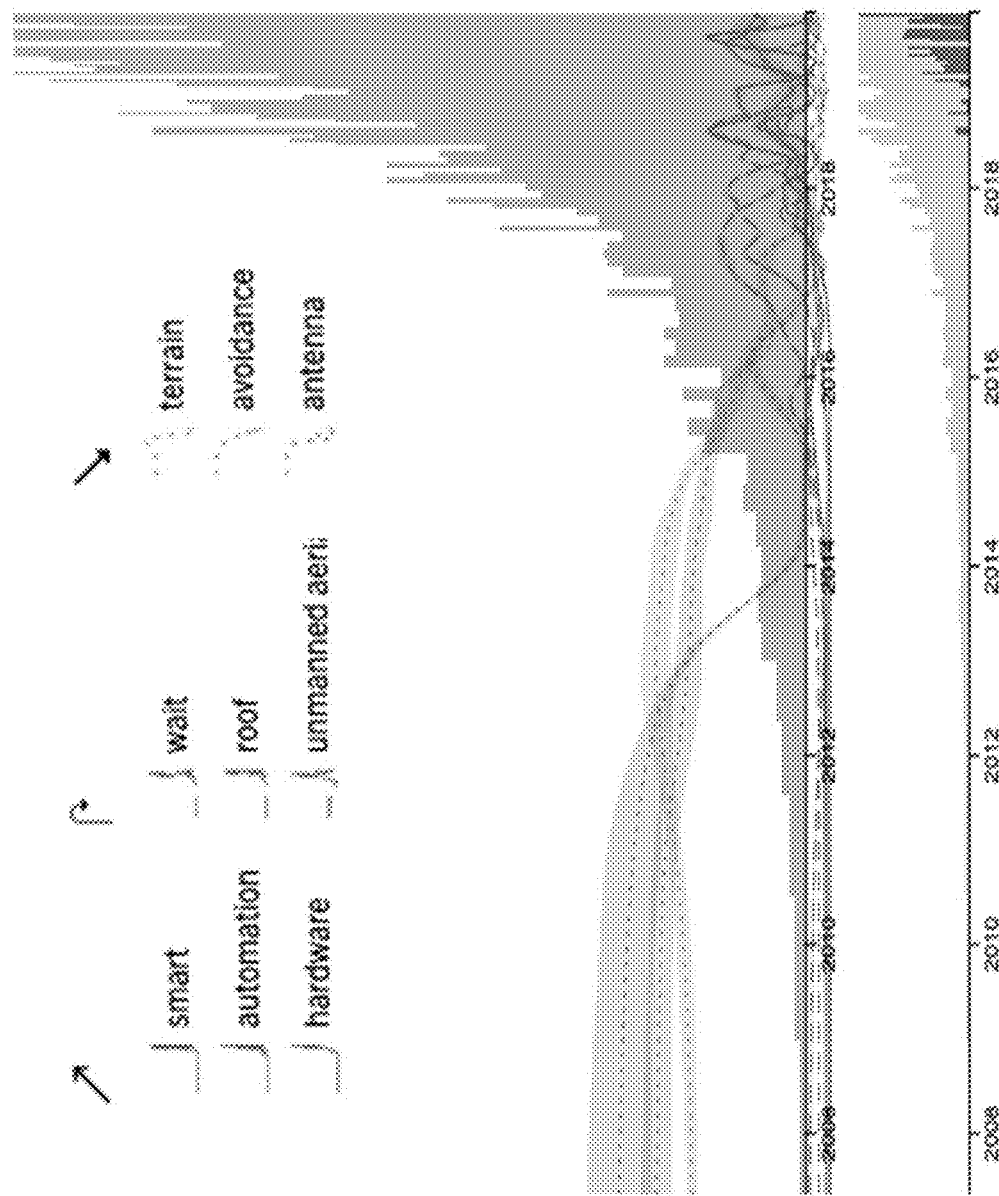
FIG. 19J shows an exemplary trending topics visualization as a plug-in widget, in accordance with an embodiment of the present teaching.
Figure 19K:
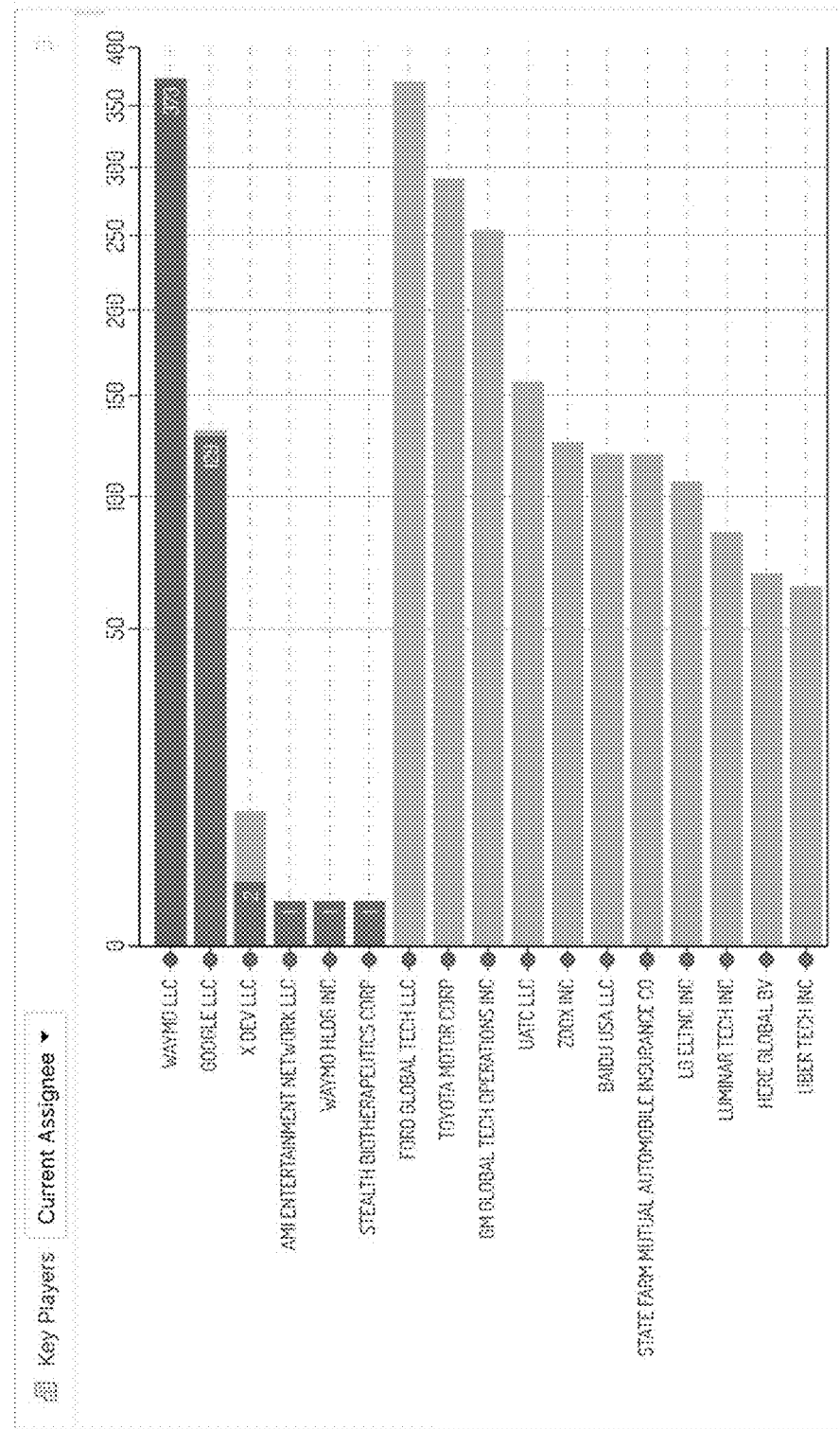
FIG. 19K shows an exemplary assignee frequency bar chart widget sorted by relevancy, in accordance with an embodiment of the present teaching.
Figure 19L:
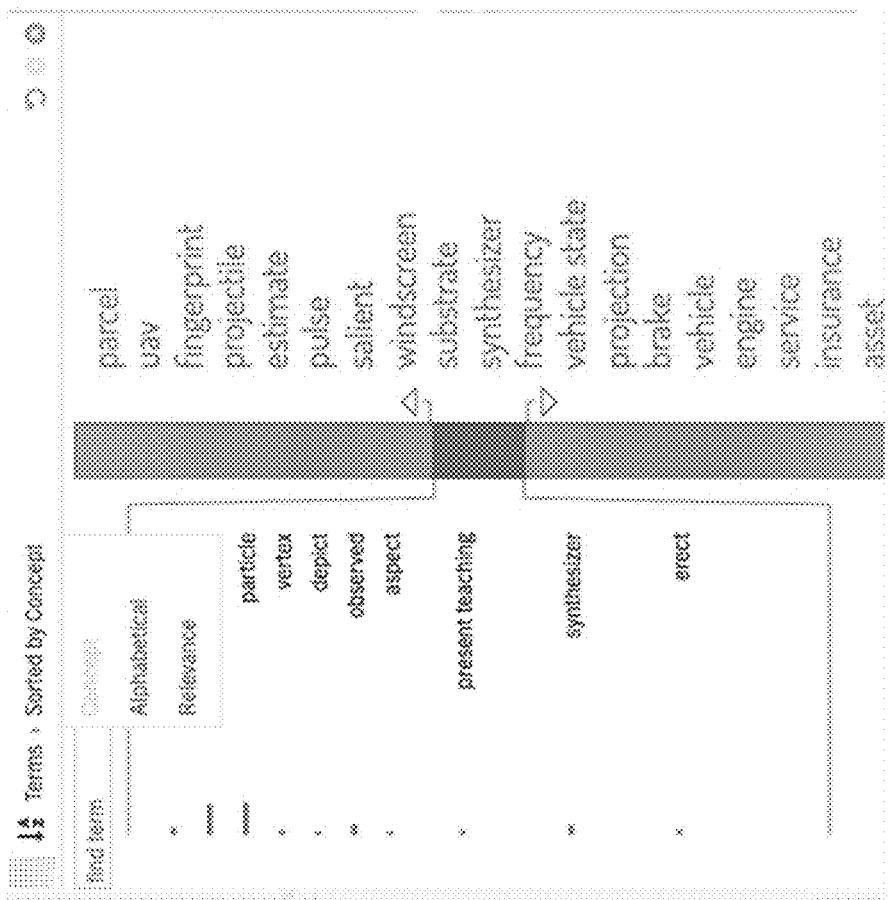
FIG. 19L shows an exemplary hit terms widget sorted by concept, in accordance with an embodiment of the present teaching.

FIG. 19L shows a visualization scheme with an AI concept terms list enabling a focus selection and search within the concept terms list. The list may be sorted by concept, alphabetically, or by relevance. The funnel icon is for adding the highlighted term as a filter. A highlighter icon when selected may activate trigger events, such as highlights in document preview, or otherwise notify one or more widgets for specific events. Bars on left are a relevancy weighted frequency of terms (based on adding up the relevancy in each document on a per document basis from the result set). The colors of terms in the concept terms list match tree map and/or other UI widgets.

FIG. 19G shows a semantic map where documents grouped in hexbins are further grouped into regions based on the density of the documents in the area and different colors are assigned for distinction. The semantic map widget can be displayed in one of the panes or as a linked AI widgets overlay on top of other visualization panes. It may influence other widgets upon interaction. The icons in the semantic map are as follows, icons for zoom (expand + or contract −), lasso selection element (for drawing a contiguous shape to lasso select as depicted in FIG. 19H), showing or hiding activated document markers (selected in green), showing or hiding regions (shapes icon), and general settings (gear icon). The semantic map provides means enabling a user to toggle hex bin zoom behavior and select among relevancy, topic, or date-based coloring. The hex bin zoom behavior options are also known as geometric and semantic zooming. Additional options include hexbin coloring, label density, label size, and hexbin zoom behavior. When navigating a semantic map, or any other visualization, a spot may be highlighted on mouse over, click, touch, or equivalent trigger event. In this embodiment, upon selecting an area of the map, one circle appears on the semantic map, and in the other widget additional circles are displayed based on regional density (i.e., more corresponding documents has more circles) as depicted in FIG. 19I.

This new generation semantic map allows a user to search within the set of mapped documents. The icon disables filters without removing them, and the pin makes it so the filter stays there when a new search is run. The X deletes the filter.

FIG. 19H illustrates how a lasso focus may in certain embodiments impact related widgets. For example, the tree map is updated mapping only the documents within the lasso focus, and the rings on the time tube in FIG. 19I mark the topics within the lasso focus. The semantic map widget may display a semantic map loading animation as needed, which shows the dots as they come into position from initial random positions to their final positions before they are grouped into hexbins. The strategy is particularly beneficial to loading any clustering algorithm with a long loading time due to AI calculations. In a t-SNE algorithm, even if using techniques to speed it up, such as Barnes-Hut approximations in t-SNE, AVX instructions on CPU, and/or GPU implementation, it may take a long time to calculate for a large number of documents, e.g., from several minutes for 100,000 documents to near instant for 1,500 documents. Users often desire a deeper map depth for a large company's full document and/or patent portfolio, or for a landscape study across companies, and are more intrigued by an AI visualization progress bar based on its actual algorithm, than a generic progress bar, so they may not mind a longer loading time. Therefore, this teaching is applicable to any AI clustering algorithm which may be visualized across series mid-calculation. Critically, this is not a generic animation sequence, and is search and algorithm specific, and will work for any algorithm that is polled periodically while embedding.

FIG. 19I shows a time tube radial selection using an angle. Time tube presents a word cloud within an interactive polar-coordinate based framework in order to better visualize distinctions across time. Rings represent different time eras. A radial cross-section selection (concept clustering) can be applied to the time tube. Once a radial time tube selection is completed at certain angels, a corresponding AI tree map may be updated. Note the cross-widget color consistency, and the ability to compare the clustering methodologies to perform a date trend analysis. Annular date-based restriction can be applied to the time tube and cause another tree map update, which may or may not be combined with the radial cross-section selections. In one embodiment a plurality of such radial and annular restrictions may be applied simultaneously in order to select ranges of interest more easily. In an alternative embodiment, the number of application filters is restricted to 1 or 2 per group, to reduce potential user confusion during navigation or accidental clicks. Time tube has an annular date filter and radial topic filter (annulus depicted (i.e., area between two concentric circles)). Sector selection is depicted along the outside and the annulus selection is context-dependent. The concept sector filter refers to a sector selection in the time tube. This is an example of focus filters added through user interaction with visualizations.

FIGS. 19E-19F illustrate that AI tree map can zoom from an initial level to an intermediate level, or to a result list level (levels 1 to N supported based on depth). One can view, within the AI tree map, a secondary level without zooming into to max views with multiple widgets simultaneously if there is enough room, or a click or equivalent action (e.g., touch) is required if there is not enough room in a cell to depict a document list. Any focus operation from other widgets may cause redraw and reordering of the tree map based on the updated document set.

With respect to the trending topics widget as illustrated in FIG. 19J, each line represents a particular trending topic, and optionally, each trend line may be surrounded by a shaded band that represents the frequency of the topic. Each trend line itself represents the trendiness of a topic over time, and the histogram in the background is the date distribution of the corresponding document set. The histogram at the bottom provides the date distribution of the whole document set as a context to the above which may zoom or pan across the timeline.

The trending topics are grouped into rising, peak, and falling trends each with top 3 default topics displayed. Additional trending topics from each group can be visualized if preferred. The filter icon applies a topic as a filter, the eye icon determines visibility in the graph (different than previous use of eye icon). The middle circle icon hides the icons with the eye selected, and only shows those with the circle selected. This allows the user to preserve setting groups of charts of interest.

Figure 19M:
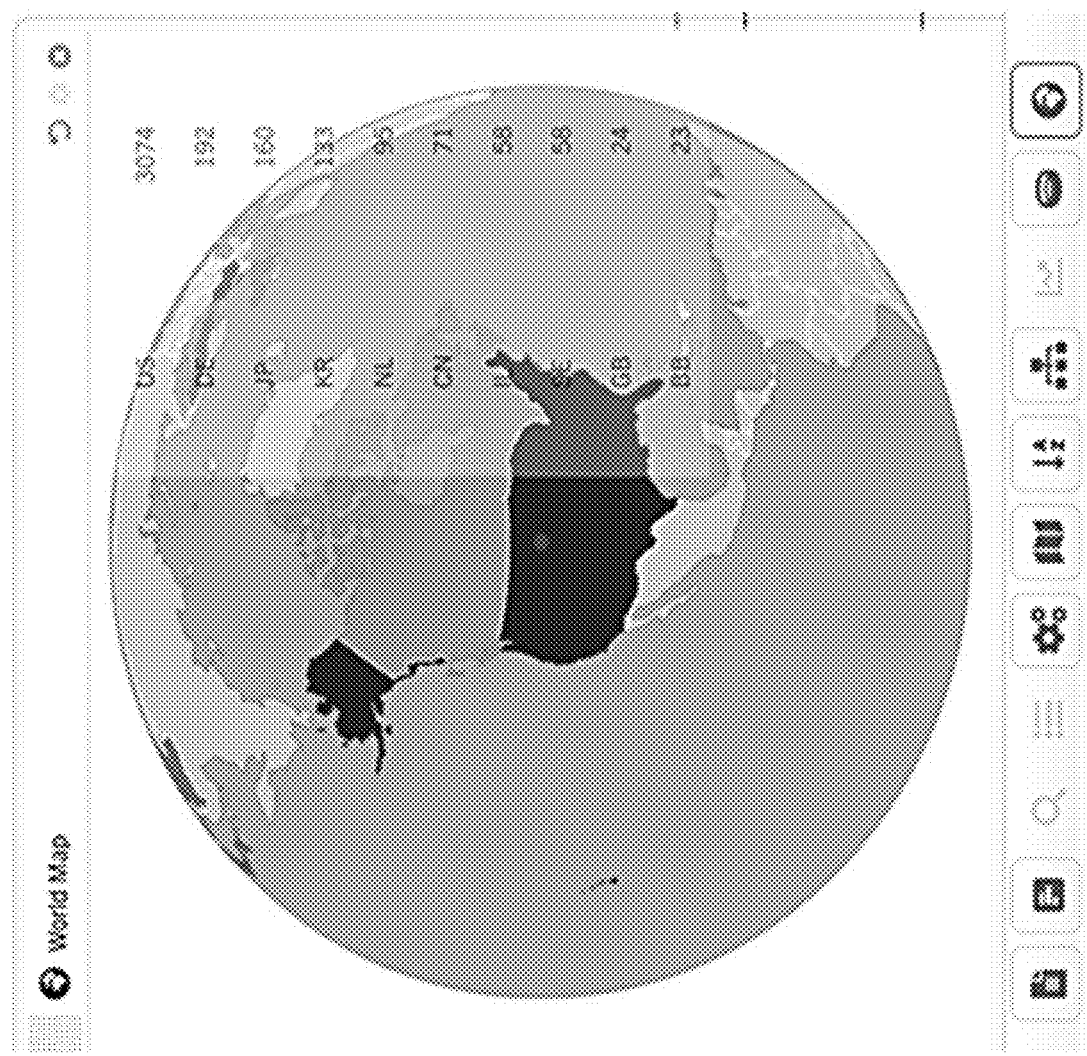
FIG. 19M shows an exemplary geographical coverage widget, in accordance with an embodiment of the present teaching.

Similarly, a focus selection can be applied to any trending topics. Hovering on specific topic item reveals the corresponding distribution in the line plot. FIG. 19M shows a geographical trends widget that can be an overlay on top of the trending topics.

FIG. 19D shows an example of AI Keyword-in-Context (AI-KWIC) wherein highlighting levels of different opacity are used to indicate the fuzziness of matching terms, based on their relationship to an initial specified one or more highlights. Different entered highlighted terms may be colored in different base colors, and individual words, phrases, or n-grams are supported as input. Further, a slider enables the granularity of the highlighting to be specified in terms of matches to fuzz factor (i.e., narrow to broad similarity matching). Distribution may be in based on the overall result set, in which case non-matches to a particular document are ignored, however it may also be influenced by intradocument distribution of concepts (such as, e.g., RAKE).

Figure 19N:
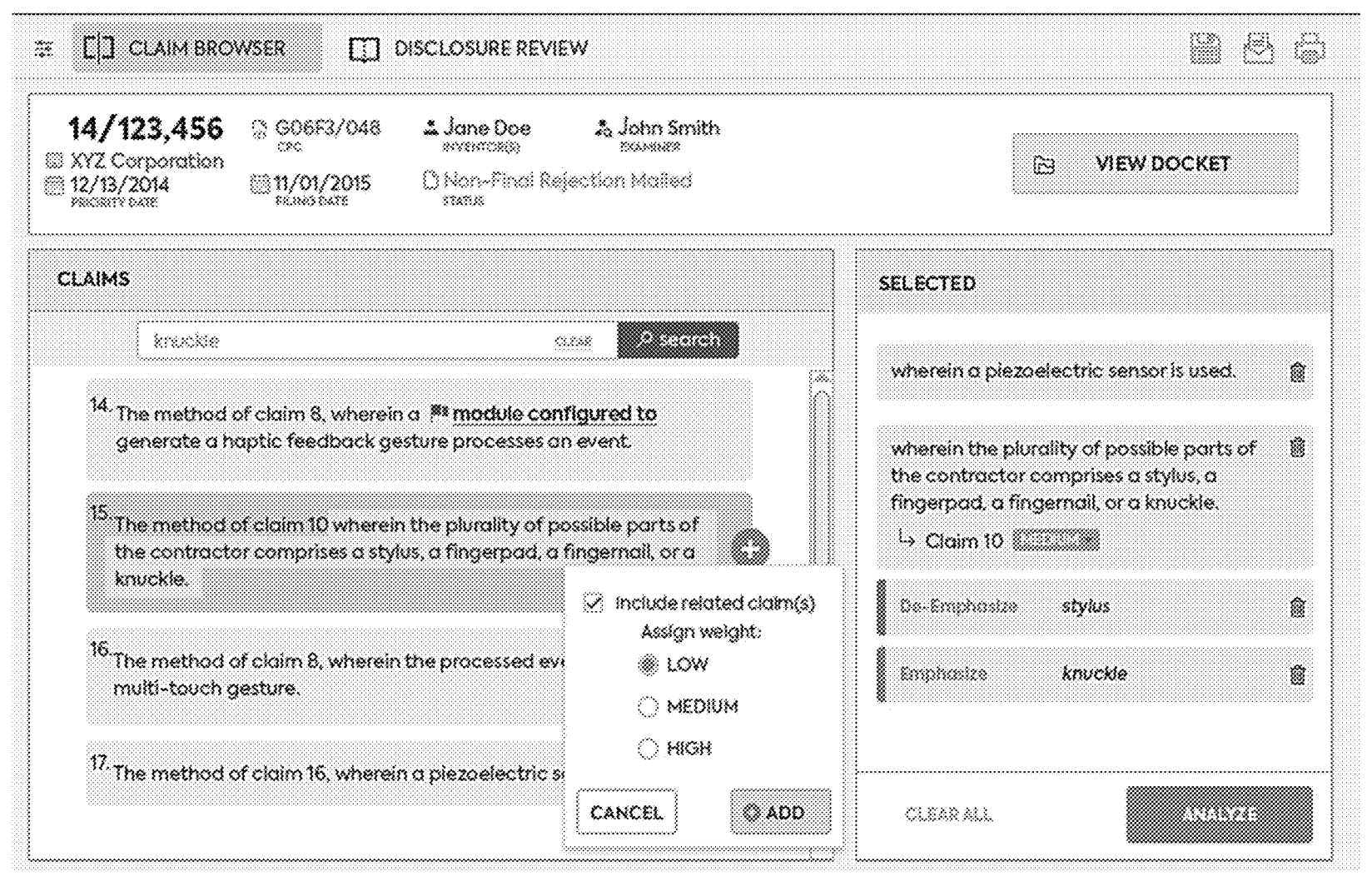

FIG. 19N shows a semantic analyzer operating in a claim browser mode to provide analysis with respect to 35 U.S.C. 112(a), 112(b), 112(f), and other related priority chain issues. Such analysis may be based on selected claim limitations of interest identified via highlighting or other means, and/or an entry of any key concepts to emphasize or deemphasize. The semantic analyzer has two different modes (e.g., depicted tab interface), claim browser, and disclosure review. In certain embodiments a tabbed interface may be used. The semantic analyzer uses AI-informed highlighting, summarization, and legal rules to assist in Section 112 Analysis, under Sections 112(a), (b) and (f), as well as assisting with priority chain analysis and support for amendments during prosecution. The claims are searched by a user in the claim browser to highlighting areas of interest. Additional terms may be manually entered for emphasis or deemphasis. When a claimed limitation is selected, the user may optionally include the related claims from the claim tree as an input, as well as assign a weighting thereto.

Figure 19O:
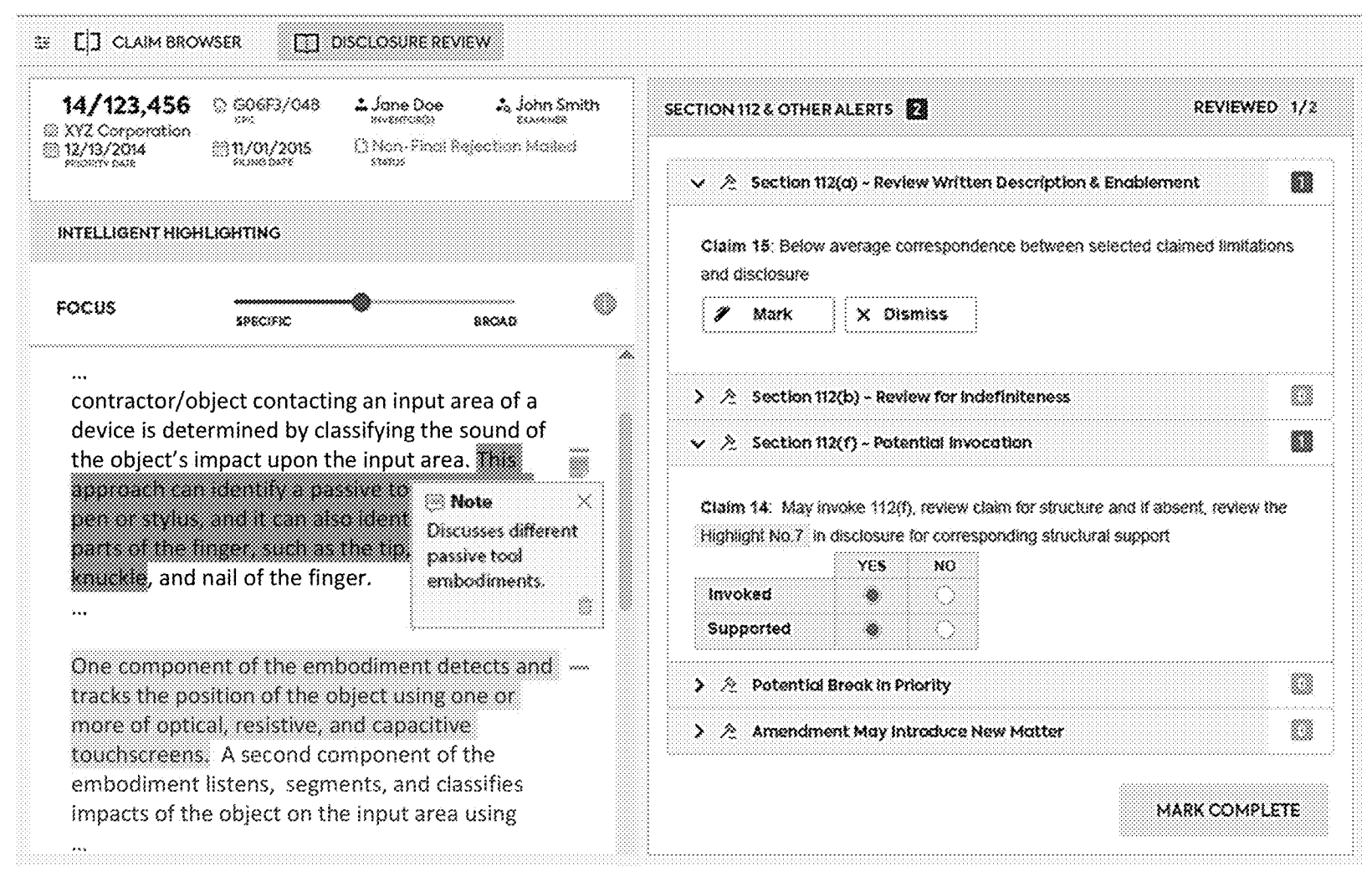

By clicking on appropriate button to analyze, a semantic analyzer as shown in FIG. 19O is displayed. In this case, the semantic analyzer as seen in FIG. 19O operates in a disclosure review mode for responding to Section 112-related or other alerts generated based on criteria specified in claim browser mode. Review of the reference may be summarized (with AI-KWIC), and a focus slider from specific to broad may be adjusted to influence how many surrounding concepts are highlighted. Intelligent highlighting includes a focus slider that impacts how broad or specific conceptual highlighting is presented. In certain embodiments a granularity of the highlighting may use shades of colors to depict a degree of relatedness (similar to that depicted in FIG. 19D "Fuzz" factor). Further, in certain embodiments conceptual summarization may be controlled by the same slider as highlighting (as depicted) or may be separated in other embodiments. A user may take notes at any location and view referenced figures based on the area of text displayed via "View referenced figures". Issues pertaining to Section 112 are noted for user analysis and aggregated by count. As the flagged items are reviewed in each category, they may be marked as an issue or dismissed. Upon marking a rejection may be automatically templated for an office action, or the mark listed may simply be stored for later reference and/or third-party auditing. For certain analysis, e.g., Section 112(f) a workflow of options may be presented such as the buttons to choose whether 112(f) was invoked, and if invoked is the limitation supported by the disclosed corresponding structure in the specification. In the claims sidebar a potential 112(f) invocation is flagged "module configured to". In certain embodiments, the 112 Analyzer is depicted as herein as part of a docket management platform, however it may also be used to assist with, e.g., Invalidity studies or challenges to Patents in Litigation that relate to Section 112(a)-(f) or corresponding statutes in jurisdictions outside the United States. Each claim or set of limitations thereof of interest may be navigated for corresponding disclosure support via the right panel scrolling list, keyboard shortcuts, or equivalent means.

Figure 20:
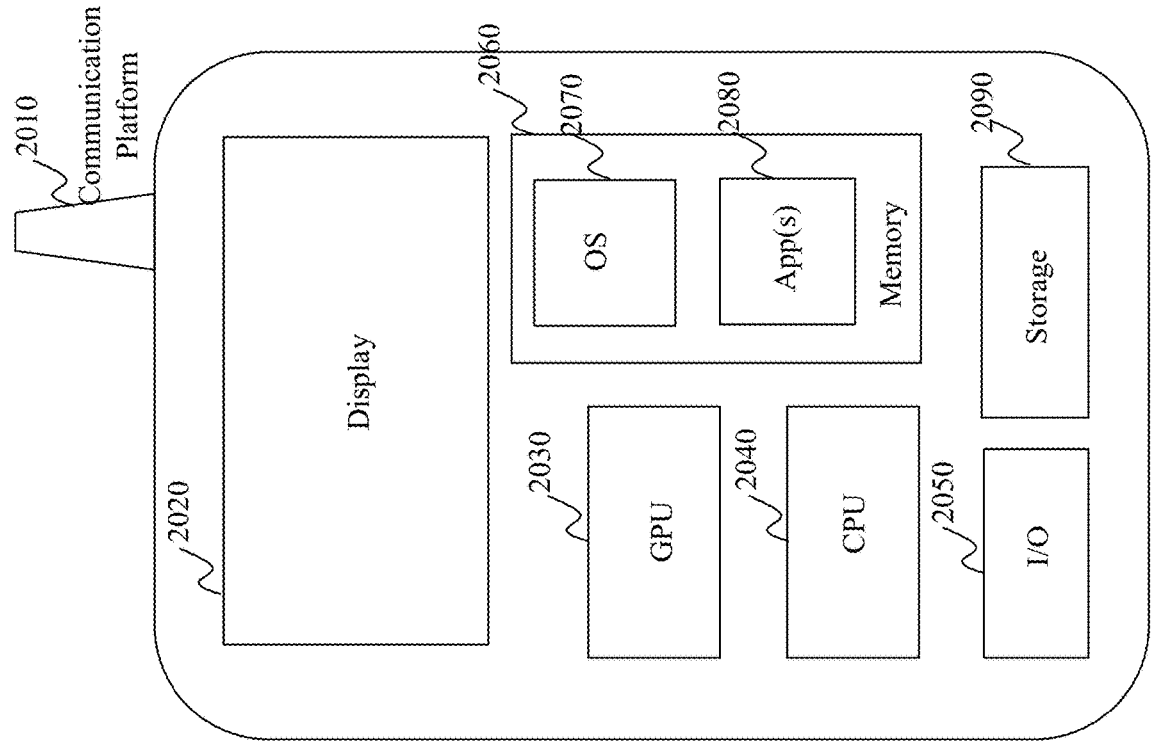
FIG. 20 is an illustrative diagram of an exemplary mobile device architecture that may be used to realize a specialized system implementing the present teaching in accordance with various embodiments.

FIG. 20 is an illustrative diagram of an exemplary mobile device architecture that may be used to realize a specialized system implementing the methods of protecting sensors and sensor assembly as disclosed in the present teaching in accordance with various embodiments. In this example, a device on which the present teaching is implemented corresponds to a mobile device 2000, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 2000 may include one or more central processing units ("CPUs") 2040, one or more graphic processing units ("GPUs") 2030, a display 2020, a memory 2060, a communication platform 2010, such as a wireless communication module, storage 2090, and one or more input/output (I/O) devices 2050. Any other suitable component, including but not limited to a system bus or a controller (not shown), may also be included in the mobile device 2000. As shown in FIG. 20 a mobile operating system 2070 (e.g., iOS, Android, Windows Phone, etc.), and one or more applications 2080 may be loaded into memory 2060 from storage 2090 in order to be executed by the CPU 2040. The applications 2080 may include suitable mobile apps for managing the tasks related to the present teaching on mobile device 2000. User interactions may be achieved via the I/O devices 2050.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 21:
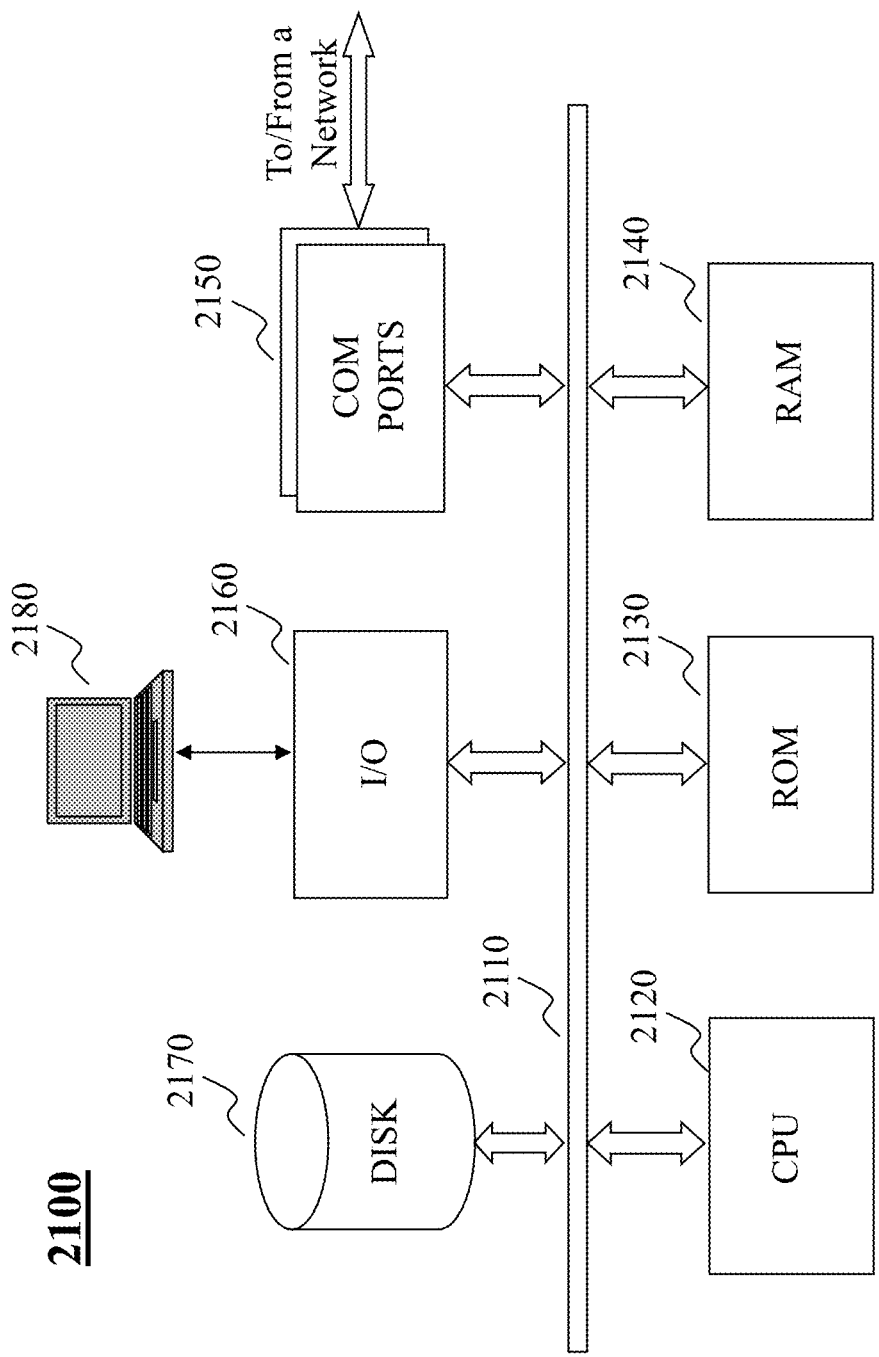
FIG. 21 is an illustrative diagram of an exemplary computing device architecture that may be used to realize a specialized system implementing the present teaching in accordance with various embodiments.

FIG. 21 is an illustrative diagram of an exemplary computing device architecture that may be used to realize a specialized system implementing various functionalities related to the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 21 may be used to implement any component of conversation or dialogue management system, as described herein. For example, various functions associated with the present teaching may be implemented on a computer such as computer 2100, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer21, for example, includes COM ports 2150 connected to and from a network connected thereto to facilitate data communications. Computer 2100 also includes a central processing unit (CPU) 2120, in the form of one or more processors, for executing program instructions. The exemplary computer platform includes an internal communication bus 2110, program storage and data storage of different forms (e.g., disk 2170, read only memory (ROM) 2130, or random access memory (RAM) 2140), for various data files to be processed and/or communicated by computer 2100, as well as possibly program instructions to be executed by CPU 2120. Computer 2100 also includes an I/O component 2160, supporting input/output flows between the computer and other components therein such as user interface elements 2180. Computer 2100 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for modeling an entity based on textual information, the method comprising:
    obtaining information about an entity to be modeled;
    searching textual information related to the entity, including a first plurality of documents related to at least one aspect of the entity;
    adding, to each of some of the first plurality of documents, new content to generate augmented documents;
    obtaining first aggregated semantic models for a second plurality of documents including the first plurality of documents and the augmented documents, wherein each of the first aggregated semantic models represents one of the second plurality of documents and includes a semantic feature vector and a semantic signature, wherein the semantic signature is generated by an autoencoder via a dimensionality reduction process to reduce a dimensionality of the semantic feature vector, and wherein the autoencoder is previously derived through unsupervised deep learning;

identifying, via clustering based on the first aggregated semantic models, one or more groups of the first aggregated semantic models, wherein each of the one or more groups includes a set of first aggregated semantic models representing semantics of the second plurality of documents;

obtaining each of one or more second aggregated semantic models for each of one or more first pseudo documents by combining each of the one or more groups of the first aggregated semantic models;

deriving, via machine learning, a third aggregated semantic model of a second pseudo document by combining the one or more second aggregated semantic models or by combing at least one of the one or more second aggregated semantic models and at least one of the first aggregated semantic models, to represent each of the at least one aspect of the entity, yielding one or more third aggregated semantic models, wherein each of the third aggregated semantic models for an aspect of the entity comprises an aggregated semantic feature vector and an aggregated semantic signature for characterizing the aspect of the entity; and identifying, based on similarity of aggregated semantic signatures among the entity and other entities, one or more of the other entities, wherein each of the one or more other entities has at least one aspect that is characterized by the corresponding aggregated semantic signature and is similar to any of the at least one aspect of the entity.

2. The method of claim 1, wherein the entity is one of an individual, a company, an organization, an institution, and any aspect thereof.

3. The method of claim 1, wherein the augmented document is
a document;
a partial document;
a collection of documents;
one or more terms;
one or more weighted terms; and
any combination thereof.

4. The method of claim 1, wherein
the first aggregated semantic model captures semantics conveyed in a document; and
the second aggregated semantic model captures semantics of the first pseudo document.

5. The method of claim 1, wherein a semantic feature vector in an aggregated semantic model includes word features and concept features.

6. The method of claim 5, wherein the semantic signature in an aggregated semantic model is derived by abstracting information represented by the semantic feature vector in the aggregated semantic model.

7. The method of claim 1, wherein the clustering is performed based on a graph having nodes representing the plurality of documents and edges connecting the nodes, wherein each of the edges connecting two nodes represents a relationship between a pair of documents represented by the two nodes.

8. The method of claim 7, wherein the relationship between the pair of documents represented by an edge includes similarity, determined based on aggregated semantic models for the pair of documents.

9. The method of claim 1, further comprising:
reversing the dimensionality reduction process to generate a reversed semantic feature vector;
generating a search history based on the reversed semantic feature vector; and
performing, in response to a search request, a search based on the search history.

10. Machine readable and non-transitory medium having information recorded thereon for modeling an entity based on textual information, wherein the information, when read by a machine, causes the machine to perform the following steps:

obtaining information about an entity to be modeled;
searching textual information related to the entity, including a first plurality of documents related to at least one aspect of the entity;
adding, to each of some of the first plurality of documents, new content to generate augmented documents;
obtaining first aggregated semantic models for a second plurality of documents including the first plurality of documents and the augmented documents, wherein each of the first aggregated semantic models represents one of the second plurality of documents and includes a semantic feature vector and a semantic signature, wherein the semantic signature is generated by an autoencoder via a dimensionality reduction process to reduce a dimensionality of the semantic feature vector, and wherein the autoencoder is previously derived through unsupervised deep learning;

identifying, via clustering based on the first aggregated semantic models, one or more groups of the first aggregated semantic models, wherein each of the one or more groups includes a set of first aggregated semantic models representing semantics of the second plurality of documents;

obtaining each of one or more second aggregated semantic models for each of one or more first pseudo documents by combining each of the one or more groups of the first aggregated semantic models;

deriving, via machine learning, a third aggregated semantic model of a second pseudo document by combining the one or more second aggregated semantic models or by combing at least one of the one or more second aggregated semantic models and at least one of the first aggregated semantic models, to represent each of the at least one aspect of the entity, yielding one or more third aggregated semantic models, wherein each of the third aggregated semantic models for an aspect of the entity comprises an aggregated semantic feature vector and an aggregated semantic signature for characterizing the aspect of the entity; and identifying, based on similarity of aggregated semantic signatures among the entity and other entities, one or more of the other entities, wherein each of the one or more other entities has at least one aspect that is characterized by the corresponding aggregated semantic signature and is similar to any of the at least one aspect of the entity.

11. The medium of claim 10, wherein the entity is one of an individual, a company, an organization, an institution, and any aspect thereof.

12. The medium of claim 10, wherein the augmented document is
a document;
a partial document;

a collection of documents;
one or more terms;
one or more weighted terms; and
any combination thereof.

13. The medium of claim 10, wherein
the first aggregated semantic model captures semantics conveyed in a document; and
the second aggregated semantic model captures semantics of the first pseudo document.

14. The medium of claim 10, wherein a semantic feature vector in an aggregated semantic model includes word features and concept features.

15. The medium of claim 14, wherein the semantic signature in an aggregated semantic model is derived by abstracting information represented by the semantic feature vector in the aggregated semantic model.

16. The medium of claim 10, wherein the clustering is performed based on a graph having nodes representing the plurality of documents and edges connecting the nodes, wherein each of the edges connecting two nodes represents a relationship between a pair of documents represented by the two nodes.

17. The medium of claim 16, wherein the relationship between the pair of documents represented by an edge includes similarity, determined based on aggregated semantic models for the pair of documents.

\* \* \* \* \*